United States Patent
Tonomura

(10) Patent No.: US 8,363,981 B2
(45) Date of Patent: Jan. 29, 2013

(54) IMAGE CONVERTER AND IMAGE CONVERTING METHOD

(75) Inventor: Motonobu Tonomura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1023 days.

(21) Appl. No.: 12/331,514

(22) Filed: Dec. 10, 2008

(65) Prior Publication Data
US 2009/0167886 A1 Jul. 2, 2009

(30) Foreign Application Priority Data

Dec. 26, 2007 (JP) ................................. 2007-333628
Oct. 3, 2008 (JP) ................................. 2008-258125

(51) Int. Cl.
*G06K 9/32* (2006.01)
*G09G 5/00* (2006.01)
*H04N 9/74* (2006.01)
*G06F 7/38* (2006.01)

(52) U.S. Cl. ......... 382/293; 345/619; 348/580; 708/442

(58) Field of Classification Search .................. None
See application file for complete search history.

(56) References Cited

U.S. PATENT DOCUMENTS

| | | | | |
|---|---|---|---|---|
| 5,185,667 A * | 2/1993 | Zimmermann | .......... | 348/207.99 |
| 7,486,324 B2 * | 2/2009 | Driscoll et al. | ............... | 348/335 |
| 2002/0147991 A1 * | 10/2002 | Furlan et al. | ................... | 725/135 |
| 2003/0117675 A1 * | 6/2003 | Shirato et al. | ................. | 358/505 |
| 2004/0008423 A1 * | 1/2004 | Driscoll et al. | ............... | 359/725 |

\* cited by examiner

*Primary Examiner* — Randolph I Chu
(74) *Attorney, Agent, or Firm* — Ladas & Parry LLP

(57) ABSTRACT

On conversion of a distorted circular image photographed by use of a fisheye lens to a planar regular image, parameter setting is performed by a user's intuitive manipulation to relieve the operation load. A dome-shaped virtual sphere H is defined on a distorted circular image S on the XY plane, and a user is allowed to designate a cut-out center point P ($x_0$, $y_0$) and an auxiliary point Q ($x_1$, $y_1$) on the distorted circular image S. An intersecting point G ($x_0$, $y_0$, $z_0$) immediately above the point P is determined, and a UV plane is defined on a tangent plane S2 with respect to the virtual sphere H. An angle φ formed between the U axis and the X axis is determined on the basis of an angle θ formed between a reference straight line J passing through two points P, Q and the X axis. Transformation equations based on the orthogonal projection method including the coordinate values $x_0$, $y_0$, $z_0$ and the angle φ as parameters are utilized to allow the coordinates (u, v) to correspond to coordinates (x, y), a distance between the two points P, Q is given as a conversion magnification m, thereby a part in the vicinity of the point P of the distorted circular image S is converted to a plane regular image on the UV plane.

25 Claims, 22 Drawing Sheets

FIG.11

$$x = \frac{R(uA+vB+wE)}{\sqrt{u^2+v^2+w^2}} \quad (1)$$

$$y = \frac{R(uC+vD+wF)}{\sqrt{u^2+v^2+w^2}} \quad (2)$$

HEREIN, $$A = \cos\psi\cos\alpha - \sin\psi\sin\alpha\cos\beta \quad (3)$$

$$B = -\sin\psi\cos\alpha - \cos\psi\sin\alpha\cos\beta \quad (4)$$

$$C = \cos\psi\sin\alpha + \sin\psi\cos\alpha\cos\beta \quad (5)$$

$$D = -\sin\psi\sin\alpha + \cos\psi\cos\alpha\cos\beta \quad (6)$$

$$E = \sin\beta\sin\alpha \quad (7)$$

$$F = -\sin\beta\cos\alpha \quad (8)$$

$$w = mR \quad (9)$$

FIG.12

$$x = \frac{R\{(u-x_0)A + (v-y_0)B + (w-z_0)E\}}{\sqrt{(u-x_0)^2 + (v-y_0)^2 + (w-z_0)^2}} \quad (11)$$

$$y = \frac{R\{(u-x_0)C + (v-y_0)D + (w-z_0)F\}}{\sqrt{(u-x_0)^2 + (v-y_0)^2 + (w-z_0)^2}} \quad (12)$$

HEREIN, $$A = 1 - (1-\cos\phi)(y_0^2 + z_0^2) \quad (13)$$

$$B = -z_0 \sin\phi + x_0 y_0 (1-\cos\phi) \quad (14)$$

$$C = z_0 \sin\phi + x_0 y_0 (1-\cos\phi) \quad (15)$$

$$D = 1 - (1-\cos\phi)(z_0^2 + x_0^2) \quad (16)$$

$$E = y_0 \sin\phi + z_0 x_0 (1-\cos\phi) \quad (17)$$

$$F = -x_0 \sin\phi + y_0 x_0 (1-\cos\phi) \quad (18)$$

$$w = mR \quad (19)$$

$$\phi = f(\theta) \qquad (21)$$

WHERE f IS A FUNCTION IN WHICH AZIMUTHAL ANGLE $\alpha$ AND ZENITHAL ANGLE $\beta$ ARE USED AS PARAMETERS.

(a) ORTHOGONALLY PROJECTED IMAGE $r = f \cdot \sin\beta$ (b) EQUIDISTANTLY PROJECTED IMAGE $r = f \cdot \beta$

FIG.22

FIRST COORDINATE CONVERSION EQUATIONS

COORDINATES (x', y') ON EQUIDISTANTLY PROJECTED IMAGE ⇨ COORDINATES (x, y) ON ORTHOGONALLY PROJECTED IMAGE $$x = sinc\left\{\frac{\pi}{2} \cdot \sqrt{(x'^2 + y'^2)}\right\} \times \frac{\pi}{2} \cdot x' \quad (31)$$

$$y = sinc\left\{\frac{\pi}{2} \cdot \sqrt{(x'^2 + y'^2)}\right\} \times \frac{\pi}{2} \cdot y' \quad (32)$$

SECOND COORDINATE CONVERSION EQUATIONS

COORDINATES (x, y) ON ORTHOGONALLY PROJECTED IMAGE ⇨ COORDINATES (x', y') ON EQUIDISTANTLY PROJECTED IMAGE $$x' = \frac{2}{\pi} \cdot \frac{x}{sinc\left\{\frac{\pi}{2} \cdot \sqrt{(x^2 + y^2)}\right\}} \quad (33)$$

$$y' = \frac{2}{\pi} \cdot \frac{y}{sinc\left\{\frac{\pi}{2} \cdot \sqrt{(x^2 + y^2)}\right\}} \quad (34)$$

FIG.23

$$\frac{1}{\sqrt{a^2+b^2+c^2}} = \frac{1}{c\sqrt{(\frac{a}{c})^2+(\frac{b}{c})^2+1}}$$

$$= \frac{1}{c} \cdot \frac{1}{\sqrt{(\frac{a}{c})^2+(\frac{b}{c})^2+1}} \quad (41)$$

WHEN $(\frac{a}{c})^2+(\frac{b}{c})^2+1 = \xi$ IS GIVEN $$\frac{1}{\sqrt{a^2+b^2+c^2}} = \frac{1}{c} \cdot \frac{1}{\sqrt{\xi}} = f(c) \cdot f(\xi) \quad (42)$$

FIG.24

FUNCTION TABLE T1

| $c$ | $f(c) = \frac{1}{c}$ |
|---|---|
| ┆ | ┆ |

(a)

FUNCTION TABLE T2

| $\xi$ | $f(\xi) = \frac{1}{\sqrt{\xi}}$ |
|---|---|
| ┆ | ┆ |

(b)

$$f(t) = \left(\frac{W-\delta}{W}\right) \times f(A) + \frac{\delta}{W} \times f(B) \qquad (43)$$

$$\vec{J} \cdot \vec{X} = \cos\theta \cdot |\vec{J}| \cdot |\vec{X}| \qquad (51)$$

$$\therefore \cos\theta = \frac{\vec{J} \cdot \vec{X}}{|\vec{J}| \cdot |\vec{X}|} \qquad (52)$$

WHEN $\vec{X}$ IS GIVEN AS A UNIT VECTOR, $$|\vec{X}| = 1, \quad x_2 = x_0 + 1 \qquad (53)$$

$$|\vec{J}| = \sqrt{(x_1-x_0)^2 + (y_1-y_0)^2} \qquad (54)$$

INNER PRODUCT $\vec{J} \cdot \vec{X} = x_1 \cdot x_2 + y_1 \cdot y_0 \qquad (55)$ $$\sin\phi = \sqrt{1-\cos^2\phi} \qquad (56)$$

FIG.28

$$g(t) = sinc(t) = \frac{sin(t)}{t}, \text{ WHERE } g(0) = sinc(0) = 1 \quad (61)$$

$$h(t) = \frac{1}{sinc(t)} = \frac{t}{sin(t)}, \text{ WHERE } h(0) = 1 \quad (62)$$

WHEN $sin(t)$ IS SUBJECTED TO TAYLOR EXPANSION, $$sin(t) = t - \frac{t^3}{3!} + \frac{t^5}{5!} - \frac{t^7}{7!} + \frac{t^9}{9!} - \cdots \quad (63)$$

THEREFORE, $$g(t) = 1 - \frac{t^2}{3!} + \frac{t^4}{5!} - \frac{t^6}{7!} + \frac{t^8}{9!} - \cdots \quad (64)$$

WHEN $h(t)$ IS EXPRESSED BY
USING COEFFICIENTS OF $a_2, a_4, a_6, a_8$, $$h(t) = 1 + a_2 t^2 + a_4 t^4 + a_6 t^6 + a_8 t^8 + \cdots \quad (65)$$

IS OBTAINED. SINCE, $$h(t) = \frac{1}{1 - \frac{t^2}{3!} + \frac{t^4}{5!} - \frac{t^6}{7!} + \frac{t^8}{9!} - \cdots} \quad (66)$$

THE FOLLOWING EQUATION IS OBTAINED.

$$1 = (1 + a_2 t^2 + a_4 t^4 + a_6 t^6 + a_8 t^8 + \cdots) \times$$
$$(1 - \frac{t^2}{3!} + \frac{t^4}{5!} - \frac{t^6}{7!} + \frac{t^8}{9!} - \cdots) \quad (67)$$

WHEN THIS EQUATION IS SOLVED, $$h(t) = 1 + \frac{1}{6} t^2 + \frac{7}{360} t^4 + \frac{31}{15120} t^6 + \frac{127}{604800} t^8 + \cdots$$

IS OBTAINED. $\quad (68)$

FIG.29

$$S = \begin{bmatrix} 0 & -z & y \\ z & 0 & -x \\ -y & x & 0 \end{bmatrix} = -\begin{bmatrix} 0 & -z & y \\ z & 0 & -x \\ -y & x & 0 \end{bmatrix}^T = -S^T \qquad (71)$$

$$S^2 = \begin{bmatrix} 0 & -z & y \\ z & 0 & -x \\ -y & x & 0 \end{bmatrix}^2 = -\begin{bmatrix} -y^2-z^2 & xy & zx \\ xy & -z^2-x^2 & yz \\ zx & yz & -x^2-y^2 \end{bmatrix} \qquad (72)$$

$$S^3 = \begin{bmatrix} -y^2-z^2 & xy & zx \\ xy & -z^2-x^2 & yz \\ zx & yz & -x^2-y^2 \end{bmatrix} \begin{bmatrix} 0 & -z & y \\ z & 0 & -x \\ -y & x & 0 \end{bmatrix}$$

$$= \begin{bmatrix} 0 & z(x^2+y^2+z^2) & -y(x^2+y^2+z^2) \\ -z(x^2+y^2+z^2) & 0 & x(x^2+y^2+z^2) \\ y(x^2+y^2+z^2) & -x(x^2+y^2+z^2) & 0 \end{bmatrix} \qquad (73)$$

$$= -\begin{bmatrix} 0 & -z & y \\ z & 0 & -x \\ -y & x & 0 \end{bmatrix} = -S$$

$$expS = E + S + \frac{1}{2!}S^2 + \frac{1}{3!}S^3 + \frac{1}{4!}S^4 + \frac{1}{5!}S^5 + \frac{1}{6!}S^6 \cdots \cdots \quad (74)$$

$$expS = E + S + \frac{1}{2!}S^2 - \frac{1}{3!}S - \frac{1}{4!}S^2 + \frac{1}{5!}S + \frac{1}{6!}S^2 + \cdots \cdots \quad (75)$$

FIG.30

$$exp(\phi S) = E + \phi S + \frac{1}{2!}\phi^2 S^2 + \frac{1}{3!}\phi^3 S^3 + \frac{1}{4!}\phi^4 S^4 + \frac{1}{5!}\phi^5 S^5 + \frac{1}{6!}\phi^6 S^6 + \cdots$$

$$= E + \phi S + \frac{1}{2!}\phi^2 S^2 - \frac{1}{3!}\phi^3 S - \frac{1}{4!}\phi^4 S^2 + \frac{1}{5!}\phi^5 S + \frac{1}{6!}\phi^6 S^2 + \cdots \quad (76)$$

$$= E + (\phi - \frac{1}{3!}\phi^3 + \frac{1}{5!}\phi^5 - \cdots)S + (\frac{1}{2!}\phi^2 - \frac{1}{4!}\phi^4 + \frac{1}{6!}\phi^6 - \cdots)S^2 + \cdots$$

$$= E + (sin\phi)S + (1-cos\phi)S^2$$

$$exp(\phi S) = E + (sin\phi)S + (1-cos\phi)S^2 \quad (77)$$

$$R(\phi N) = exp(\phi S) = E + (sin\phi)S + (1-cos\phi)S^2$$

$$= \begin{bmatrix} 1 & 0 & 0 \\ 0 & 1 & 0 \\ 0 & 0 & 1 \end{bmatrix} + (sin\phi)\begin{bmatrix} 0 & -z & y \\ z & 0 & -x \\ -y & x & 0 \end{bmatrix} + (1-cos\phi)\begin{bmatrix} -y^2-z^2 & xy & zx \\ xy & -z^2-x^2 & yz \\ zx & yz & -x^2-y^2 \end{bmatrix} \quad (78)$$

$$= \begin{bmatrix} 1-(1-cos\phi)(y^2+z^2) & -zsin\phi+xy(1-cos\phi) & ysin\phi+zx(1-cos\phi) \\ zsin\phi+xy(1-cos\phi) & 1-(1-cos\phi)(z^2+x^2) & -xsin\phi+yz(1-cos\phi) \\ -ysin\phi+zx(1-cos\phi) & xsin\phi+yz(1-cos\phi) & 1-(1-cos\phi)(x^2+y^2) \end{bmatrix}$$

$$R(\phi N) = \begin{bmatrix} A & B & E \\ C & D & F \\ G & H & I \end{bmatrix} \quad (79)$$

IMAGE CONVERTER AND IMAGE CONVERTING METHOD

BACKGROUND OF THE INVENTION

The present invention relates to an image converter and an image converting method and in particular to a technique for conducting processes of cutting out a part of a distorted circular image photographed by use of a fisheye lens and converting it into a planar regular image.

A fisheye lens can be used to obtain hemispherical circular images in all directions without using a mechanical moving mechanism. Therefore, a fisheye lens has been extensively used in photographing scenic pictures and others aiming at eccentric effect. However, images photographed by use of a fisheye lens are distorted in circular images, and the images may be used for artistic pictures, as they are, but not suitable for general photographic uses.

Thus, there has been proposed an apparatus for conducting processes of cutting out a part of a distorted circular image photographed by use of a fisheye lens and converting it into a planar regular image. For example, International Patent Publication WO92/21208 under PCT has disclosed technologies by which a computer is used to convert a portion of a distorted circular image to a planar regular image in real time. When this conversion technique is utilized, it is possible to convert a dynamic image made up of distorted circular images photographed by use of a fisheye lens to a dynamic image made up of planar regular images and observe it in real time. Application to a monitoring system and others having a 180-degree field angle is expected.

In order to cut out a portion of a distorted circular image photographed by use of a fisheye lens and convert it to a planar regular image, it is necessary to set parameters indicating, for example, which portion of the distorted circular image is equivalent to a portion to be converted (cut-out position), to which direction the planar regular image displaying the portion is necessary and to which extent the part is to be converted (conversion magnification). As a matter of course, these parameters may be set arbitrarily according to the user's desire.

However, conventional image converters disclosed in the above Patent Document and others have required that the cut-out position and orientation should be designated by three angles called Euler angles and the conversion magnification should also be designated separately. Thereby, such a problem is posed that the operability is poor for a user.

Euler angles are angles that when a dome-shaped virtual sphere is defined on a distorted circular image and a planar regular image-forming face in contact with a desired tangent point on the virtual sphere is defined, a position of the tangent point is expressed by an azimuthal angle $\alpha$ and a zenithal angle $\beta$, and an orientation of the planar regular image is expressed by a planar inclination angle $\psi$. These three angles $\alpha$, $\beta$, $\psi$ are angles which are defined on a three-dimensional space, while a distorted circular image actually seen by a user is an image displayed on a two-dimensional plane. Therefore, an operation of designating the three angles $\alpha$, $\beta$, $\psi$ as parameters is far from an intuitive manipulation for the user.

Another problem of conventional image converters is operation load. Where the above-described Euler angles $\alpha$, $\beta$, $\psi$ are designated as parameters, naturally, the operation requires using transformation equations including these Euler angles $\alpha$, $\beta$, $\psi$ as parameters. However, these transformation equations are complicated equations including trigonometric functions for three angles $\alpha$, $\beta$, $\psi$, thereby imposing a substantially great operation load to a system. In particular, when an image converter is to be used for an application which requires conversion in real time, high-capacity hardware is required which is capable of trigonometric function operations at a high speed. As a result, there is posed a serious problem in reducing the production cost.

SUMMARY OF THE INVENTION

An object of the present invention is to provide an image converter and an image converting method capable of setting necessary parameters by an intuitive manipulation of a user and also capable of reducing the operation load on conversion of a distorted circular image photographed by use of a fisheye lens to a planar regular image.

According to the present invention, a user merely instructs a position of a cut-out center point P and a cut-out orientation on a distorted circular image photographed by use of a fisheye lens, by which the user is able to set parameters necessary for conversion by an intuitive manipulation. Further, conversion operation is made by using relatively simple transformation equations in which coordinate values $(x_0, y_0, z_0)$ of a tangent point on a virtual sphere and a planar inclination angle $\phi$, which are derived from the instruction input by the user as parameters, so as to make it possible to relieve operation loads.

(1) The first feature of the present invention resides in an image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x, y) on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates (u, v) on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates $(x_0, y_0, z_0)$ of an intersecting point G between a straight line passing through the cut-out center point P and parallel with a Z axis and the virtual sphere;

an angle determining unit which determines on the basis of the cut-out orientation a planar inclination angle $\phi$ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and a transformation unit which makes correspondence between coordinates (u, v) and coordinates (x, y) by utilizing transformation equations based on an orthogonal projection method including the position coordinates $(X_0, y_0, z_0)$ and the planar inclination angle $\phi$ as paraamerters, determines a pixel value of a pixl on the planar regular image arranged at a position indicated by coodinates (u, v) on the basis of a pixel value of a reference pixel on the distorted circular image arranged at a positon indicated by corresponding corrdinates (x, y), and fromss the planar regular image with regard to a partial image cut out from the distorted circular image in anorientation indicated by the planar inclination angle $\phi$ takeing the cut-out center point P as acenter, so that the thus formed planar regular image is stored in the planar regular image storage unit.

(2) The second feature of the present inveetin reside in the image Converter as set forth in the first feature, wherein the transformation unit uses the following equations as transformation equations based on the orthogonal prjeetion method, $$x=R[(u-x_0)A+(v-y_0)B+(w-z_0)E]/\sqrt{((u-x_0)^2+(v-y_0)^2+(w-z_0)^2)}$$

$$y=R[(u-x_0)C+(v-y_0)D+(w-z_0)F]/\sqrt{((u-x_0)^2+(v-y_0)^2+(w-z_0)^2)}$$

where
$A=1-(1-\cos\phi)(y_0^2+z_0^2)$
$B=-z_0\sin\phi+x_0y_0(1-\cos\phi)$
$C=z_0\sin\phi+x_0y_0(1-\cos\phi)$
$D=1-(1-\cos\phi)(z_0^2+x_0^2)$
$E=y_0\sin\phi+z_0x_0(1-\cos\phi)$
$F=-x_0\sin\phi+y_0x_0(1-\cos\phi)$
$w=m\,R$ (m is a predetermined conversion magnification).

(3) The third feature of the present invention resides in the image converter a set forth in the feature, wherein the instruction input unit has a function of entering instructions for defining a reference straight line J drawn on the distorted circular image, and the angle determining unit determine the planar inclination angle $\phi$ on the basis an angle $\theta$ formed between the reference straight line J and the X axis (on the condition that $\theta=0°$ where both of them are parallel).

(4) The fourth feature of the present invention resides in the image converter as set forth in third feature, wherein the instruction input unit has a function of entering instructions for designation position of two points, a cut-out center point P and an auxiliary point Q, on the distorted circular image and giving a straight line connection the cut-out center point P with the auxiliary point Q as the reference straight line J.

(5) The fifth feature of the present invention resides in the image converter as set forth in the third feature, wherein the instruction input unit has a function of entering a numerical value indicating an angel $\theta$ formed between the references straight line J and the X axis on a predetermined input screen and also has a function of entering instructions for designating a position of the cut-out center point P on the distorted circular image.

(6) The sixth feature of the present invention reside in the image converter as set forth in the third feature, wherein the angle determining unit gives the angle $\theta$ formed between the reference straight line J and the X axis approximately as the planar inclination angle $\phi$.

(7) The seventh feature of the present invention resides in the image converter as set forth in the second feature, wherein.

the instruction input unit has a function of entering a conversion magnification m on the basis of instructions by a user, and the transformation unit make the correspondence by using the entered conversion magnification m in the transformation equations.

(8) The eighth feature of the present invention resides in the image converter as set forth in the seventh feature, wherein the instruction input unit has a function of entering instructions for designating positions of two points, a cut-out center point P and an auxiliary point Q on the distorted circular image and uses a numerical value given as m=k/d (k is a predetermined proportional constant) on the basis of a distance d between the cut-out center point P and the auxiliary point Q as a conversion magnification m.

(9) The ninth feature of the present invention resides in the image converter as set forth in the first feature, wherein the transformation unit performs, in order to determine a pixel value of a pixel on the planar regular image arranged at a position indicated by coordinated (u, v), interpolation operation of pixel values of a plurality of reference pixels on the distorted circular images arranged in the vicinity of a position indicated by the corresponding coordinates (x, y).

(10) The tenth feature of the present invention resides in the image converter as set forth in the first feature, wherein the image converter has a function to perform image conversion when an image stored in the distorted circular image storage unit is not an orthogonally projected image photographed by use of a fisheye lens based on the orthogonal projection method but a non-orthogonally projected image photographed by use of a fisheye lens based on a non-orthogonal projection method, the image converter includes first coordinate conversion equations for converting coordinates on the non-orthogonally projected image to coordinates on the orthogonally projected image and second coordinate conversion equations for converting coordinates on the orthogonally projected image to coordinates on the non-orthogonally projected image, the intersecting point operation unit converts the coordinates of the cut-out center point P by using the first coordinate conversion equations and determines the position coordinates $(x_0, y_0, z_0)$ of the intersecting point by using coordinates after conversion, and the transformation unit uses a transformation equation based on the orthogonal projection method to determine coordinates (x, y) corresponding to coordinates (u, v), thereafter, the second coordinate conversion equation is used to convert the coordinates (x, y), and the coordinates after conversion are used to identify a position of a reference pixel on the distorted circular image.

(11) The eleventh feature of the present invention resides in the image converter as set forth in the tenth feature, wherein when an image stored in the distorted circular image storage unit is an equidistantly projected image photographed by use of a fisheye lens based on an equidistance projection method, the intersecting point operation unit uses the following equations as the first coordinate conversion equations for converting coordinates (x', y') on the equidistantly projected image to the coordinates (x, y) on the orthogonally projected image $$x=\operatorname{sinc}(\pi/2\cdot\sqrt{(x'^2+y'^2)})\times\pi/2\cdot x'$$

$$y=\operatorname{sinc}(\pi/2\cdot\sqrt{(x'^2+y'^2)})\times\pi/2\cdot y', \text{ and}$$

the transformation unit uses the following equations as the second coordinate conversion equations for converting the coordinates (x, y) on the orthogonally projected image to the coordinates (x', y') on the equidistantly projected image $$x'=2/\pi\cdot x/\operatorname{sinc}(\pi/2\cdot\sqrt{(x^2+y^2)})$$

$$y'=2/\pi\cdot y/\operatorname{sinc}(\pi/2\cdot\sqrt{(x^2+y^2)}).$$

(12) The twelfth feature of the present invention resides in a program recording medium, wherein said program allowing a computer to function as the image converter as set forth in the first feature.

(13) The thirteenth feature of the present invention resides in a semiconductor integrated circuit in which an electronic circuit functioning as the transformation unit of the image converter as set forth in the first feature is assembled.

(14) The fourteenth feature of the present invention resides in a fisheye lens monitoring system including the image converter as set forth in the first feature, a camera using a fisheye lens and a monitoring device of displaying a planar regular image on a screen, wherein the fisheye lens monitoring system is constituted so that a distorted circular image photographed by using the camera is stored in the distorted circular image storage unit and the planar regular image obtained in the planar regular image storage unit is displayed by the monitoring device.

(15) The fifteenth feature of the present invention resides in the image converter as set forth in the second feature, wherein the transformation unit has a first function table which allows values of "function $f(c)=1/c$" to correspond to values of various variables c and a second function table which allows values of "function $f(\xi)=1/\sqrt{\xi}$" to correspond to values of various variables $\xi$, the transformation unit makes an operation to determine values of c and $\xi$ with the following equations, $$a=u-x_0, \ b=v-y_0, \ c=w-z_0,$$

$$\xi=(a/c)^2+(b/c)^2+1$$

so that values of the functions f(c) and f($\xi$) which correspond to the thus determined values of c and $\xi$ are determined by referring to the first function table and the second function table, and a value of $\sqrt{((u-x_0)^2+(v-y_0)^2+(w-z_0)^2)}$ in the transformation equation based on the orthogonal projection method is determined by operation of $f(c) \times f(\xi)$.

(16) The sixteenth feature of the present invention resides in the image converter as set forth in the first feature, wherein the transformation unit comprising:

an even-number function table in which among variables t giving a discrete value of an interval W according to predetermined effective digits, a value of a predetermined function f(t) is allowed to correspond to an even-number variable t;

an odd-number function table in which among variables t giving a discrete value of the interval W according to the effective digits, a value of the function f(t) is allowed to correspond to an odd-number variable t;

a T resistor which stores variables t constituted with higher-order bits made up of the effective digits and lower-order bits showing digits lower than the effective digits;

an even-number reading unit which reads from the even-number function table a value of the function f(t) allowed to correspond to an even-number variable t shown by the higher-order bits when the higher-order bits show an even-number and reads from the even-number function table a value of the function f(t) allowed to correspond to a minimum even-number variable t greater than an odd-number variable t shown by the higher-order bits when the higher-order bits show an odd-number;

an odd-number reading unit which reads from the odd-number function table a value of the function f(t) allowed to correspond to an odd-number variable t shown by the higher-order bits when the higher-order bits show an odd-number and reads from the odd-number function table a value of the function f(t) allowed to correspond to a minimum odd-number variable t greater than an even-number variable t shown by the higher-order bits when the higher-order bits show an even-number;

an A resistor which stores a given value of the function f(t) read from the even-number function table or the odd-number function table;

a B resistor which stores a given value of the function f(t) read from the even-number function table or the odd-number function table;

an even-odd selector which gives a value of the function f(t) read by the even-number reading unit to the A resistor and gives a value of the function f(t) read by the odd-number reading unit to the B resistor when the higher-order bits show an even-number, and which gives a value of the function f(t) read by the odd-number reading unit to the A resistor and gives a value of the function f(t) read by the even-number reading unit to the B resistor when the higher-order bits show an odd-number; and an interpolation operating unit in which a value stored in the A resistor is given as f(A) and a value stored in the B resistor is given as f(B), and a value indicated by the lower-order bit is given as $\delta$, and a value of the function f(t) after interpolation is determined by the following operation, $$f(t)=((W-\delta)/W) \times f(A)+(\delta/W) \times f(B), \text{ and}$$

wherein a value of the function f(t) after interpolation which is determined by the interpolation operating unit is utilized to perform the operation.

(17) The seventeenth feature of the present invention resides in the image converter as set forth in the eleventh feature, wherein the intersecting point operation unit operates the function sinc (t) in the first coordinate conversion equations on the basis of the following form of equation subjected to Taylor expansion $$\text{sinc}(t)=1-t^2/3!+t^4/5!-t^6/7!+t^8/9!-\ldots, \text{ and}$$

the transformation unit operates the function 1/sinc (t) in the second coordinate conversion equations on the basis of the following form of equation using predetermined coefficient values of $a_2, a_4, a_6, a_8, \ldots$.

$$1/\text{sinc}(t)=1+a_2 t^2+a_4 t^4+a_6 t^6+a_8 t^8+\ldots.$$

(18) The eighteenth feature of the present invention resides in the image converter as set forth in the second feature, wherein the transformation unit determines a value of cos $\phi$ by dividing an inner product of the vector U and the vector X by a product of a size of the vector U and that of the vector X.

(19) The nineteenth feature of the present invention resides in the image converter as set forth in the second feature, wherein the instruction input unit has a function of entering instructions for defining the reference straight line J drawn on the distorted circular image, and the transformation unit defines a vector J facing a direction of the reference straight line J and determines a value of cos $\phi$ by dividing an inner product of the vector J and the vector X by a product of a size of the vector J and that of the vector X.

(20) The twentieth feature of the present invention resides in the image converter as set forth in the second feature, wherein the transformation unit determines a value of sin $\phi$ on the basis of an operation of sin $\phi=\sqrt{(1-\cos^2 \phi)}$.

(21) The twenty-first feature of the present invention resides in an image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x, y) on a two-dimensional XY orthogonal coordinate system;

a planar regular image storage unit which stores a planar regular image constituted with aggregates of pixels arranged at a position indicated by coordinates (u, v) on a two-dimensional UV orthogonal coordinate system;

a distorted circular image display unit which displays the distorted circular image stored in the distorted circular image storage unit;

an instruction input unit which inputs positions of two points, a cut-out center point P and an auxiliary point Q on the basis of instructions given by a user on the distorted circular image displayed, and recognizes a straight line connecting the cut-out center point P with the auxiliary point Q as a reference straight line J, and a numerical value given as m=k/d (k is a predetermined proportional constant) as a conversion magnification m on the basis of a distance d between the cut-out center point P and the auxiliary point Q; and a transformation unit which determines a pixel value of a pixel on the planar regular image arranged at a position indicated by coordinates (u, v) on the basis of a pixel value of a reference pixel on the distorted circular image arranged at a position indicated by corresponding coordinates (x, y) by utilizing a transformation equation for allowing the coordinates (u, v) to correspond to the coordinates (x, y), and performs an operation for forming a planar regular image subjected to scaling on the basis of the conversion magnification m with regard to a partial image cut out from the distorted circular image to an orientation in accordance with the reference straight line J taking the cut-out center point P as a center, so that the thus formed planar regular image is stored in the planar regular image storage unit.

(22) The twenty-second feature of the present invention resides in an image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x, y) on a two-dimensional XY orthogonal coordinate system;

a planar regular image storage unit which stores a planar regular image constituted with aggregates of pixels arranged at a position indicated by coordinates (u, v) on a two-dimensional LTV orthogonal coordinate system;

a distorted circular image display unit which displays the distorted circular image stored in the distorted circular image storage unit;

an instruction input unit which inputs an angle θ defined as an angle formed between a reference straight line J and the X axis and a conversion magnification m on the basis of instructions given by a user on a input screen, and a position of a cut-out center point P on the basis of instructions given by the user on the distorted circular image displayed; and a transformation unit which determines a pixel value of a pixel on the planar regular image arranged at a position indicated by coordinates (u, v) on the basis of a pixel value of a reference pixel on the distorted circular image arranged at a position indicated by corresponding coordinates (x, y) by utilizing a transformation equation for allowing the coordinates (u, v) to correspond to the coordinates (x, y), and performs an operation for forming a planar regular image subjected to scaling on the basis of the conversion magnification m with regard to a partial image cut out from the distorted circular image to an orientation in accordance with the reference straight line J taking the cut-out center point P as a center, so that the thus formed planar regular image is stored in the planar regular image storage unit.

(23) The twenty-third feature of the present invention resides in an image converting method for performing processes of cutting out a part of a distorted circular image photographed by use of a fisheye lens and converting it into a planar regular image, the image converting method which allows a computer or an electronic circuit to perform the following steps:

storing in a distorted circular image storage unit a distorted circular image constituted with aggregates of pixels arranged at a position indicated by coordinates (x, y) on a two-dimensional XY orthogonal coordinate system and having a radius R taking an origin O of the XY coordinate system as a center;

displaying on a display the distorted circular image stored in the distorted circular image storage unit;

entering position and cut-out orientation of a cut-out center point P on the distorted circular image displayed on the display on the basis of instructions by a user;

determining position coordinates $(x_0, y_0, z_0)$ of an intersecting point G between a straight line passing through the cut-out center point P and parallel with a Z axis and a virtual sphere, by defining a virtual sphere having the radius R taking the origin O as a center in a three-dimensional XYZ orthogonal coordinate system including the two-dimensional XY orthogonal coordinate system;

determining on the basis of the cut-out orientation a planar inclination angle φ given as an angle formed between a vector U facing a direction of an U axis of a two-dimensional UV orthogonal coordinate system to be defined on a tangent plane in contact with the virtual sphere on the intersecting point G and a vector X facing a direction of an X axis of the two-dimensional XY orthogonal coordinate system; and performing operation for forming a planar regular image with regard to a partial image cut out from the distorted circular image to an orientation indicated by the planar inclination angle φ taking the cut-out center point P as a center by utilizing transformation equations based on an orthogonal projection method including the position coordinates $(x_0, y_0, z_0)$ and the planar inclination angle φ as parameters to allow coordinates (u, v) to correspond to coordinates (x, y), and determining a pixel value of each pixel on the planar regular image constituted with aggregates of pixels arranged at a position indicated by the coordinates (u, v) on the basis of a pixel value of a reference pixel on the distorted circular image arranged at a position indicated by the corresponding coordinates (x, y).

(24) The twenty-fourth feature of the present invention resides in the image converting method as set forth in the twenty-third feature, wherein the following equations are used as transformation equations based on the orthogonal projection method, $x = R[(u-x_0)A + (v-y_0)B + (w-z_0)E]/\sqrt{((u-x_0)^2 + (v-y_0)^2 + (w-z_0)^2)}$ $y = R[(u-x_0)C + (v-y_0)D + (w-z_0)F]/\sqrt{((u-x_0)^2 + (v-y_0)^2 + (w-z_0)^2)}$ where
$A = 1 - (1-\cos\phi)(y_0^2 + z_0^2)$
$B = -z_0 \sin\phi + x_0 y_0 (1-\cos\phi)$
$C = z_0 \sin\phi + x_0 y_0 (1-\cos\phi)$
$D = 1 - (1-\cos\phi)(z_0^2 + x_0^2)$
$E = y_0 \sin\phi + z_0 x_0 (1-\cos\phi)$
$F = -x_0 \sin\phi + y_0 x_0 (1-\cos\phi)$
$w = mR$ (m is a predetermined conversion magnification).

(3) The third feature of the present invention resides in the image

(25) The twenty-fifth feature of the present invention resides in the image converting method as set forth in the twenty-third feature, wherein instructions are entered for designating positions of two points, the cut-out center point P and an auxiliary point Q, on the distorted circular image displayed on the display, a straight line connecting the cut-out center point P with the auxiliary point Q is given as a reference straight line J, and a planar inclination angle φ is determined on the basis of an angle θ formed between the reference straight line J and the X axis (on the condition that θ is equal to 0° where they are parallel).

(26) The twenty-sixth feature of the present invention resides in the image converting method as set forth in the twenty-third feature, wherein an instruction for designating a position of the cut-out center point P is entered on the distorted circular image displayed on the display, and an instruction for designating an angle θ between the reference straight line J and the X axis on the distorted circular image is entered on an input screen, and the planar inclination angle φ is determined on the basis of the angle θ.

BRIEF DESCRIPTION OF THE DRAWINGS

FIG. 11 is a view showing the conventional general transformation equations in which Euler angles α, β, ψ are used as parameters.

FIG. 12 is a view showing the transformation equations of the present invention in which coordinate values $(x_0, y_0, z_0)$ showing a rotational axis and a planar inclination angle φ (rotation angle rotating around the rotational axis) are used as parameters.

FIG. 22 is a view showing conversion equations for performing the coordinate conversion between coordinates on the equidistantly projected image and coordinates on the orthogonally projected image.

FIG. 23 is a view showing equations used for relieving operation loads of the transformation equations of the present invention shown in FIG. 12.

FIG. 24 is a view showing function tables used for relieving operation loads of the transformation equations of the present invention shown in FIG. 12.

FIG. 28 is a view showing equations used for relieving operation loads of the coordinate conversion shown in FIG. 22.

FIG. 29 is a view showing a mathematical process for deriving the transformation equations of the present invention shown in FIG. 12.

FIG. 30 is another view showing a mathematical process for deriving transformation equations of the present invention shown in FIG. 12.

DESCRIPTION OF THE PREFERRED EMBODIMENTS

Hereinafter, a description will be given for embodiments which illustrate the present invention.

<<<Section 1: Basic Principle of Image Conversion>>>

Figure 1:
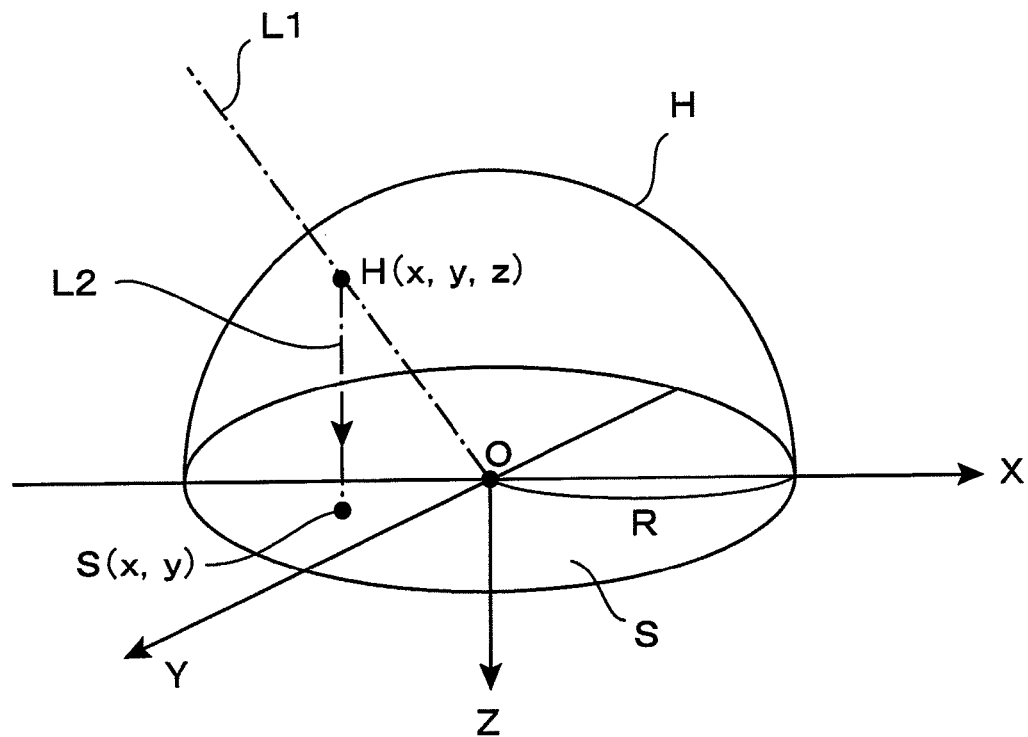
FIG. 1 is a perspective view showing a basic model of forming a distorted circular image S photographed by use of a fisheye lens based on the orthogonal projection method.

First, a description will be given for general characteristics of a distorted circular image photographed by use of a fisheye lens and a basic principle of cutting out a part thereof and converting it into a planar regular image. FIG. 1 is a perspective view showing a basic model of forming a distorted circular image S by photographing by use of a fisheye lens based on the orthogonal projection method. In general, fisheye lenses are classified into plural types, depending on projection methods thereof. The model shown in FIG. 1 is a fisheye lens based on the orthogonal projection method (a method for applying the present invention to fisheye lens based on projection other than those based on the orthogonal projection method will be described in Section 5).

FIG. 1 shows an example in which a distorted circular image S is formed on the XY plane in a three-dimensional XYZ orthogonal coordinate system. It is noted that in this instance, in order to secure consistency with transformation equations to be described later, as shown in the figure in the drawing, an example is shown that the Z axis is given in the lower side of the drawing and a dome-shaped virtual sphere H (hemisphere) is defined in a negative region of the Z axis.

Figure 2:
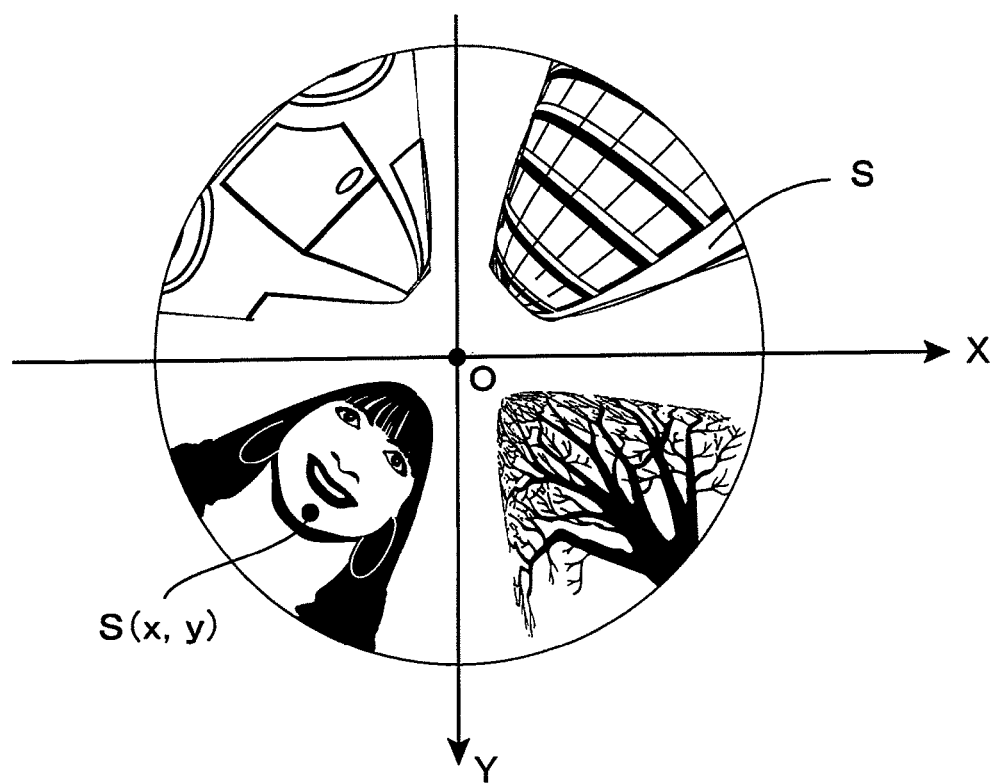
FIG. 2 is a plan view showing one example of the distorted circular image S photographed by use of a fisheye lens (a general image of the distorted circular image S for explanation purpose and not an exact image thereof).

The distorted circular image S formed on the XY plane is an image which forms a circle with a radius R taking an origin O as the center of a coordinate system and corresponds to an image existing in a region having a 180-degree field angle on the negative region of the Z axis which has been distorted and recorded. FIG. 2 is a plan view showing one example of the distorted circular image S photographed by use of a fisheye lens. As described above, all images existing on the negative region of the Z axis are to be recorded in the distorted circular image. There is a difference in scale ratio of an image between the central part and the peripheral part thereof, by which the thus recorded image is distorted in shape. It is noted that the distorted circular image S shown in FIG. 2 is a general example for the sake of explanation purpose and not an exact image actually obtained by use of a fisheye lens.

A fisheye lens is actually constituted with an optical system in combination with a plurality of convex lenses and concave lenses. It is known that the optical characteristics can be modeled by the virtual sphere H as shown in FIG. 1. More specifically, regarding the model in which the dome-shaped virtual sphere H (hemisphere) with a radius R is arranged on the upper face of the distorted circular image S, it may be considered that, for the optical characteristics of a fisheye lens based on the orthogonal projection method, incident light L1 made incident from a normal line direction to any given point H (x, y, z) on the virtual sphere H behaves so as to move to a point S (x, y) on the XY plane as incident light L2 parallel with the Z axis. To put it the other way around, in FIG. 2, a pixel located at the point S (x, y) on the distorted circular image S indicates one point on an object existing on an extended line of the incident light L1 shown in FIG. 1.

As a matter of course, in optical phenomena actually found on a fisheye lens, a particular point of an object to be photographed forms an image on the particular point S (x, y) on the XY plane due to the refraction of a plurality of convex lenses and concave lenses. It is quite acceptable to hold a discussion that the optical system is replaced with a model of the virtual sphere H shown in FIG. 1 on image conversion or others. Therefore, a method under the assumption that this type of model is used has been shown also in the case of the image conversion disclosed in the above-described Patent Document WO92/21208. The present invention will be described hereinafter also on the assumption that this type of model is to be used.

Figure 3:
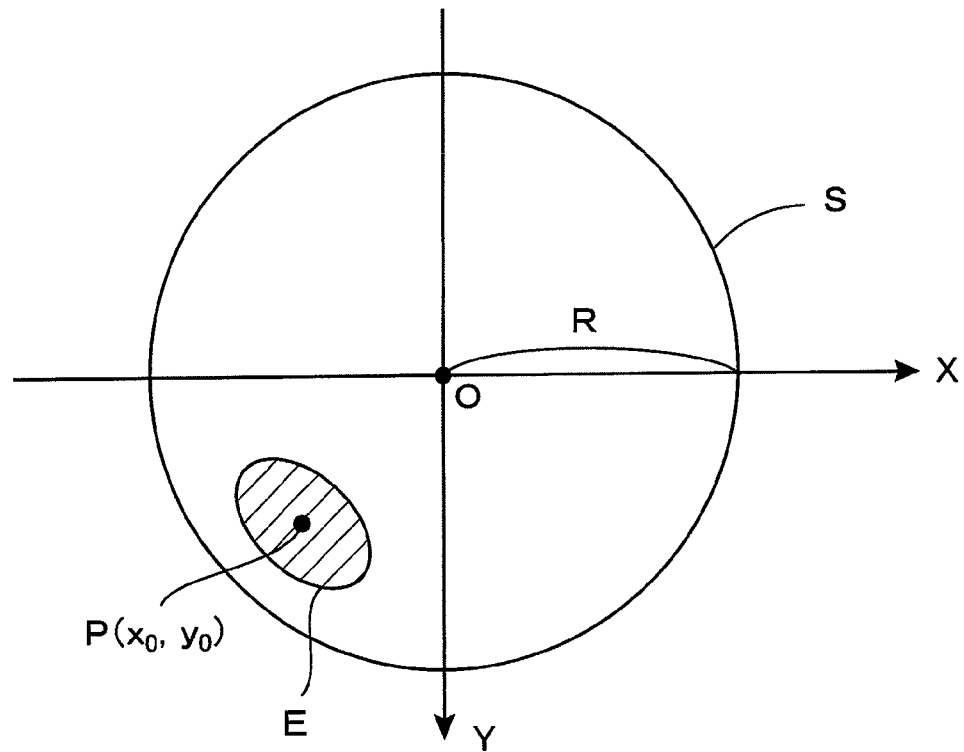
FIG. 3 is a plan view showing an example in which a cut-out region E is defined at a portion of the distorted circular image S.

An object of the image converter related to the present invention is to cut out a portion of a distorted circular image S and convert it to a planar regular image. For example, it is assumed that a user who has seen the distorted circular image S shown in FIG. 2 desires to observe an image of a women depicted on the lower left of the drawing as a distortion-free correct image. In this instance, the user is required to designate which part of the distorted circular image S is to be cut out and converted. For example, if a hatched cut-out region E shown in FIG. 3 is designated as a region to be converted, the most intuitive designation method will be to designate a position of the center point P ($x_0$, $y_0$). In the present invention, a point P which is designated by the user is referred to as a cut-out center point P.

Figure 4:
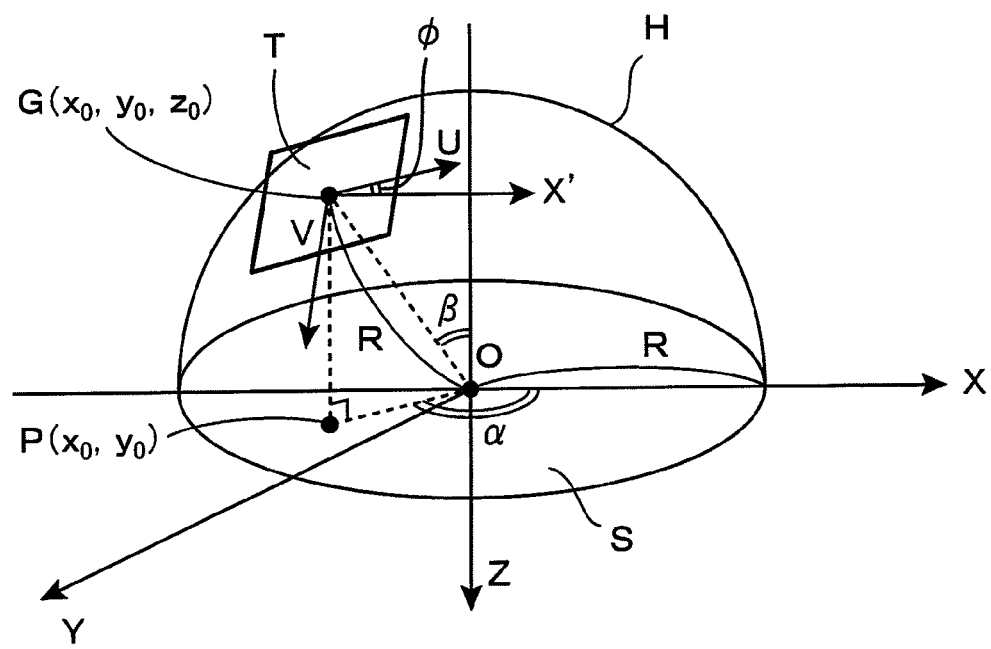
FIG. 4 is a perspective view showing a relationship between an XY coordinate system including the distorted circular image S and a UV coordinate system including a planar regular image T.

Here, in order to convert an image inside the cut-out region E taking the cut-out center point P ($x_0$, $y_0$) as a center to a planar regular image, considered is the following model. FIG. 4 is a perspective view showing a relationship between an XY coordinate system including a distorted circular image S and a UV coordinate system including a planar regular image T in this model. As shown in the figure, since the distorted circular image S is defined on the XY plane of a three-dimensional XYZ orthogonal coordinate system, the distorted circular image S in itself is an image defined on a two-dimensional XY orthogonal coordinate system. Thus, considered is an intersecting point G between a straight line passing through the cut-out center point P ($x_0$, $y_0$) defined on the distorted circular image and parallel with the Z axis and a virtual sphere H. This intersecting point G is a so-called point immediately above the cut-out center point P ($x_0$, $y_0$), and the position coordinate is ($x_0$, $y_0$, $z_0$).

Next, at the intersecting point G ($x_0$, $y_0$, $z_0$), a tangent plane in contact with the virtual sphere H is defined and a two-dimensional UV orthogonal coordinate system is defined on the tangent plane. Then, the planar regular image T is to be determined as an image on the two-dimensional UV orthogonal coordinate system. In the case of the example shown in FIG. 4, the UV coordinate system is defined so that the intersecting point G ($x_0$, $y_0$, $z_0$) can be set as an origin. As a result, an origin of the UV coordinate system in this model is set at any position on the virtual sphere H, and the UV plane constituting the UV coordinate system is in alignment with the tangent plane with respect to the virtual sphere H at the position of this origin.

The position of the intersecting point G ($x_0$, $y_0$, $z_0$) which is given as an origin of the UV coordinate system can be identified by an azimuthal angle α and a zenithal angle β, as shown in the figure. In this instance, the azimuthal angle α, (0≦α<360°) is an angle formed between a straight line connecting a cut-out center point P ($x_0$, $y_0$) with an origin O of the XY coordinate system and the X axis. The zenithal angle β (0≦β<90°) is an angle formed between a straight line connecting a point G ($x_0$, $y_0$, $z_0$) to be given as an origin of the UV coordinate system with an origin O of the XY coordinate system and the Z axis.

As described above, the UV plane can be identified by designating the azimuthal angle α and the zenithal angle β. However, in order to determine the UV coordinate system, it is necessary to designate still another parameter. This parameter indicates a rotation factor (orientation of U axis) on the tangent plane taking the point G as a center and in general referred to as a planar inclination angle. The planar inclination angle is usually defined as an angle ψ formed between a reference axis and the U axis, wherein said reference axis is defined as "an axis passing through the point G, parallel with the XY plane and also orthogonal to a straight line OG" (the reference axis changes depending on the azimuthal angle α and the zenithal angle β). On the other hand, in the present invention, instead of the described above angle ψ, an angle φ which also indicates an orientation of the U axis is used with the X axis being used as a reference (the reference axis is constantly fixed to the X axis). More specifically, the angle φ used as a parameter in the present invention is defined as an angle formed between the U axis and the X' axis as shown in FIG. 4. In this instance, the X' axis is an axis passing through the intersecting point G ($x_0$, $y_0$, $z_0$) and parallel with the X axis. In other words, when a vector U facing the U axis direction in the UV coordinate system and a vector X facing the X axis direction in the XY coordinate system are defined, the angle φ is defined as an angle formed between the vector U and the vector X. As described above, "the angle φ used in the present invention" is an angle defined by a method different from a "conventional general planar inclination angle ψ." Both of these angles are common in respect that they are parameters indicating a rotation factor of the UV coordinate system. Therefore, in this instance, the angle φ will also be referred to as a "planar inclination angle."

Figure 5:
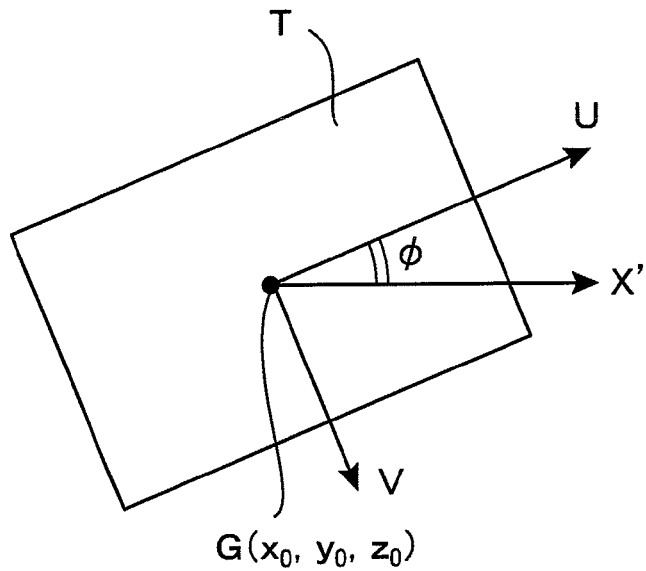
FIG. 5 is a plan view showing a relationship between the planar regular image T defined on the UV coordinate system and a planar inclination angle φ.

FIG. 5 is a plan view showing a relationship between the planar regular image T defined on the UV coordinate system and the planar inclination angle φ. In the example shown in this figure drawing, the planar regular image T is defined as a rectangle on the UV plane taking an origin G ($x_0$, $y_0$, $z_0$) of the UV coordinate system as the center. Further, the long side thereof is parallel with the U axis, while the short side is parallel with the V axis. The planar inclination angle φ is, as described above, an angle formed between the U axis and the X' axis. Thus, in the example shown in FIG. 5, the planar inclination angle φ is a parameter indicating a rotation factor of the planar regular image T on the UV plane.

In conclusion, the position and orientation of the UV coordinate system for forming the planar regular image T shown in FIG. 4 are determined unambiguously by setting parameters made up of three angles, that is, azimuthal angle α, zenithal angle β and planar inclination angle φ. These three angles are in general referred to as Euler angles (as described above, the planar inclination angle φ slightly differs in definition method from the conventional general planar inclination angle ψ).

Incidentally, the image conversion performed in the present invention is a coordinate conversion from the XY coordinate system to the UV coordinate system. Therefore, let us take a closer look at the geometric positional relationship between the XY coordinate system and the UV coordinate system. As shown in the perspective view of FIG. 6, when the distorted circular image S on the XY plane is inclined only by the zenithal angle β with respect to a direction shown by the azimuthal angle α, an inclined face S1 is obtained. In this instance, as shown in the figure, a normal vector n is defined in a direction from an origin O of the XY coordinate system to an origin G of the UV coordinate system and the inclined face S1 is subjected to parallel translation by a distance R in a direction of the normal vector n, by which a tangent plane S2 is obtained. The movement distance R is a radius of the distorted circular image S and also a radius of a virtual sphere H.

Figure 7:
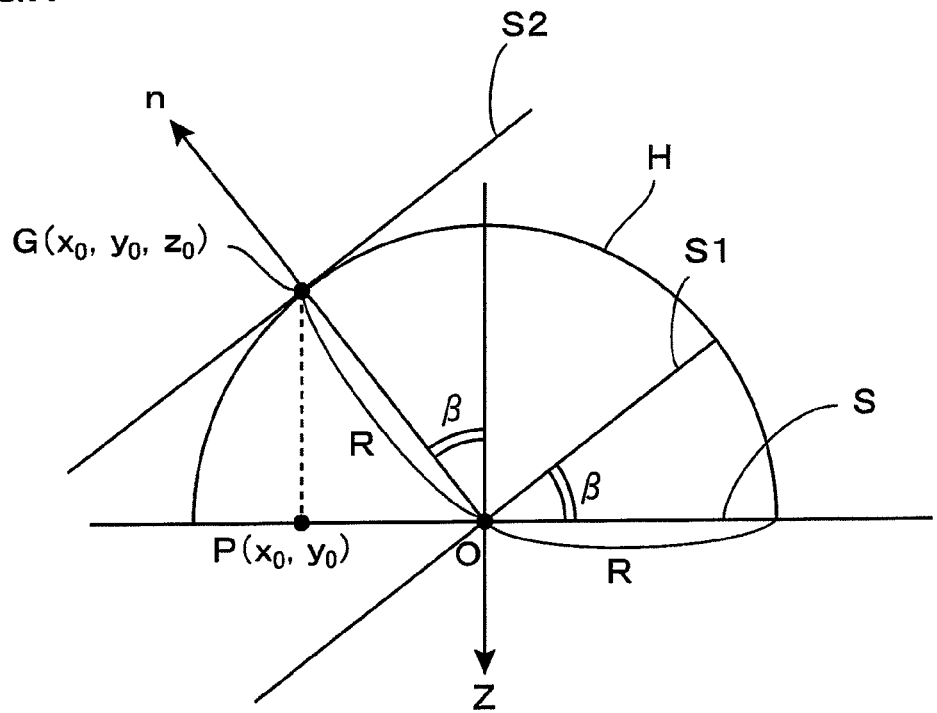
FIG. 7 is a view of individual constituents shown in the perspective view of FIG. 6, when viewed in the horizontal direction.
Figure 8:
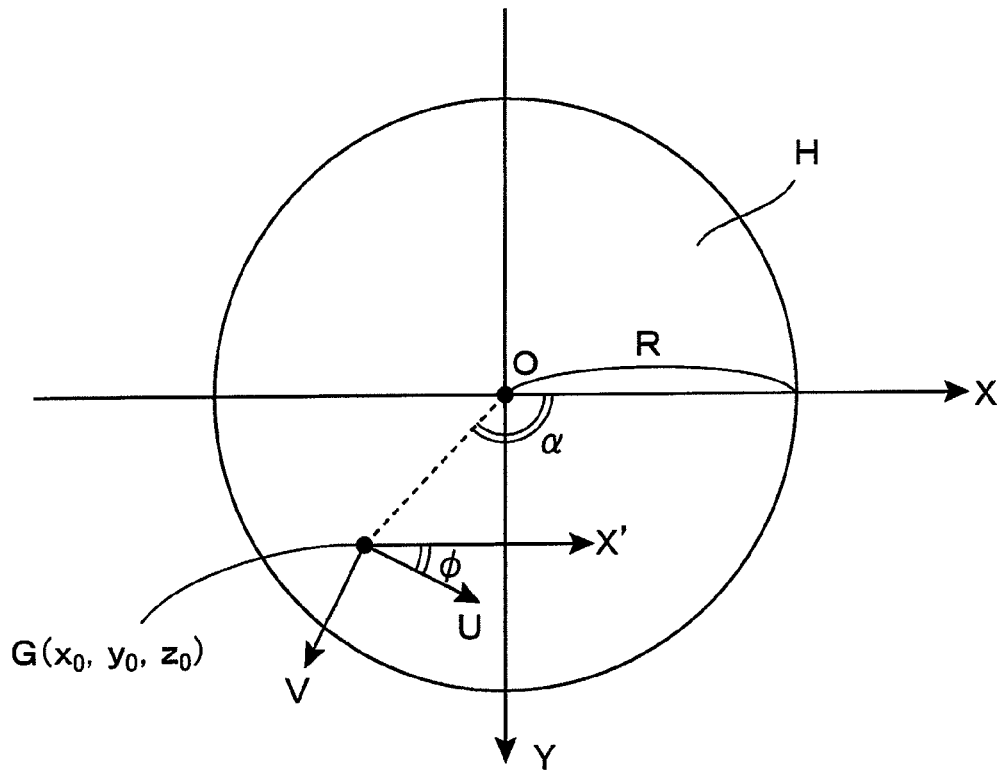
FIG. 8 is a view of individual constituents shown in the perspective view of FIG. 6, when viewed from above.

The tangent plane S2 is a plane in contact with the virtual sphere H at the point G, and the normal vector n is a vector indicating a normal line direction of the virtual sphere H at the point G. Then, the UV coordinate system is a coordinate system defined on the tangent plane S2 and a two-dimensional orthogonal coordinate system defined so that the point G is given as an origin and an angle formed between the U axis and the X' axis (an axis obtained by subjecting the X axis to parallel translation) is given as a planar inclination angle φ. FIG. 7 is a view of individual constituents shown in the perspective view of FIG. 6, when viewed in the horizontal direction. As described above, the point G ($x_0$, $y_0$, $z_0$) is a point determined as an intersecting point between a straight line passing through a cut-out center point P ($x_0$, $y_0$) defined on the distorted circular image S and parallel with the Z axis and the virtual sphere H, and the position thereof is determined by the azimuthal angle α and the zenithal angle β. On the other hand, FIG. 8 is a view of individual constituents shown in the perspective view of FIG. 6, when viewed from above. The intersecting point G ($x_0$, $y_0$, $z_0$) shown in the figure is a point on the virtual sphere H and positioned above the XY plane. Then, the UV coordinate system is defined on the tangent plane with respect to the virtual sphere H at the intersecting point G ($x_0$, $y_0$, $z_0$). In this instance, an orientation of the U axis is determined so that an angle formed between the U axis and the X axis is φ.

Figure 9:
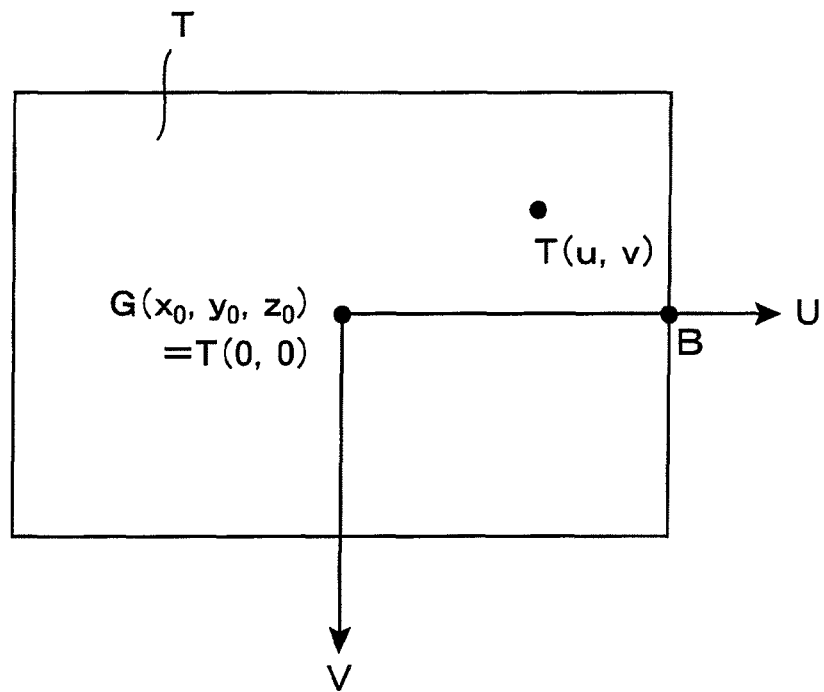
FIG. 9 is a plan view showing the planar regular image T defined on the UV coordinate system.
Figure 10:
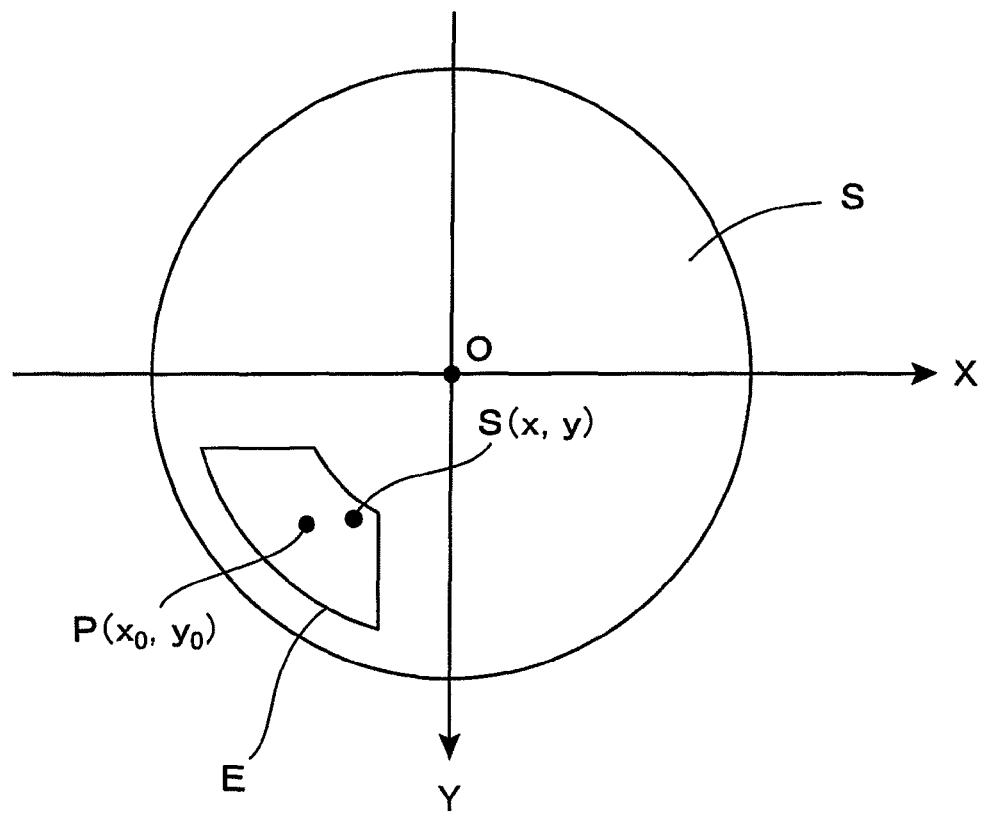
FIG. 10 is a plan view showing the distorted circular image S defined on the XY coordinate system.

FIG. 9 is a plan view showing a planar regular image T defined on the UV coordinate system. Herein, any given point on the planar regular image T is denoted as T (u, v) by using coordinate values u, v of the UV coordinate system. As described above, in the model shown in this figure, the position of an origin T (0, 0) of the UV coordinate system is in alignment with the point G ($x_0$, $y_0$, $z_0$). On the other hand, FIG. 10 is a plan view showing a distorted circular image S defined on the XY coordinate system. In this instance, any given point on the distorted circular image S is expressed as S (x, y) by using coordinate values x, y of the XY coordinate system.

As shown in FIG. 10, the image converter of the present invention is provided with a function that when a user designates a position of one point P ($x_0$, $y_0$) on the distorted circular image S as a cut-out center point (actually, as described later, the cut-out orientation is also designated), converts a distorted image inside a cut-out region E in the vicinity to the point P to output it as a planar regular image T defined on the UV coordinate system shown in FIG. 9. In order to perform the above image conversion, it is necessary to define a one-for-one correspondence relationship between one point T (u, v) on the UV coordinate system and one point S (x, y) on the XY coordinate system. This correspondence relationship can be actually realized as a transformation equation.

The above-described transformation equation can be unambiguously defined, if the position and orientation of the UV coordinate system arranged in the space of the three-dimensional XYZ coordinate system are determined. For example, it is assumed that a particular UV coordinate system as shown in FIG. 4 is defined and a certain planar regular image T is arranged thereon. In this case, the planar regular image T is considered as an object to be photographed and a fisheye lens corresponding to a model shown in the figure is used to photograph the object, thus making it possible to obtain a distorted circular image S on the XY plane. At this time, an image forming position S (x, y) on the distorted circular image S of any given point T (u, v) on the planar regular image T which is given as the object to be photographed can be determined on the basis of optical basic characteristics of the fisheye lens described in FIG. 1. More specifically, if such a point H (x, y, z) on the virtual sphere H that light L1 from the point T (u, v) is made incident from a normal line direction is determined, an image forming position is given as S (x, y).

In conclusion, if the position and orientation of the UV coordinate system is determined, it is possible to define a one-for-one correspondence relationship between one point T (u, v) on the UV coordinate system and one point S (x, y) on the XY coordinate system. This correspondence relationship can be expressed as transformation equations. An image conversion by which a portion of the distorted circular image S is converted to a planar regular image T can be performed by coordinate conversion operation using the transformation equations. For example, a pixel value of a pixel positioned at any one point T (u, v) on the planar regular image T shown in FIG. 9 can be determined on the basis of a pixel value of a pixel positioned at a corresponding point S (x, y) on the distorted circular image S shown in FIG. 10. This is a basic principle of the image conversion for converting a portion of a distorted circular image to a planar regular image.

<<<Section 2. Comparison of Transformation Equations>>>

As described above, transformation equations which allow one point T (u, v) on the UV coordinate system to correspond to one point S (x, y) on the XY coordinate system cannot be unambiguously defined, unless the position and orientation of the UV coordinate system arranged inside the space of the three-dimensional XYZ coordinate system are determined. It is, however, possible to define the transformation equations, as long as they include the position and orientation of the UV coordinate system as parameter values.

For example, transformation equations shown as equations (1) to (9) in FIG. 11 are disclosed in the above-described Patent Document WO92/21208. The transformation equations include parameters α, β indicating the position of the UV coordinate system and a parameter ψ indicating the orientation of the UV coordinate system. These three parameters are Euler angles described in Section 1, that is, an azimuthal angle α, a zenithal angle β and a planar inclination angle ψ. Herein, the planar inclination angle ψ is a parameter indicating a rotation factor defined by a conventional general method. Further, in FIG. 4, on the basis of "an axis passing through the point G parallel with the XY plane and orthogonal to the straight line OG (not illustrated)" which is given as a reference axis, it is an angle defined as an angle ψ formed between the reference axis and the U axis (as described above, in the present invention, instead of the angle ψ, an angle φ formed between the U axis and the X axis is used as shown in FIG. 4).

More specifically, the following equation $$x=R(uA+vB+wE)/\sqrt{(u^2+v^2+w^2)} \quad \text{equation (1)}$$

is to determine an x coordinate value of the corresponding point S (x, y) on the XY coordinate system by use coordinate values u, v at one point T (u, v) on the UV coordinate system. A, B and E are values respectively determined by the following mathematical equations.

$$A=\cos\psi\cos\alpha-\sin\psi\sin\alpha\cos\beta \quad \text{equation (3)}$$

$$B=-\sin\psi\cos\alpha-\cos\psi\sin\alpha\cos\beta \quad \text{equation (4)}$$

$$E=\sin\beta\sin\alpha \quad \text{equation (7)}.$$

They are determined by operation by use of trigonometric functions of Euler angles α, β, ψ.

In a similar manner, the following equation $$y=R(uC+vD+wF)/\sqrt{(u^2+v^2+w^2)} \quad \text{equation (2)}$$

is to determine a y coordinate value of the corresponding point S (x, y) on the XY coordinate system by use of coordinate values u, v at one point T (u, v) on the UV coordinate system. C, D and F are values respectively determined by the following mathematical equations.

$$C=\cos\psi\sin\alpha+\sin\psi\cos\alpha\cos\beta \quad \text{equation (5)}$$

$$D=-\sin\psi\sin\alpha+\cos\psi\cos\alpha\cos\beta \quad \text{equation (6)}$$

$$F=-\sin\beta\cos\alpha \quad \text{equation (8)}.$$

They are determined by operation by use of trigonometric functions of Euler angles α, β, ψ.

It is noted that w in the equations (1) and (2) is a value given by the following equation, $$w=mR \quad \text{equation (9)}$$

wherein R is a radius of the distorted circular image S, m is a conversion magnification. The conversion magnification m indicates a relationship between the scaling of coordinate values u, v and the scaling of coordinate values x, y. The greater the setting of the conversion magnification m, the greater an enlarged image is required for a planar regular image T. However, since there is actually a limit to the dimension of the planar regular image T (for example, the numbers of transverse and vertical pixels), the greater the setting of the conversion magnification m, the smaller, the cut-out region E of a distorted circular image S is.

In conclusion, in the equations shown in FIG. 11, a value of R is already known as a radius of the distorted circular image S, and a value of m is also known as a conversion magnification value designated by a user (or a previously fixed value). Thus, when the user designates Euler angles α, β, ψ, upon determination of the position and orientation of the UV coordinate system, unknown numbers for calculating the coordinate values x, y will be only u, v in the transformation equations shown in FIG. 11. Therefore, these transformation equations can be used to determine a corresponding point S (x, y) on the distorted circular image S which corresponds to any given one point T (u, v) on the planar regular image T.

The image converting method disclosed in the above-described Patent Document is to convert a portion of the distorted circular image S to the planar regular image T by use of the transformation equations shown in FIG. 11. However, as described above, there are found two problems in conventional image converters in which conversion operation is performed on the basis of the above transformation equations.

A first problem is operability from the point of view of a user. In order to perform operation on the basis of the transformation equations shown in FIG. 11, the user is required to perform an operation of designating Euler angles α, β, ψ. However, the Euler angles α, β, ψ are angles defined on a three-dimensional space, whereas the distorted circular image S actually seen by the user is an image displayed on a two-dimensional plane. Therefore, the manipulation of designating the three angles α, β, ψ as parameters is far from intuitive for the user. With this respect taken into account, the conventional image converter disclosed in the above-described Patent Document WO92/21208 is not necessarily an apparatus which can be easily handled by the user.

A second problem is a substantially great operation load in carrying out operation on the basis of the transformation equations shown in FIG. 11. The equations (3) to (8) shown in FIG. 11 include terms of many trigonometric functions. In general, the trigonometric function operation is a substantially great operation load for an operation unit and a computer. In particular, where conversion is required in real time, high-performance hardware enabling trigonometric function operation at a high speed is required, resulting in an inevitable increase in production costs accordingly.

The most important feature of the present invention is that instead of the conventional transformation equations shown in FIG. 11, to perform by use of the new transformation equations shown in FIG. 12 (hereinafter, referred to as the transformation equations of the present invention, and the mathematically deriving process thereof will be described in Section 7). All the operational equations are to determine a corresponding point S (x, y) on the distorted circular image S corresponding to any given one point T (u, v) in the planar regular image and common in respect that a pair of function values x, y can be determined by substituting a pair of variable values u, v. When the transformation equations of the present invention, which are shown as equations (11) to (19) in FIG. 12, are compared with the conventional transformation equations, which are shown as equations (1) to (9) in FIG. 11, it is apparent that the trigonometric functions appear substantially less frequently in the former. This is because among three angles, that is, an azimuthal angle, a zenithal angle and a planar inclination angle, the azimuthal angle and the zenithal angle are not used positively in the equations of FIG. 12.

More specifically, the following equation $$x = R[(u-x_0)A + (v-y_0)B + (w-z_0)E]/\sqrt{((u-x_0)^2 + (v-y_0)^2 + (w-z_0)^2)} \quad \text{equation (11)}$$

is to determine an x coordinate value of the corresponding point S (x, y) on the XY coordinate system by use of coordinate values u, v of one point T (u, v) on the UV coordinate system. In this instance, A, B, and E are values respectively determined by the following mathematical equations.

$$A = 1 - (1-\cos\phi)(y_0^2 + z_0^2) \quad \text{equation (13)}$$

$$B = -z_0 \sin\phi + x_0 y_0 (1-\cos\phi) \quad \text{equation (14)}$$

$$E = y_0 \sin\phi + z_0 x_0 (1-\cos\phi) \quad \text{equation (17)}$$

The trigonometric functions included in the above mathematical equations are only $\sin\phi$ and $\cos\phi$ with regard to the planar inclination angle $\phi$.

In a similar manner, the following equation $$y = R[(u-x_0)C + (v-y_0)D + (w-z_0)F]/\sqrt{((u-x_0)^2 + (v-y_0)^2 + (w-z_0)^2)} \quad \text{equation (12)}$$

is to determine a y coordinate value of the corresponding point S (x, y) on the XY by use of coordinate system coordinate values u, v of one point T (u, v) on the UV coordinate system. In this instance, C, D, and F are values determined respectively by the following mathematical equations.

$$C = z_0 \sin\phi + x_0 y_0 (1-\cos\phi) \quad \text{equation (15)}$$

$$D = 1 - (1-\cos\phi)(z_0^2 + x_0^2) \quad \text{equation (16).}$$

$$F = -x_0 \sin\phi + y_0 x_0 (1-\cos\phi) \quad \text{equation (18)}$$

The trigonometric functions included in the above mathematical equations are also only $\sin\phi$ and $\cos\phi$ with regard to the planar inclination angle $\phi$.

It is noted that w in the equations (11) and (12) is a value given by the following equation, $$w = mR \quad \text{equation (19),}$$

wherein R is a radius of the distorted circular images, and m is a conversion magnification, which are the same as those in the conventional transformation equations.

In conclusion, any of the trigonometric functions with regard to the azimuthal angle $\alpha$ and the zenithal angle $\delta$ included in the equations shown in FIG. 11 are not included in the equations shown in FIG. 12. Instead, coordinate values ($x_0$, $y_0$, $z_0$) of the point G are included in the equations shown in FIG. 12. This is because in the conventional equations shown in FIG. 11, the azimuthal angle $\alpha$ and the zenithal angle $\beta$ are used as parameters indicating a position of the UV coordinate system, while in the equations of the present invention shown in FIG. 12, coordinate values ($x_0$, $y_0$, $z_0$) of the point G are used.

As shown in FIG. 4, the point G ($x_0$, $y_0$, $z_0$) which is given as an origin of the UV coordinate system is defined as an intersecting point between a straight line passing through a cut-out center point P ($x_0$, $y_0$) and parallel with the Z axis and a virtual sphere H. In this instance, the position of the cut-out center point P ($x_0$, $y_0$) is a point set on the basis of the designation by a user (request for which portion of the distorted circular image S is cut out and converted to a planar regular image). Therefore, in conclusion, the intersecting point G ($x_0$, $y_0$, $z_0$) is also a point set according to the request of the user. Then, as a method for identifying the intersecting point G, the conventional equations shown in FIG. 11 are those in which two angles, that is, the azimuthal angle $\alpha$ and the zenithal angle $\beta$, are used, while the equations of the present invention shown in FIG. 12 use the coordinate values of ($x_0$, $y_0$, $z_0$). Further, by taking "an axis (not illustrated) passing through the point G parallel with the XY plane and also orthogonal to the straight line OG" as a reference axis in FIG. 4, the planar inclination angle $\psi$ used in the conventional equations shown in FIG. 11 is defined as an angle which is formed between said reference axis and the U axis. On the other hand, the planar inclination angle $\phi$ used in the equations of the present invention shown in FIG. 12 is defined as an angle which is formed between the U axis and the X' axis as shown in FIG. 4.

As described above, the conventional transformation equations (FIG. 11), in which a position of the intersecting point G is expressed by using the azimuthal angle $\alpha$ and the zenithal angle $\beta$ and the planar inclination angle $\psi$, are geometrically equivalent to the transformation equations (FIG. 12) of the present invention, in which a position of the intersecting point G is expressed by using the coordinate values ($x_0$, $y_0$, $z_0$) and the planar inclination angle $\phi$. However, there is found that a great difference exists between the above-described two sets of transformation equations in terms that operation is actually performed by using hardware constituted in combination with operation units and computer software. That is, in order to perform the operation by the conventional transformation equations (FIG. 11), it is necessary to perform many trigonometric function operations (equations (3) to (8)). On the other hand, the transformation equations (FIG. 12) of the present invention can be used to greatly reduce the load of trigonometric function operations (equations (13) to (18)).

Further, in view of the operability for a user, an operation for setting coordinate values ($x_0$, $y_0$, $z_0$) of the point G as parameters is much more intuitive than the operation for setting the azimuthal angle $\alpha$ and the zenithal angle $\beta$ as parameters, thereby providing a favorable operability. As described above, the point G is a point defined as an intersecting point between a straight line passing through a cut-out center point P ($x_0$, $y_0$) and parallel with the Z axis and the virtual sphere H. Thus, the user only designates a position of the cut-out center point P ($x_0$, $y_0$) on the distorted circular image S, thus making it possible to automatically determine a coordinate value $z_0$ by operation of the intersecting point. As a matter of course, the position of the cut-out center point P $(x_0, y_0)$ can be designated by an intuitive manipulation, for example, by clicking one point on the distorted circular image S displayed on an operation display. Further, as compared with the conventional planar inclination angle $\psi$, the planar inclination angle $\phi$ of the present invention is an angle always defined by taking a fixed axis or the X axis as a reference. Thus, as will be described in detail in Section 3, the user is able to designate intuitively the angle $\phi$ on the distorted circular image S.

As described above, in the image converter of the present invention, instead of operation on the basis of the conventional transformation equations (FIG. 11), the operation is performed on the basis of the transformation equations (FIG. 12) of the present invention. Therefore, when a distorted circular image S photographed by use of a fisheye lens is to be converted to a planar regular image T, necessary parameter setting is enabled by an intuitive manipulation of setting necessary parameters and also it is possible to relieve the operation load.

<<<Section 3: Method for Setting Parameters in the Present Invention>>>

In order to perform operation on the basis of the transformation equations of the present invention, as indicated in each of the equations shown in FIG. 12, it is necessary to set a planar inclination angle $\phi$, coordinate values $(x_0, y_0, z_0)$ of the intersecting point G, a radius R of the distorted circular image S, and a conversion magnification m, as parameters. In other words, if these parameters are known, predetermined variable values u, v are given to the equation (11) and the equation (12), thus making it possible to compute function values x, y. Thereby, it is possible to identify a corresponding point S (x, y) on the XY coordinate system which corresponds to any given one point T (u, v) on the UV coordinate system. Then, it is also possible to convert the distorted circular image S to the planar regular image T.

In this instance, among the above-described parameters $\phi$, $x_0$, $y_0$, $z_0$, R, and m, a value of $z_0$ can be automatically determined by geometric operation for determining the intersecting point, thereby eliminating the requirement of a user's input operation. Further, the radius R is a numerical value inherent to a fisheye lens used for photographing. Thus, if it is set to perform operation by use of the inherent value in advance, the user's input operation is not required. As a matter of course, if it is set to appropriately respond to distorted circular images photographed by using plural types of fisheye lenses different in the value of radius R, whenever necessary, the user may input a different value of R depending on a type of the fisheye lens used. This is also a simple operation of inputting numerical values, thereby giving only a slight operation load to the user.

Thus, in this instance, a unique embodiment will be described in which a user is allowed to efficiently set the remaining parameters $\phi$, $x_0$, $y_0$, and m. This embodiment is to propose an ideal man-to-machine interface between a user and an image converter.

Figure 13:
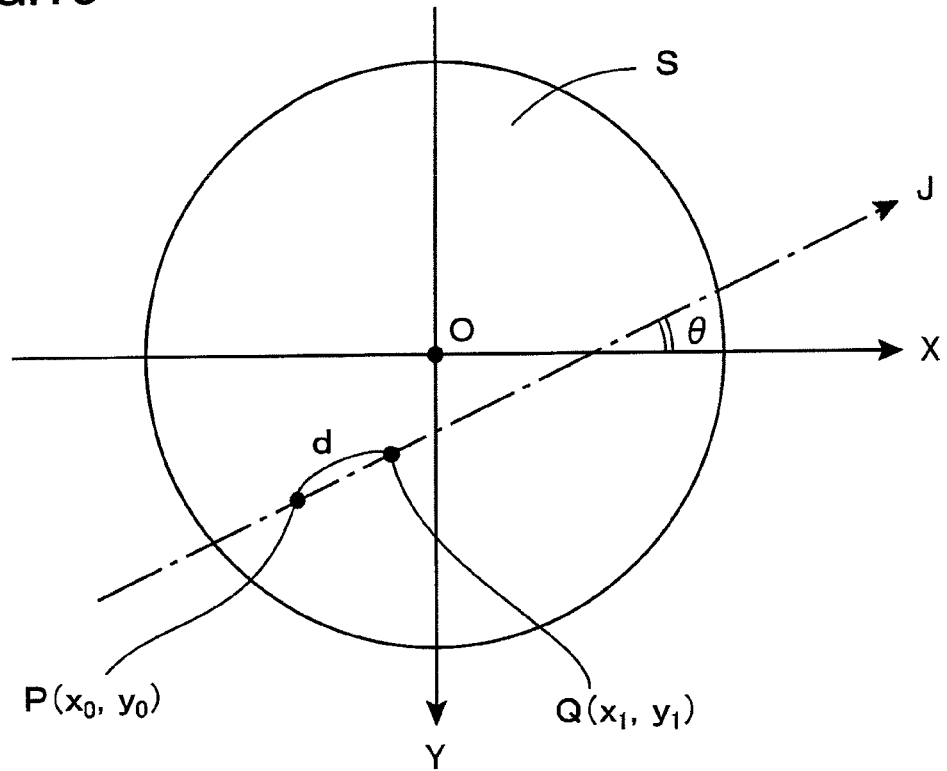
FIG. 13 is a plan view showing a principle for setting three parameters, that is, a cut-out center point P, an angle θ indicating the cut-out orientation (an angle used in determining the planar inclination angle φ) and a conversion magnification m by designating two points P, Q on the XY plane.

A method for setting parameters to be described here is characterized in that as shown in FIG. 13, a distorted circular image S defined on the XY coordinate system is presented to a user and two points P, Q are allowed to be designated on the image. In the method, it is possible to set values of the parameters $\phi$, $x_0$, $y_0$ and m on the basis of positional information on these two points P $(x_0, y_0)$ and Q $(x_1, y_1)$. Specifically, coordinate values $(x_0, y_0)$ of the point P are used as values of parameters $x_0$, $y_0$ as they are. Further, a value of distance d between the two points P and Q is utilized to determine a conversion magnification m. That is, the conversion magnification m is determined by a value of m=k/d by use of a predetermined proportional constant k. The distance d between the two points P and Q can be calculated by operation of $d=\sqrt{((x_0-x_1)^2+(y_0-y_1)^2)}$ by use of coordinate values $(x_0, y_0)$ of the point P and coordinate values $(x_1, y_1)$ of the point Q. Further, where a straight line connecting the points P and Q is given as a reference straight line J to determine an angle $\theta$ formed between the reference straight line J and the X axis (however, under the condition that $\theta=0°$ where both of them are parallel), the planar inclination angle $\phi$ can be determined on the basis of this angle $\theta$ (a specific method will be described later).

As described above, while looking at the distorted circular image S displayed on a display screen, a user performs an operation of designating the two points P, Q on the screen by a method, for example, clicking the mouse, thereby the four parameters $\phi$, $x_0$, $y_0$, and m are determined. Herein, let us consider the meaning of these two points P and Q. First, the point P is nothing but the cut-out center point P $(x_0, y_0)$ which has been described above. As shown in the example of FIG. 10, a distorted image inside a cut-out region E in the vicinity of the cut-out center point P $(x_0, y_0)$ designated by a user is to be converted to a planar regular image. Therefore, the user merely performs an operation of inputting his or her request for converting "a portion as the center" of the distorted circular image S to a regular image as a position of the cut-out center point P $(x_0, y_0)$.

On the other hand, the point Q is a point for designating "cut-out orientation" and "conversion magnification" and is referred to as an auxiliary point Q here. The "cut-out orientation" is determined on the basis of a positional relationship between the cut-out center point P and the auxiliary point Q. In other words, a reference straight line J connecting the two points P, Q is to indicate the "cut-out orientation." As will be described later, the planar inclination angle $\phi$ is determined on the basis of an angle $\theta$ formed between the reference straight line J and the X axis. Therefore, in conclusion, the orientation of the reference straight line J shown in FIG. 13 is a parameter which governs the orientation of the U axis shown in FIG. 5. If the reference straight line J rotates clockwise on the XY plane shown in FIG. 13, the U axis also rotates clockwise on the tangent plane shown in FIG. 5, and the cut-out region E shown in FIG. 10 also rotates clockwise. Therefore, after inputting to designate the position of the cut-out center point P $(x_0, y_0)$, a user performs an operation of designating the auxiliary point Q $(x_1, y_1)$ at a desired relative position with respect to the cut-out center point P $(x_0, y_0)$, thus making it possible to give a request for obtaining a planar regular image T corresponding to a part of a distorted circular image S to the image converter, as if telling the converter "This direction (direction along the line J) should become a transverse direction of the image T."

As described above, the "conversion magnification" is determined by an equation of m=k/d by use of the distance d between the two points P and Q. Where a planar regular image T is shown on a display screen, dimensions of the display region are usually fixed. Therefore, the greater the setting of the conversion magnification m, the greater the enlarged planar regular image T is displayed on a display. However, the cut-out region E corresponding to the displayed planar regular image T is decreased in area. Thus, where a value of proportional constant k is set to an appropriate value, with consideration given for the size of the display (in the case of the example shown here, the number of pixels on the screen corresponding to the U axis direction), it is possible to utilize the position of the auxiliary point Q as a parameter indicating approximately a boundary line of the cut-out region E.

Where the above method is used to set a value of each parameter, for example, the position of the cut-out center point P ($x_0$, $y_0$) of the distorted circular image S shown in FIG. 13 corresponds to an origin T (0, 0) of the planar regular image T shown in FIG. 9, the orientation of the reference straight line J shown in Fig. FIG. 13 corresponds to the orientation of the U axis shown in FIG. 9, and the position of the auxiliary point Q ($x_1$, $y_1$) corresponds to the boundary B shown in FIG. 9. In other words, assuming the desired planar regular image T shown in FIG. 9, a user merely designates a portion to be displayed at the position of the origin T (0, 0) as the cut-out center point P ($x_0$, $y_0$) on the distorted circular image S and also merely designates a portion to be displayed at the position of the boundary point B as the auxiliary point Q ($x_1$, $y_1$) on the distorted circular image S, thereby making it possible to perform an extremely intuitive input operation, with the desired planar regular image T taken into account.

Figure 14:
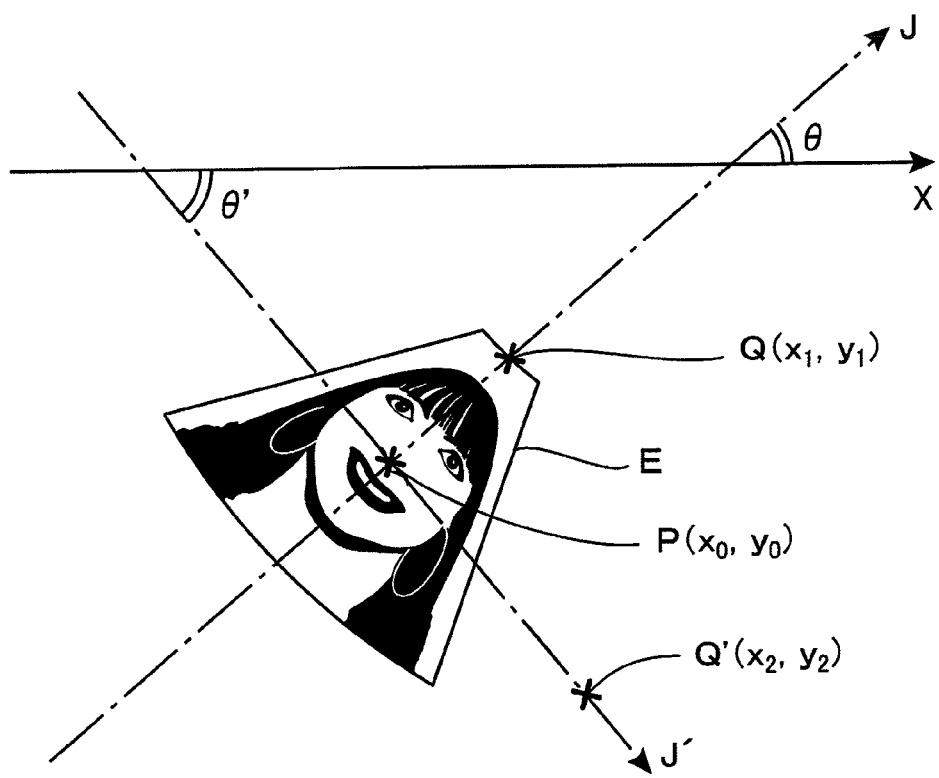
FIG. 14 is a plan view showing an example of setting three parameters, that is, the cut-out center point P, the angle θ indicating the cut-out orientation and the conversion magnification m by designating two points P, Q or two points P, Q' on a specific distorted circular image.

FIG. 14 is a plan view showing an example in which the two points P and Q are designated on a specific distorted circular image, thereby setting three parameters of the cut-out center point P, the angle θ indicating a cut-out orientation and the conversion magnification m. As shown in the figure in this example, only an image of a distorted face part of a womens is illustrated at a portion of a distorted circular image for the sake of explanation. Now, let us consider a case where a user desires to obtain a planar regular image T which corresponds to a cut-out region E surrounding the face. In this case, the user, first, merely designates the cut-out center point P ($x_0$, $y_0$) around the center of the face, and then performs an input operation of designating the auxiliary point Q ($x_1$, $y_1$) in the vicinity of the top of the head so that the reference straight line J is defined. By this user's designation procedure, an angle θ formed between the X axis and the reference straight line J is recognized as shown in the figure, and then the planar inclination angle φ is determined on the basis of the angle θ, thereby the position and orientation of the UV coordinate system (orientation of the U axis) are determined.

Figure 15:
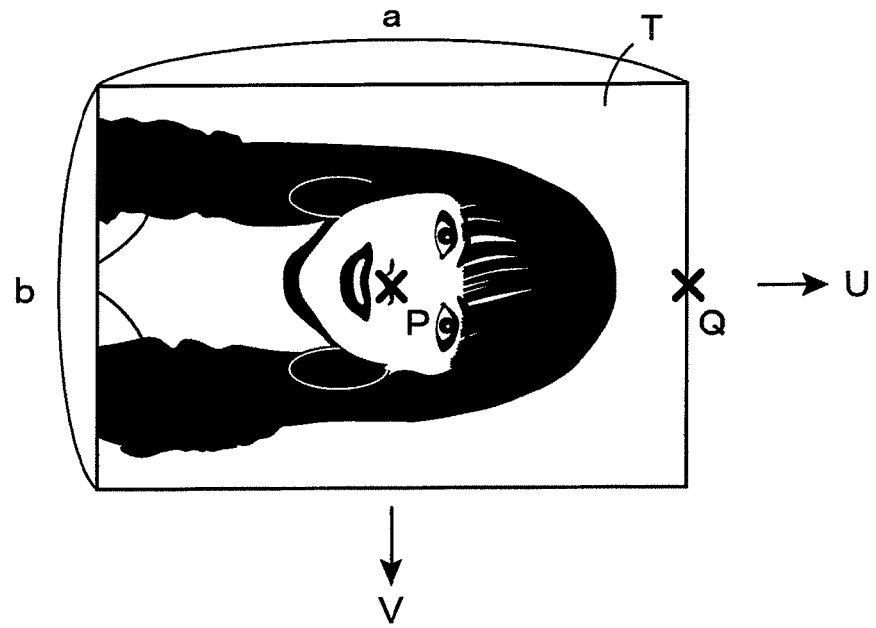
FIG. 15 is a plan view showing the planar regular image T obtained where two points P, Q are designated in the example shown in FIG. 14.

FIG. 15 is a plan view showing the planar regular image T obtained by setting these parameters. The points P, Q shown in FIG. 15 correspond to the cut-out center point P ($x_0$, $y_0$) and the auxiliary point Q ($x_1$, $y_1$) shown in FIG. 14. The face displayed on the planar regular image T is facing the transverse orientation. This is because the position of the auxiliary point Q ($x_1$, $y_1$) is designated in the vicinity of the top of the head in FIG. 14. More specifically, this is because an image is converted in such a manner that the direction of the reference straight line J connecting two points P, Q shown in FIG. 14 is given as the direction of the U axis on the planar regular image T.

When it is desired to obtain a face stood upright on the planar regular image T, a user, in FIG. 14, merely designates the cut-out center point P ($x_0$, $y_0$) around the center of the face and then performs an input operation of designating an auxiliary point Q' ($x_2$, $y_2$) at a remote position on the right side of the face so that a reference straight line J' is defined as shown in the figure. In this case, an angle θ' formed between the X axis and the reference straight line J' is recognized, and then the planar inclination angle φ is determined on the basis of the angle θ', thereby the position and orientation of the UV coordinate system (orientation of the U axis) are determined.

Figure 16:
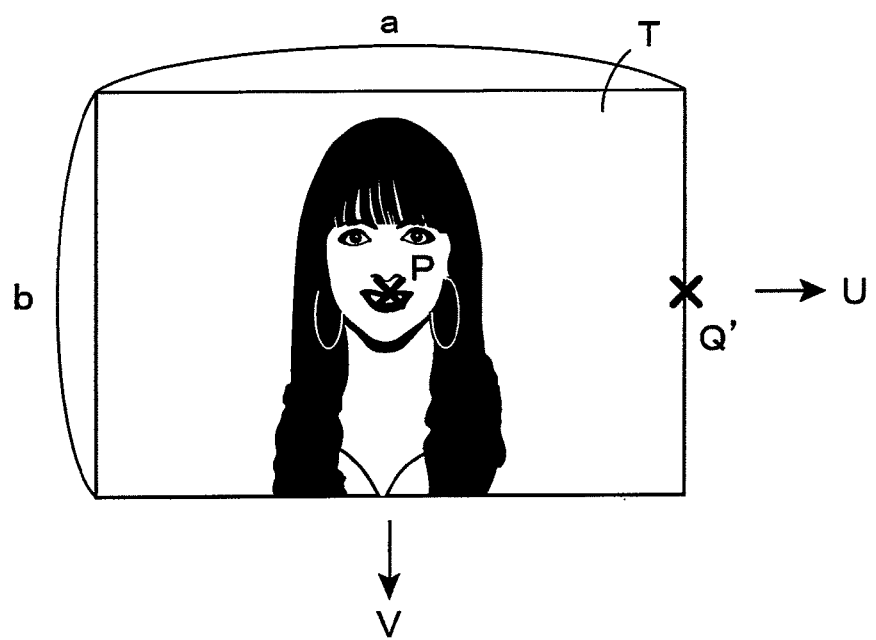
FIG. 16 is a plan view showing the planar regular image T obtained where two points P, Q' are designated in the example shown in FIG. 14.

FIG. 16 is a plan view showing the planar regular image T obtained by setting these parameters. The points P, Q' shown in FIG. 16 correspond to the cut-out center point P ($x_0$, $y_0$) and the auxiliary point Q' ($x_2$, $y_2$) shown in FIG. 14. In FIG. 16, the face displayed on the planar regular image T is an upright standing image. This is because the position of the auxiliary point Q' ($x_2$, $y_2$) is designated at a remote position on the right side of the face in FIG. 14. More specifically, this is because the image is converted in such a manner that the direction of the reference straight line J' connecting two points P, Q' shown in FIG. 14 is given as the direction of the U axis on the planar regular image T.

Both the images shown in FIG. 15 and in FIG. 16 are displayed on the same display. In both of them, the transverse dimension is given as "a" (the number of pixels in the horizontal direction is "a") and the vertical dimension is given as "b" (the number of pixels in the perpendicular direction is "b"). It should be noted that the value of the conversion magnification m differs between the both images. The image shown in FIG. 15 is enlarged to a greater extent than that shown in FIG. 16. This is because in FIG. 14, the positions of the auxiliary points are designated so that a distance between the two points P, Q' is made greater than a distance between the two points P, Q. The cut-out region E in the case of designating the auxiliary point Q ($x_1$, $y_1$) in FIG. 14 is shown in the figure in the drawing. However, the cut-out region E' (not illustrated) in the case of designating the auxiliary point Q'($x_2$, $y_2$) is given as a region greater than the cut-out region E. Therefore, a magnification of the picture shown in FIG. 16 displaying a regular image of the cut-out E' is lower than that of the picture shown in FIG. 15 displaying the regular image of the cut-out image E.

As described above, the conversion magnification m is determined by an equation of m=k/d by use of a distance d between the two points P and Q, the proportional constant k is set to be an appropriate value, thereby, it is possible to utilize the position of the auxiliary point Q as a parameter for determining the boundary of the planar regular image T. This is favorable in providing a user with an intuitive input operation. It becomes possible for the user to obtain the planar regular image T corresponding to the desired cut-out region E by performing an input operation of designating the positions of the cut-out center point P ($x_0$, $y_0$) and the auxiliary point Q ($x_1$, $y_1$) on the distorted circular image S as points corresponding to the positions of the origin T (0,0) and the boundary point B on the desired planar regular image T shown in FIG. 9.

Figures 17, 18:
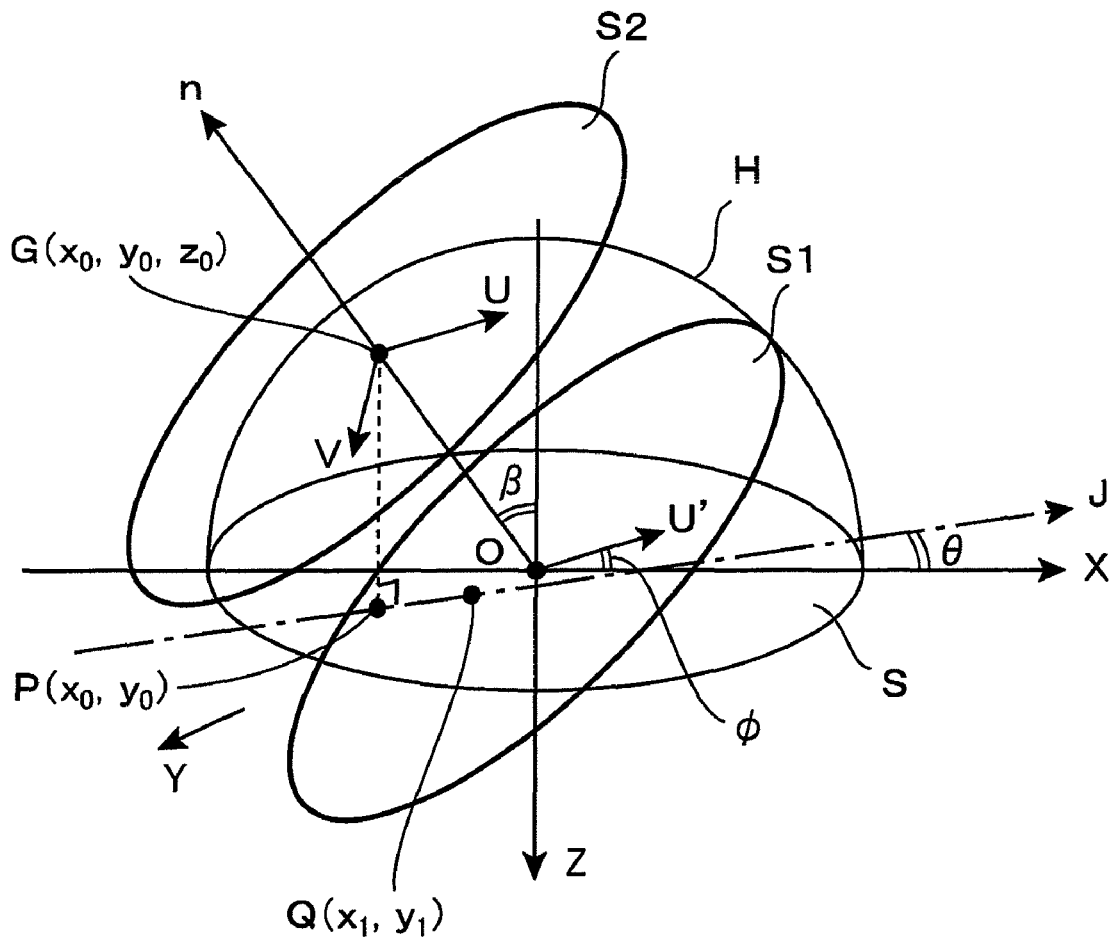
FIG. 17 is a perspective view showing a relationship between the angle θ indicating the cut-out orientation and the planar inclination angle φ shown in FIG. 13.
FIG. 18 is a view showing an operational equation for calculating the planar inclination angle φ on the basis of the angle θ indicating the cut-out orientation.

Finally, a description is given for a specific method for determining the planar inclination angle φ on the basis of the angle θ indicating a cut-out orientation (an angle formed between the reference straight line J and the X axis shown in FIG. 13, and θ=0° where both of them are parallel). FIG. 17 is a perspective view showing a relationship between the angle θ and the planar inclination angle φ. The angle θ is formed between the reference straight line J positioned on the XY plane and the X axis, while the planar inclination angle φ is defined as an angle formed between a vector U facing the U axis on the UV plane and a vector X facing the X axis on the XY plane. In FIG. 17, consideration is made for the U' axis (vector U') which is obtained by parallel translation of the U axis on the tangent plane S1 up to on the inclined face S1. The planar inclination angle φ is defined as an angle formed between the U' axis and the X axis as shown in the figure.

As described above, the reference straight line J is a straight line on the XY plane, while the U' axis is an axis on the inclined face S1. Therefore, when the zenithal angle β is equal to zero, the relationship of θ=φ is met. However, when β is greater than zero, they are not equal. In order to determine an exact value of the planar inclination angle φ on the basis of the angle θ, as shown in FIG. 18, it is necessary to perform operation by using the operational equation given below in which the azimuthal angle α and the zenithal angle β are used as parameters.

$$f=f(\theta) \qquad \text{equation (21)}$$

Figure 6:
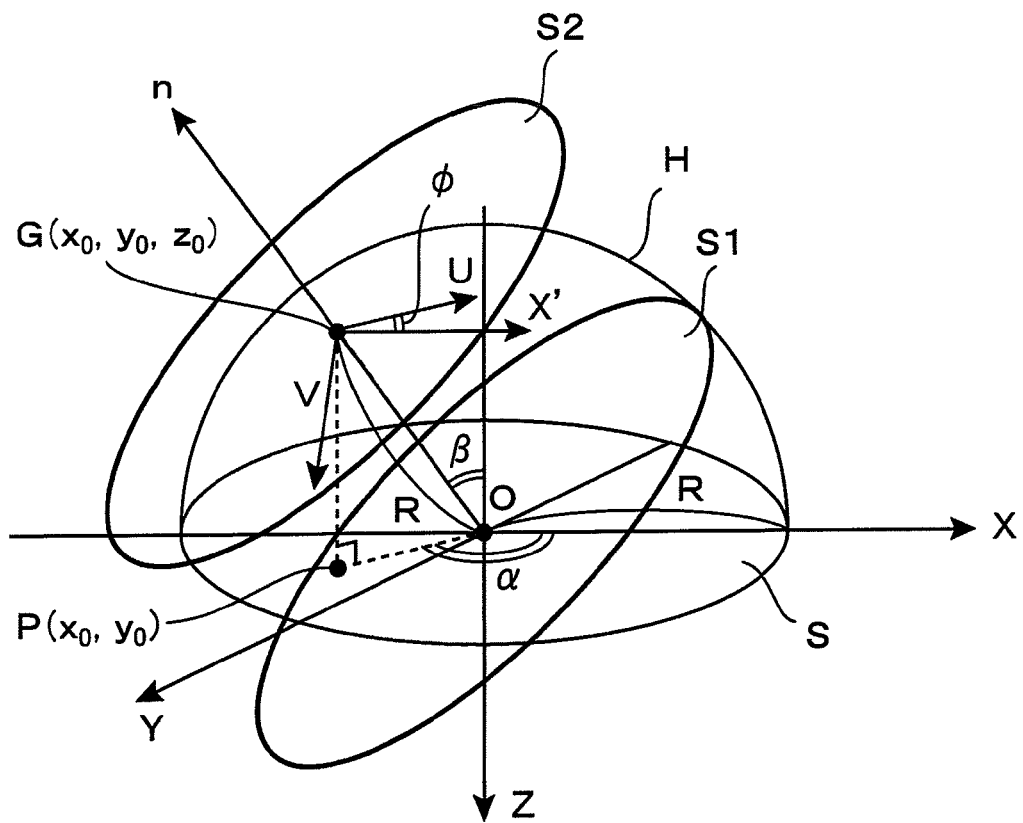
FIG. 6 is a perspective view showing a principle of coordinate conversion from the XY coordinate system to the UV coordinate system.

(a function f is to be determined unambiguously on the basis of the geometric arrangements shown in FIG. 6 and FIG. 17, and they are shown by complicated equations using trigonometric functions).

It is noted that in practice, no serious difficulty occurs when the angle θ indicating the cut-out orientation is approximately used as the planar inclination angle φ. This is because the planar inclination angle φ used in the present invention is, as shown in FIG. 4, an angle defined as an angle formed between the U axis and the X' axis or an angle defined on the basis of the X axis. As a matter of course, when a value of the angle θ is used approximately as a value of the planar inclination angle φ, a slight deviation occurs between the direction of the U axis intended by a user (the cut-out direction indicated by the reference straight line J) and the actually defined direction of the U axis of the UV coordinate system. For this reason, the actually obtained planar regular image T slightly differs from an image inside the cut-out region E intended by the user. However, this difference is only a difference in the trimming frame of the image. Further, the direction of the reference straight line J (that is, the position of the auxiliary point Q) designated by the user is usually only an index indicating a rough cut-out direction desired by the user. Thus, even if the cut-out direction is actually deviated to some extent, no uncomfortable feeling is given for the user in reality. For these reasons, in a general embodiment of the present invention, no problem is imposed, if the angle θ indicating the cut-out orientation is approximated, as it is, as a value of the planar inclination angle φ.

<<<Section 4: Basic Constitution of the Image Converter>>>

Figure 19:
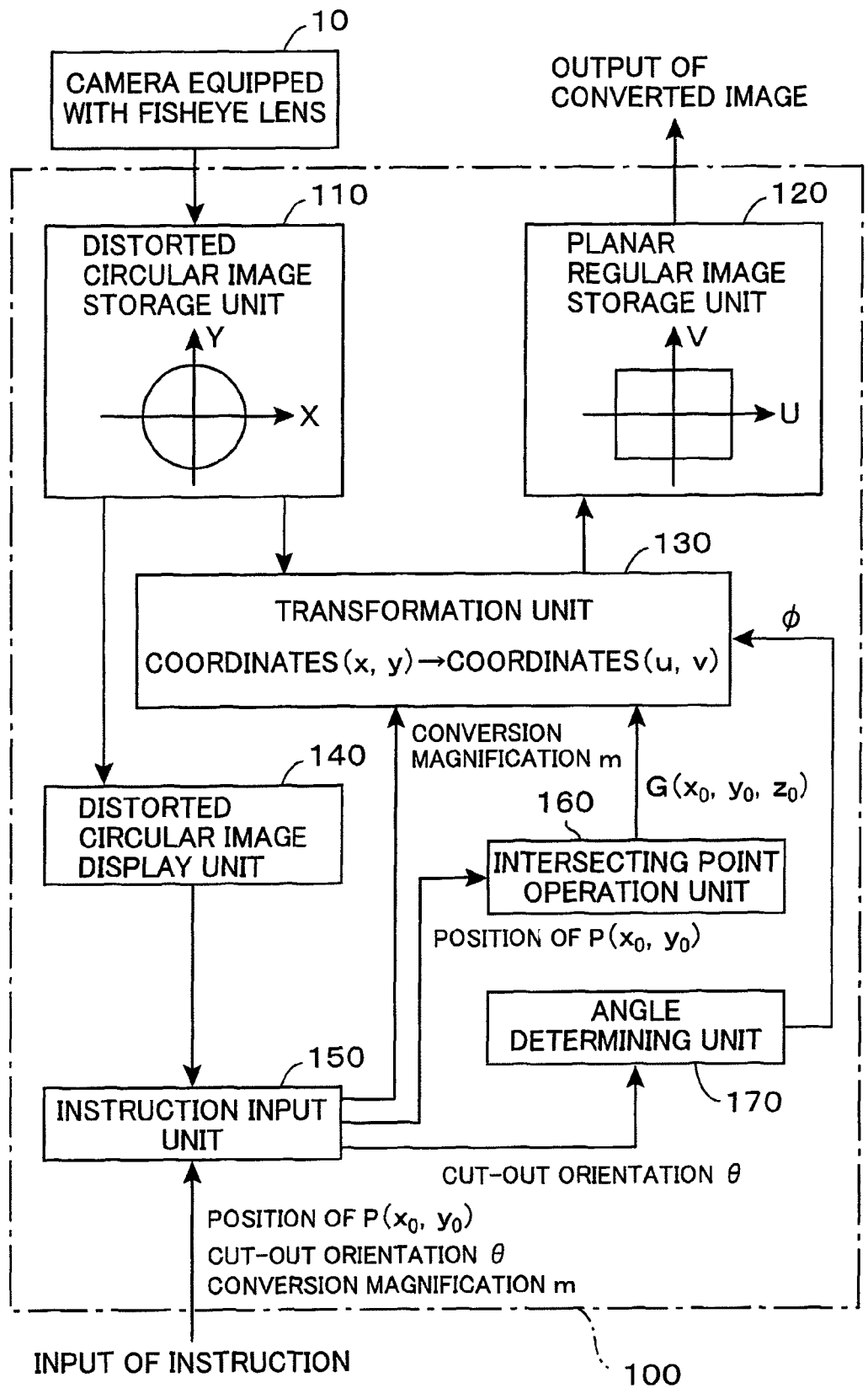
FIG. 19 is a block diagram showing a basic constitution of the image converter of the present invention.

Here, a description is given for a basic constitution of the image converter in a basic embodiment of the present invention by referring to the block diagram of FIG. 19. In FIG. 19, a portion surrounded by the dotted and dashed line is an image converter 100 according to the present invention. This apparatus has a function of cutting out a part of a distorted circular image S photographed by use of a fisheye lens and converting it into a planar regular image T. In FIG. 19, the distorted circular image S photographed by a camera 10 equipped with a fisheye lens is taken into the image converter 100 as digital data.

A distorted circular image storage unit 110 is a constituent for storing the distorted circular image S and constituted with storage devices such as a memory and a hard disk drive. In this instance, the distorted circular image S is a circular image as shown in FIG. 2, for example, which is constituted with aggregates of many pixels arranged at a position indicated by coordinates (x, y) on the two-dimensional XY orthogonal coordinate system and provided with a radius R by taking an origin O of the XY coordinate system as the center.

On the other hand, a planar regular image storage unit 120 is a constituent for storing the planar regular image T after conversion as digital data and also constituted with storage devices such as a memory and a hard disk drive. In this instance, the planar regular image T is a rectangular image as shown in FIG. 15 or FIG. 16, for example, which is constituted with aggregates of many pixels arranged at a position indicated by coordinates (u, v) on the two-dimensional UV orthogonal coordinate system. The planar regular image T stored in the planar regular image storage unit 120 is output as digital data of a converted image, thus making it possible to display the planar regular images T as shown in FIG. 15 or FIG. 16 on a display screen.

A transformation unit 130 having functions for allowing the coordinates (u, v) to correspond to the coordinates (x, y) by utilizing the transformation equations of the present invention shown in FIG. 12 and for determining a pixel value of the pixel on the planar regular image T arranged at a position indicated by the coordinates (u, v) on the basis of the pixel value of a reference pixel on the distorted circular image S arranged at a position indicated by the corresponding coordinates (x, y), performs operation for forming the planar regular image T on the basis of the distorted circular image S stored in the distorted circular image storage unit 110, thereby storing the thus formed planar regular image T in the planar regular image storage unit 120. As described in Section 2, in order to perform the operation on the basis of the transformation equations of the present invention, it is necessary to set some parameters. The constituents shown below are to set the parameters.

A distorted circular image display unit 140 is a constituent for displaying on a display the distorted circular image S stored in the distorted circular image storage unit 110, and an image shown in FIG. 2 is displayed on a display screen.

An instruction input unit 150 enters instructions for designating positions of two points of the cut-out center point P and the auxiliary point Q as shown in FIG. 13 on the distorted circular image S displayed on the display. Specifically, the instruction input unit 150 is constituted with pointing devices such as a mouse with a controller for controlling them, and has functions for allowing a user to move the pointer on a display screen by use of a mouse and reading position coordinates of the pointer at the time when manipulations such as clicking the mouse are operated.

For example, a position of the pointer when clicked for the first time by a user is incorporated as a position of the cut-out center point P, and a position of the pointer when clicked for the second time is incorporated as a position of the auxiliary point Q. Thus, the user clicks the mouse two times in a row, thereby making it possible to enter instructions of the positions of the cut-out center point P and the auxiliary point Q. Alternatively, a manipulation of "drag and drop" can be used to designate the two points, In this case, the position of the pointer when the user has depressed a mouse button can be taken as the position of the cut-out center point P. Then the pointer is moved, with the mouse button kept depressed by the user, and a position of the pointer when the mouse button is released can be taken as a position of the auxiliary point Q.

More specifically, the instruction input unit 150 may be constituted with any device, for example, as long as these are capable of incorporating the coordinate values P ($x_0$, $y_0$) and Q ($x_1$, $y_1$), on the basis of instruction input by a user to designate the positions of the cut-out center point P and the auxiliary point Q on the distorted circular image S displayed by the distorted circular image display unit 140.

The positions of the two points P and Q input by the instruction input unit 150 are, as already described in Section 3, utilized for setting three parameters, that is, the position of the cut-out center point P, the angle θ indicating the cut-out orientation, and the conversion magnification m. First, coordinate values ($x_0$, $y_0$) of the point P are used, as they are, as the position of the cut-out center point P. Further, a value of the angle θ is determined as an angle formed between the reference straight line J connecting the two points P, Q and the X axis. In reality, the value of the angle θ can be calculated by geometric operation using the coordinate values P ($x_0$, $y_0$) and Q ($x_1$, $y_1$). Then, the conversion magnification m can be calculated by operation of m=k/d by use of the predetermined proportional constant k after a distance d between two points P, Q is calculated by operation of $d=\sqrt{((x_0-x_1)^2+(y_0-y_1)^2)}$.

When the conversion magnification m is given as a fixed value, this fixed value m may be set in the transformation unit 130, thereby eliminating the requirement of determining a value of m in the instruction input unit 150. In this case, the conversion magnification m is not a parameter which can be designated by a user. An operation performed by the user to designate the position of the auxiliary point Q is only helpful in designating the angle θ indicating the cut-out orientation (that is, the orientation of the reference straight line J) and a distance d between the two points P and Q is not helpful at all. In other words, in this case, the instruction input unit 150 has a function only for entering the position and cut-out orientation of the cut-out center point P on the basis of the instructions by the user and does not have a function for entering the conversion magnification m.

However, in practice, operability is improved, if the conversion magnification m is not fixed but made variable according to the request of a user, thereby obtaining a planar regular image T which has been subjected to scaling on the basis of the conversion magnification m. Therefore, in a practical embodiment, as described above, it is preferable that the instruction input unit 150 is allowed to have a function of entering the conversion magnification m on the basis of the instructions by the user and the transformation unit 130 performs the operation by using the conversion magnification m input by the instruction input unit 150.

An intersecting point operation unit 160 conducts processing for determining position coordinates $(x_0, y_0, z_0)$ of the point G on the basis of the position $(x_0, y_0)$ of the cut-out center point P input by the instruction input unit 150. Herein, as shown in FIG. 4, when, a virtual sphere H with the radius R taking the origin O as the center is defined in the three-dimensional XYZ orthogonal coordinate system, the point G is a point given as an intersecting point between a straight line passing through the cut-out center point P and parallel with the Z axis and the virtual sphere H. In reality, since the coordinate values $x_0, y_0$ of the point P are the same value as the coordinate values $x_0, y_0$ of the point G, the operation processing to be performed by the intersecting point operation unit 160 is only geometric operation for determining a coordinate value $z_0$ of the point G.

On the other hand, as shown in FIG. 4, an angle determining unit 170 conducts processing for determining the planar inclination angle φ given as an angle formed between a vector U facing the direction of the U axis of the two-dimensional UV orthogonal coordinate system to be defined on a tangent plane in contact with the virtual sphere H at the intersecting point G $(x_0, y_0, z_0)$ and a vector X facing the direction of the X axis of the two-dimensional XY orthogonal coordinate system, on the basis of a cut-out orientation (that is, an angle θ) input by the instruction input unit 150. Since a relationship between the angle θ and the angle φ is defined by the equation shown in FIG. 18, the angle determining unit 170 may calculate the planar inclination angle φ on the basis of the equation. However, in reality, as described in Section 3, no problem should result, if the angle θ indicating the cut-out orientation is approximated, as it is, as a value of the planar inclination angle φ. In this case, the angle determining unit 170 may conduct processing for giving the angle θ formed between the reference straight line J and the X axis to the transformation unit 130 as the planar inclination angle φ as it is.

Now, as described in Section 2, the transformation equations of the present invention shown in FIG. 12 are equations based on the orthogonal projection method which include the position coordinates $(x_0, y_0, z_0)$ and the planar inclination angle φ as parameters. In order for the transformation unit 130 to determine coordinates (x, y) corresponding to coordinates (u, v) by utilizing the transformation equations, it is necessary to determine six parameters, that is, , $x_0, y_0, z_0$, R, and m. Herein, the parameter φ is given from the angle determining unit 170, the parameters $x_0, y_0, z_0$ are given from the intersecting point operation unit 160, and the parameter m is given from the instruction input unit 150. Then, the parameter R is known as a radius value of the distorted circular image S stored in the distorted circular image storage unit 110.

In conclusion, the transformation unit 130 is provided with all the above-described six parameters φ, $x_0, y_0, z_0$, R, and m. Then, the transformation unit 130 is able to perform the operation processing for forming the planar regular image T with regard to a partial image cut out from the distorted circular image S in an orientation indicated by the planar inclination angle φ taking the cut-out center point P as a center by determining a pixel value of the pixel on the planar regular image T arranged at a position indicated by the coordinates (u, v) on the basis of a pixel value of the reference pixel on the distorted circular image S arranged at a position indicated by the corresponding coordinates (x, y).

The distorted circular image S is an image constituted with aggregates of many pixels arranged at a position indicated by coordinates (x, y) on the two-dimensional XY orthogonal coordinate system. In reality, it is constituted with digital data which defines individually inherent pixel values at positions of many lattice points arrayed vertically and transversely at a predetermined pitch. Therefore, a position of the corresponding coordinates (x, y) obtained as operation results by the transformation unit 130 is usually positioned between a plurality of lattice points. For example, when the distorted circular image S is constituted with digital data which defines pixel values of many lattice points arrayed vertically and transversely at a unit pitch of 1, any of the lattice points will be an integer value in terms of the coordinate value thereof. Therefore, if values of the corresponding coordinates x and y obtained as the operation results by the transformation unit 130 are values including a decimal fraction (this will be expected in most cases), the position of the corresponding coordinates (x, y) is positioned between a plurality of lattice points. It is, therefore, impossible to determine only one corresponding pixel value.

Thus, in reality, when the transformation unit 130 determines a pixel value of the pixel on the planar regular image T arranged at a position indicated by the coordinates (u, v), it is necessary to perform interpolation for pixel values of a plurality of reference pixels on the distorted circular image S arranged in the vicinity of a position indicated by the corresponding coordinates (x, y). Since many methods to perform this interpolation are known such as the bilinear interpolation method and the bicubic/spline interpolation method, a detailed description thereof will be omitted here. Where a camera with a built-in single plate image pickup device is used as a camera 10, it is quite preferable to use image data so-called RAW mode data as the distorted circular image S so as to conduct a highly-accurate interpolation. Further, since there are some products chromatic aberration of which is distinguished according to the fisheye lens, it is possible to measure chromatic aberration of the fisheye lens which has been used in advance and to perform operation for interpolating chromatic aberration at the time of operation by the transformation unit 130.

The image converter of the present invention is optimally applicable to systems in which a fisheye lens is assembled into, in particular, a monitoring camera, a conference room camera, a vehicle-mounted camera, an intratubular probe camera or others. In these systems, dynamic images must be handled in real time and an image inside a cut-out region designated by a user at his or her option must be instantly converted to a planar regular image and displayed. In the image converter of the present invention, the operation load is greatly relieved, thus making it possible to convert an image to a planar regular image in real time.

A description has been given for a basic constitution of the image converter related to the basic embodiment of the present invention by referring to the block diagram of FIG. 19. This image converter can be constituted by incorporating special programs into a general purpose computer. In this case, the distorted circular image storage unit 110 and the planar regular image storage unit 120 may be constituted with storage devices for the computer, while the distorted circular image display unit 140 and the instruction input unit 150 may be constituted with a display and a mouse for the computer as well as hardware and software for controlling them. Further, the transformation unit 130, the intersecting point operation unit 160 and the angle determining unit 170 are to be realized by the operation function of the computer on the basis of special programs.

As a matter of course, the image converter may also be constituted with a special hardware logical circuit in combination with various operation units, resistors and others. Specifically, a portion which acts at least as the transformation unit 130 is constituted with an electronic circuit and a semiconductor integrated circuit in which the electronic circuit is incorporated may be designed. Various modes of ingenuity effective in constituting the transformation unit 130 with the above-described hardware logical circuit will be described in Section 6.

Further, the image converter 100 shown in FIG. 19, the fisheye lens camera 10 and a monitoring device (not illustrated) are provided. Then, the distorted circular image S photographed by using the camera 10 is stored in the distorted circular image storage unit 110, and the planar regular image T obtained at the planar regular image storage unit 120 is displayed by the monitoring device, by which it is possible to realize a fisheye lens monitoring system. The use of a digital video camera as the camera 10 will allow any part of a planar regular image to be displayed on the screen of the monitoring device in real time on the basis of a distorted circular image photographed in real time.

<<<Section 5: Application to Non-Orthogonally Projected Image>>>

The most important feature of the present invention is, as described in Section 2, that the coordinate conversion is operated by using the transformation equations shown in FIG. 12. The transformation equations are based on the orthogonal projection method and on the assumption that the projection of an fisheye lens used in photographing is based on the orthogonal projection method. However, commercially available fisheye lenses are in reality not necessarily lenses based on the orthogonal projection method. There are actually known various projection methods for fisheye lenses such as the equidistance projection method, sterographic projection method and equisolid angle projection method. Thus, fisheye lenses based on these various projections methods are used depending on an application. Herein, a description will be given for a method for applying the present invention to a non-orthogonally projected image photographed by use of a fisheye lens based on a non-orthogonal projection method.

Figure 20:
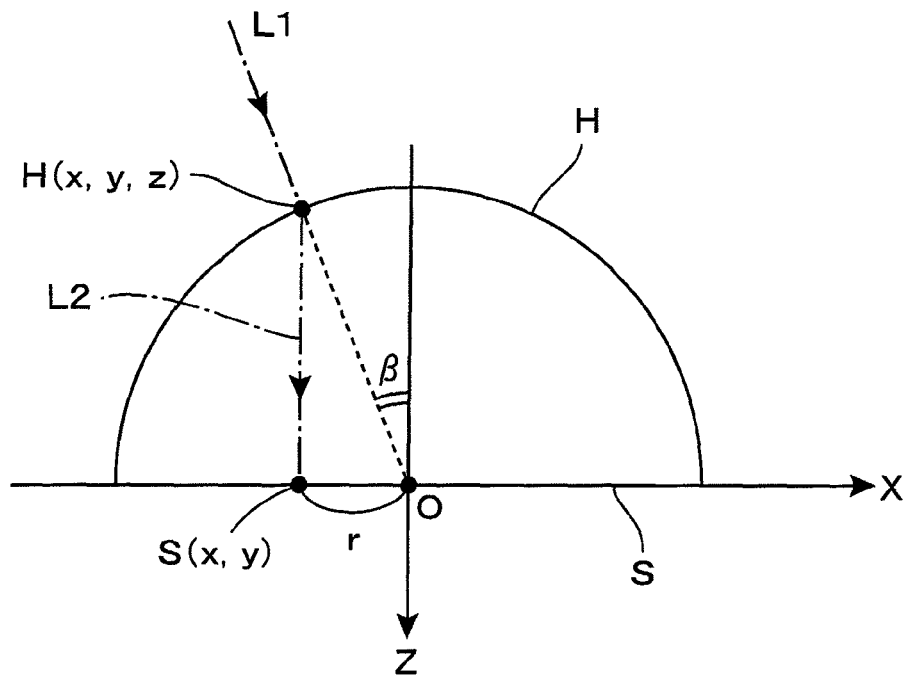
FIG. 20 is a front elevational view showing a projection state of incident light in a fisheye lens based on the orthogonal projection method.

As already described, the optical characteristics of a fisheye lens based on the orthogonal projection method may be explained by referring to a model shown in FIG. 1. More specifically, the characteristics are incident light L1 being made incident from the normal line direction to any given incident point H (x, y, z) on a virtual sphere H reaching a point S (x, y) on the XY plane, as incident light L2 proceeding in a direction parallel with the Z axis. FIG. 20 is a front elevational view showing the projection state of the incident light in a fisheye lens based on the orthogonal projection method. As shown in the figure, the incident light L1 made incident from the normal line direction to the incident point H (x, y, z) on the virtual sphere H having a zenithal angle $\beta$ has reached the point S (x, y) on the XY plane, as the incident light L2 proceeding in a direction parallel with the Z axis.

In this instance, the relationship between the zenithal angle $\beta$ of the incident point H (x, y, z) and a distance r between an origin O and a reaching point S (x, y), at which the incident light L2 passing through the incident point H (x, y, z) reaches the XY plane, is expressed by the equation of $r=f\cdot\sin\beta$ in the case of an orthogonally projected image photographed by use of a fisheye lens based on the orthogonal projection method. In this instance, f is a constant number inherent to the fisheye lens. On the other hand, for example, in the case of an equidistantly projected image photographed by use of a fisheye lens based on the equidistance projection method, the relationship between them will be expressed by the equation of $r=f\cdot\beta$.

Figure 21:
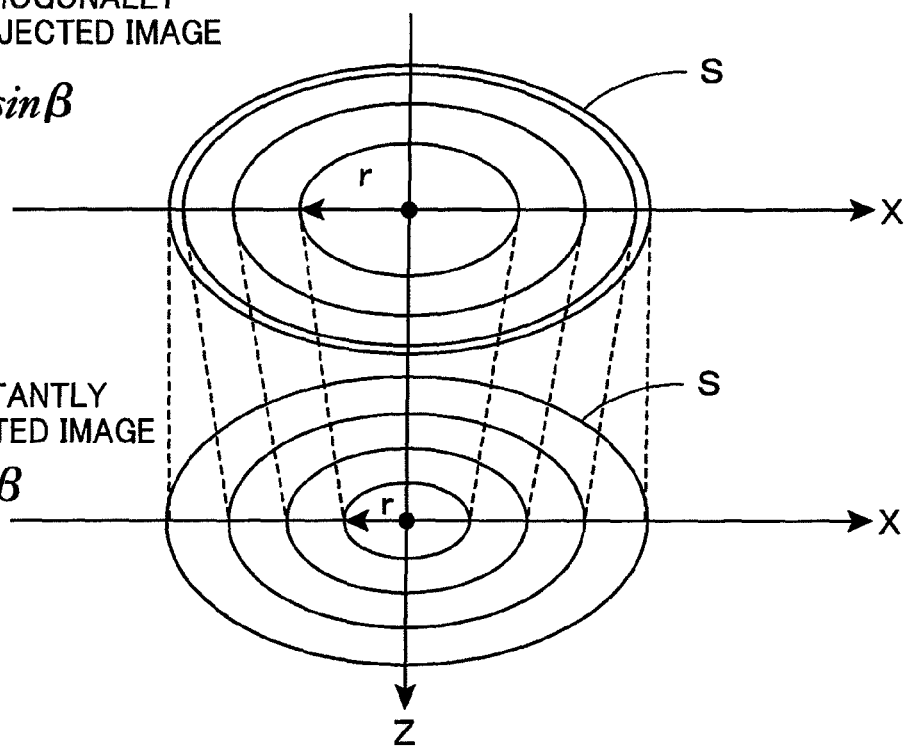
FIG. 21 is a perspective view showing a relationship between an orthogonally projected image formed by use of a fisheye lens based on the orthogonal projection method and an equidistantly projected image formed by use of a fisheye lens based on the equidistance projection method.

FIG. 21 is a perspective view showing the relationship between the orthogonally projected image formed by use of a fisheye lens based on the orthogonal projection method and the equidistantly projected image formed by use of a fisheye lens based on the equidistance projection method. Lines in a concentric pattern in the drawing show aggregates of reaching points on the XY plane for incident light which has passed through incident points having the same zenithal angle $\beta$. In the case of the orthogonally projected image shown in FIG. 21(a), the equation of $r=f\cdot\sin\beta$ is met. Therefore, an interval between adjacent lines in a concentric pattern is made smaller as it moves from the center to the periphery. On the other hand, in the case of the equidistantly projected image shown in FIG. 21(b), the equation of $r=f\cdot\beta$ is met, and therefore, the lines in a concentric pattern are arranged in an equal interval from the center to the periphery.

As described above, the orthogonally projected image and the equidistantly projected image are common in that they are both distorted circular images. However, since there is a difference in the distorted state between them, transformation equations used for converting them to a planar regular image are also different accordingly. Thus, the transformation equations shown in FIG. 12 can be used in converting an orthogonally projected image to a planar regular image. However, where non-orthogonally projected images such as an equidistantly projected image are converted to planar regular images, it is necessary to use special transformation equations for each of them.

As optical characteristics of a fisheye lens based on the orthogonal projection method are handled as a model using the virtual sphere H shown in FIG. 20, the transformation equations shown in FIG. 12 can be defined. However, optical characteristics of a fisheye lens based on the non-orthogonal projection method cannot be handled as a model using the virtual sphere H. Therefore, even if any of the transformation equations can be defined, the mode of the equation is to be quite complicated.

Under these circumstances, the present inventor has conceived a method for converting, instead of using transformation equations for directly converting a non-orthogonally projected image to a planar regular image, the non-orthogonally projected image is once converted to an orthogonally projected image and determining coordinates (x, y) which correspond to coordinates (u, v) by use of the transformation equations based on the orthogonal projection method shown in FIG. 12. Hereinafter, this method will be described by referring to an example where an equidistantly projected image is used as the non-orthogonally projected image.

As shown in FIG. 21, any given one point on the orthogonally projected image and one specific point on the equidistantly projected image are able to define a mutually one-for-one correspondence relationship (the broken lines on the drawing show the correspondence relationship). Specifically, where coordinates of any given one point on the equidistantly projected image are to be (x',y') and coordinates of one specific point on the corresponding orthogonally projected image are to be (x, y), the following equations are met between them as shown in the upper stage of FIG. 22.

$$x = \text{sinc}(\pi/2 \cdot \sqrt{(x'^2 + y'^2)}) \times \pi/2 \cdot x' \qquad \text{equation (31)}$$

$$y = \text{sinc}(\pi/2 \cdot \sqrt{(x'^2 + y'^2)}) \times \pi/2 \cdot y' \qquad \text{equation (32)}.$$

To put it the other way around, where coordinates of any given point on the orthogonally projected image are to be (x, y) and coordinates of one specific point on the corresponding equidistantly projected image are to be (x', y'), the following equations are met between them, as shown in the lower stage of FIG. 22.

$$x' = 2/\pi \cdot x / \text{sinc}(\pi/2 \cdot \sqrt{(x^2 + y^2)}) \qquad \text{equation (33)}$$

$$y' = 2/\pi \cdot y / \text{sinc}(\pi/2 \cdot \sqrt{(x^2 + y^2)}) \qquad \text{equation (34)}.$$

In the above equations (31) to (34), the function sinc(t) with arbitrary variable t is a function called "sinc function (cardinal sign)," and defined as sinc(t)=sin(t)/t. However, the function value where t is equal to zero is defined as sinc(0)=1. In conclusion, the above equations (31) and (32) are equations for converting the coordinates (x', y') on the equidistantly projected image to the coordinates (x, y) on the orthogonally projected image (hereinafter, referred to as first coordinate conversion equations). The above equations (33) and (34) are to convert the coordinates (x, y) on the orthogonally projected image to the coordinates (x', y') on the equidistantly projected image (hereinafter, referred to as second coordinate conversion equations).

Thus, where an image stored in a distorted circular image storage unit 110 shown in FIG. 19 is an equidistantly projected image photographed by use of a fisheye lens based on the equidistance projection method, the equidistantly projected image is allowed to be displayed on a display by a distorted circular image display unit 140, and the designation of two points P, Q is entered on the equidistantly projected image by an instruction input unit 150. Then, in an intersecting point operation unit 160, such processing is conducted that coordinates ($x_0'$, $y_0'$) of a cut-out center point P are converted to coordinates ($x_0$, $y_0$) by using the first coordinate conversion equations (equation (31) and equation (32)), and the coordinates after conversion are used to determine position coordinates ($x_0$, $y_0$, $z_0$) of the intersecting point G. Then, in a transformation unit 130, exactly in the same manner as the embodiments described above, such processing is conducted that the transformation equations based on the orthogonal projection method shown in FIG. 12 are used to determine coordinates (x, y) corresponding to coordinates (u, v). However, instead of using the thus determined coordinates (x, y) as they are, to determine a position of a reference pixel, the coordinates (x, y) are converted to coordinates (x', y') by using the second coordinate conversion equations (equation (33) and equation (34)), and the coordinates after conversion are used to identify a position of the reference pixel on the equidistantly projected image stored in the distorted circular image storage unit 110.

The use of the above-described method makes it possible to apply the conversion using the transformation equations based on the orthogonal projection method shown in FIG. 12 also to a case where an image stored in the distorted circular image storage unit 110 is an equidistantly projected image photographed by use of a fisheye lens based on the equidistance projection method. As a matter of course, this method shall not be limited to an application to equidistantly projected images and may be extensively applicable to non-orthogonally projected images in general.

In turns, describing in general, where an image stored in the distorted circular image storage unit 110 is not an orthogonally projected image photographed by use of a fisheye lens based on the orthogonal projection method but a non-orthogonally projected image photographed by use of a fisheye lens based on the non-orthogonal projection method, processing is conducted by utilizing the first coordinate conversion equations for converting coordinates on the non-orthogonally projected image to coordinates on the orthogonally projected image and the second coordinate conversion equations for converting coordinates on the orthogonally projected image to coordinates on the non-orthogonally projected image. First, in the intersecting point operation unit 160, the first coordinate conversion equations are used to convert coordinates ($x_0'$, $y_0'$) of the cut-out center point P to coordinates ($x_0$, $y_0$). Then, additional processing is conducted in which the coordinates after conversion are used to determine the position coordinates ($x_0$, $y_0$, $z_0$) of the intersecting point. On the other hand, in the transformation unit 130, such processing is conducted that the transformation equations based on the orthogonal projection method shown in FIG. 12 are used to determine coordinates (x, y) corresponding to coordinates (u, v), thereafter, the second coordinate conversion equations are used to convert the coordinates (x, y) to coordinates (x', y'), and the coordinates after conversion are used to identify a position of the reference pixel on the non-orthogonally projected image stored in the distorted circular image storage unit 110.

<<<Section 6: Ingenuity for Further Relieving Operation Load>>>

As described in Section 2, instead of the conventional transformation equations shown in FIG. 11, the transformation equations of the present invention shown in FIG. 12 can be used to greatly relieve the operation load of trigonometric functions. Herein, a description will be given for several modes of ingenuity for further relieving the operation load. The ingenuity of operation methods described here is effective in simplifying a circuit constitution in particular for constituting the transformation unit 130 with a special hardware logical circuit in combination of various types of operation units, resistors and others.

<6-1: Ingenuity for Denominator Operation of Equations (11) (12)>

The equations (11) and (12) shown in FIG. 12 do not include the trigonometric function operation but the denominators include three sets of square operation terms and square root extraction terms. In order to relieve the operation load as much as possible, the form of the denominator equation may be changed to some extent.

More specifically, when only denominator portions of the equations (11) and (12) are extracted, the following is obtained:

$$1/\sqrt{((u-x_0)^2 + (v-y_0)^2 + (w-z_0)^2)}.$$

Where the following equations are given, $$a = u - x_0, \ b = v - y_0, \ c = w - z_0$$

the above equations are changed to the following form $$1/\sqrt{(a^2+b^2+c^2)}.$$

When this equation is changed as shown in the upper stage of FIG. 23, the following equation is obtained $$1/c \cdot 1/\sqrt{((a/c)^2+(b/c)^2+1)} \qquad \text{equation (41)}.$$

Three sets of square operation terms, that is, $a^2$, $b^2$, $c^2$ were included in the equation before being changed. However, in the equation (41) after being changed, the square operation terms are decreased to two sets of $(a/c)^2$ and $(b/c)^2$. In this instance, when the following is given, $$(a/c)^2+(b/c)^2+1=\xi$$

the following equation (42) which is shown in the lower stage of FIG. 23 is obtained:

$$1/\sqrt{(a^2+b^2+c^2)}=1/c \cdot 1/\sqrt{\xi} \qquad \text{equation (42)}.$$

Reciprocal operation "1/c" and reciprocal square root extraction operation "$1/\sqrt{\xi}$" are, in general, operation processing relatively great in operation load. A method quite effective in relieving the operation load is to use a function table. More specifically, made available are a first function table T1 in which values of "function f(c)=1/c" are in advance allowed to correspond to values of various variables c and a second function table T2 in which values of "function f($\xi$)=$1/\sqrt{\xi}$" are allowed to correspond to values of various variables $\xi$, thereby a function value is determined without actual operation by referring to these function tables.

FIG. 24 is a view showing the constitutions of the function tables T1 and T2. The function table T1 shown in FIG. 24(a) enlists values of f(c) (values of 1/c) corresponding to individual values of c in a range within which c is assumed to fall in a predetermined accuracy. Similarly, the function table T2 shown in FIG. 24(b) enlists values of f($\xi$) (values of $1/\sqrt{\xi}$) corresponding to individual values of $\xi$ over a range within which $\xi$ is assumed to fall in a predetermined accuracy.

The function tables T1 and T2 provided inside the transformation unit 130 will make it possible to obtain values of 1/c and value of $1/\sqrt{\xi}$ without actual operation of values of c and $\xi$. In conclusion, in order to perform operation of the following denominator portion of the equations (11), (12) shown in FIG. 12:

$$1/\sqrt{((u-x_0)^2+(v-y_0)^2+(w-z_0)^2)}$$

operation is performed by using the following equation to determine a, b and c:

$$a = u - x_0, \ b = v - y_0, \ c = w - z_0.$$

Thereafter, operation is performed by using the following equation to determine a value of $\xi$:

$$\xi = (a/c)^2+(b/c)^2+1.$$

Then, values of the functions f(c)=1/c and f($\xi$)=$1/\sqrt{\xi}$ corresponding to the thus determined values of c and $\xi$ are determined by referring to the first function table T1 and the second function table T2 shown in FIG. 24, and operation may be performed by using the following equation:

$$\sqrt{((u-x_0)^2+(v-y_0)^2+(w-z_0)^2)}=f(c) \times f(\xi).$$

An upper limit is given to the dimension of a planar regular image T, by which it is possible to limit values of the coordinate values u, v, for example, to a range of $0 \leq u \leq R$ and $0 \leq v \leq R$ and it is also possible to limit values of the conversion magnification m to a range of $0.1 \leq m \leq 10$. The above-described limit is able to keep values of c and $\xi$ to a predetermined range. It is, thus, possible to keep values of variables c and $\xi$ which should be enlisted in the function tables T1 and T2 shown in FIG. 24 to a predetermined range.

It is also possible to omit actual operation for square operation terms such as $(a/c)^2$ and $(b/c)^2$ by referring to the function tables, whenever necessary. However, in general, the square operation is simpler in hardware constitution of operation units than in the case of ordinary multiplication. Therefore, it will be sufficient if a square operation unit is used to actually operate square operation terms.

<6-2: Ingenuity for Interpolation Operation by Use of Tables>

As described above, a method for omitting actual operation by utilizing the function tables is quite effective in relieving the operation load. However, in order to increase the accuracy of function values obtained by referring to the function tables, it is required to secure the effective digits sufficient for variable values and function values enlisted in the tables. Thus, such a problem is posed that the tables are increased in data capacity accordingly. A method of interpolation operation is usually used to avoid the problem.

Figure 25:
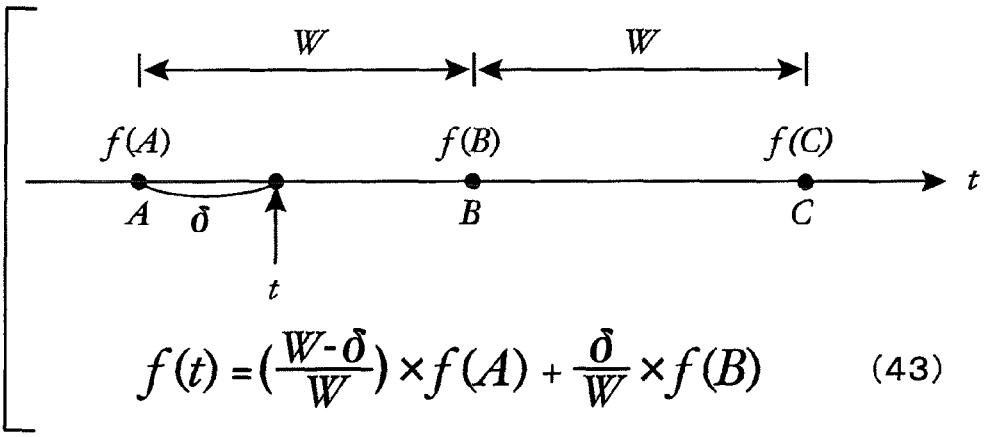
FIG. 25 is a view showing a linear interpolation method used in referring to the function tables shown in FIG. 24.

FIG. 25 is a view showing a method of linear interpolation used by referring to the function tables shown in FIG. 24. Here, considered is a case where a function value f(t) corresponding to a variable t is determined. The t axis shown in the figure is an axis indicating a variable t, and theoretically, the variable t is to be given as any given value on the t axis. However, a value of the variable t enlisted in the function table has no other choice but to give a discrete value with an interval W corresponding to predetermined effective digits. FIG. 25 shows an example in which as a discrete value with the interval W, values of A, B and C are plotted on the t axis and defined respectively for function values f(A), f(B) and f(C). In this example, values of the variable t enlisted on the function tables are discrete values such as A, B and C, and values of the function value f(t) are also values such as f(A), f(B) and f(C).

In order to determine a function value f(t) corresponding to any given variable t by use of the function tables in which only function values f(t) for these discrete variables t can be defined, the following linear interpolation may be performed. For example, where the variable t is a value in a range of A<t<B, the function value f(t) can be calculated by using the following equation:

$$f(t)=((W-\delta)/W) \times f(A)+(\delta/W) \times f(B) \qquad \text{equation (43)}.$$

Herein, $\delta=(t-A)$ is obtained and $\delta$ is a value corresponding to a fractional figure portion with respect to the discrete variable A.

Figure 26:
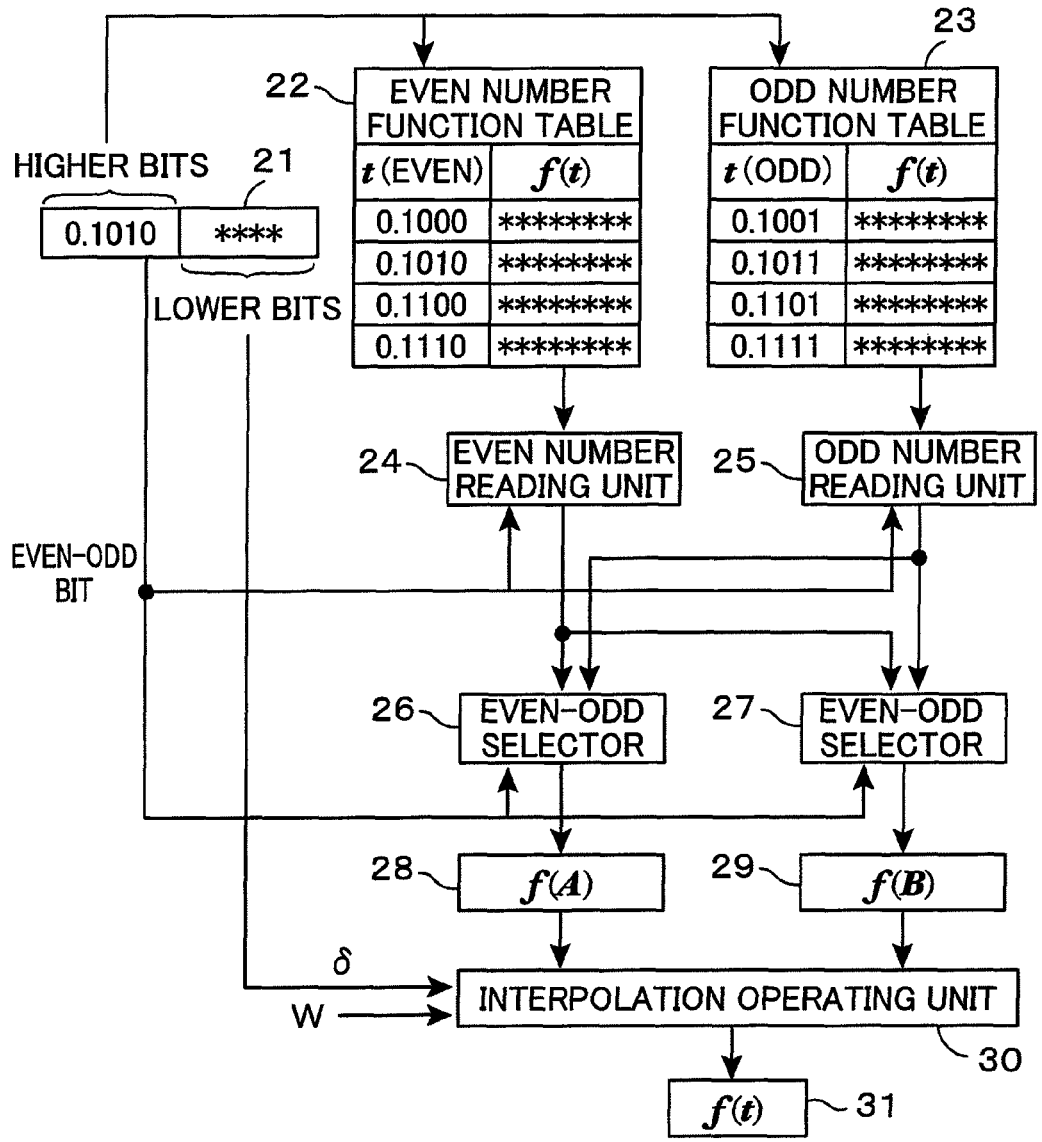
FIG. 26 is a block diagram showing hardware constituents for executing the linear interpolation shown in FIG. 25.

Here, a description will be given for an example of a hardware constitution which is appropriate in allowing the transformation unit 130 to perform interpolation operation on the basis of the equation (43) by referring to the block diagram of FIG. 26. As shown in the figure, the hardware shown here is constituted with a T resistor 21, an even-number function table 22, an odd-number function table 23, an even-number reading unit 24, an odd-number reading unit 25, an even-odd selector 26, an even-odd selector 27, an A resistor 28, a B resistor 29, an interpolation operating unit 30, and an interpolated value resistor 31.

The important feature of the above hardware constitution is that data of the variable t and the function value f(t), which are essentially to be stored in a single function table, are stored in two separate tables of the even-number function table 22 and the odd-number function table 23. In this instance, the even-number function table 22 is a table which contains values of a predetermined function f(t) corresponding to an even-number variable t among variables t which gives a discrete value of the interval W according to predetermined effective digits. Further, the odd-number function table 23 is a table which contains values of a predetermined function f(t) corresponding to an odd-number variable t among variables t which gives a discrete value of the interval W according to the effective digits.

Here, for the sake of convenience, a description will be given for a variable t which falls within a range of "0.1000 to 0.1111" shown in a four-bit binary fraction portion by referring to a specific example provided with the function tables. As illustrated, the even-number function table 22 stores only variables t which give an even-number, that is, "0.1000," "0.1010," "0.1100," "0.1110," and also stores individually corresponding function values f(t) (in the figure, function values are omitted and shown by data of "********" for the sake of convenience). On the other hand, the odd-number function table 23 stores only variables t which give an odd-number, that is, "0.1001," "0.1011," "0.1101," "0.1111," and also stores individually corresponding function values f(t).

As described above, discrete values of the variable t having effective digits of four-bit are stored in the function tables 22 and 23. Herein, considered is a case where data having effective digits of eight-bit is given as any given variable t to be operated. The T resistor 21 is a resistor for storing variables t having the effective digits of eight-bit. Specifically, the T resistor 21 is to store the variables t constituted with a higher-order bit made up of effective digits of four-bit (effective digits of variables t in the function table) and a lower-order bit showing four-bit which are the lower-order digits than the effective digits. The figure shows a state that stored are data of the effective digits of four-bit which is "0.1010," as higher-order bit of any given variable t, and any given bit of "****" as a lower-order bit.

The higher-order bit of the T resistor 21 is utilized to identify a variable t to be read in the function tables 22, 23. Values of the function value f(t) stored so as to correspond to the variable t concerned are read by the even-number reading unit 24 and the odd-number reading unit 25.

More specifically, the even-number reading unit 24 performs processing for reading a value of the function f(t) corresponding to an even-number variable t indicated by the higher-order bit from the even-number function table 22 when the higher-order bit of the T resistor 21 is an even-numbers, and reading a value of the function f(t) corresponding to a minimum even-number variable t greater than an odd-number variable t indicated by the higher-order bit from the even-number function table 22 when higher-order bit of the T resistor 21 is an odd-number. For example, in the example shown in the figure, as a higher-order bit of the T resistor 21 "0.1010" is an even-number, the even-number reading unit 24 is to read a value of the function f(t) corresponding to an even-number variable t indicated by the higher-order bit "0.1010" from the even-number function table 22. If the higher-order bit of the T resistor 21 is "0.1011" (an odd-number variable), as the higher-order bit "0.1011" is not stored in the even-number function table 22, the even-number reading unit 24 is to read a value of the function f(t) corresponding to "0.1100" which is a minimum even-number variable greater than the odd-number variable "0.1011" from the even-number function table 22.

On the other hand, the odd-number reading unit 25 performs processing for reading a value of the function f(t) corresponding to an odd-number variable t indicated by the higher-order bit from the odd-number function table 23 when the higher-order bit of the T resistor 21 is an odd-number, and reading a value of the function f(t) corresponding to a minimum odd-number variable t greater than an even-number variable t indicated by the higher-order bit from the odd-number function table 23 when the higher-order bit of the T resistor 21 is an even-number. For example, in the example shown in the figure, as the higher-order bit "0.1010" of the T resistor 21 is an even-number, the higher-order bit "0.1010" is not stored in the odd-number function table 23. Thus, the odd-number reading unit 25 is to read a value of the function f(t) corresponding to "0.1011" which is a minimum odd-number variable greater than the even-number variable "0.1010" from the odd-number function table 23. If the higher-order bit of the T resistor 21 is "0.1011" (an odd-number variable), the odd-number reading unit 25 is to read a value of the function f(t) corresponding to an odd-number variable t indicated by the higher-order bit "0.1011" from the odd-number function table 23.

By using the above-described method to readout the function value f(t) from each of the function tables 22 and 23, two function values corresponding to mutually adjacent discrete variables can be readout. For example, read are the function values f(A) and f(B) corresponding to two adjacent variables A and B on the t axis shown in FIG. 25. Further, a variable t having eight-bit accuracy stored in the T resistor is A≦t<B. Thus, these two function values f(A) and f(B) are stored respectively in the A resistor 28 and the B resistor 29. In the interpolation operating unit 30, $$f(t)=((W-\delta)/W) \times f(A)+(\delta/W) \times f(B) \quad \text{equation (43)}$$

operation is performed on the basis of the above equation to obtain an interpolated value f(t). Herein, W denotes an interval of discrete values set on the basis of predetermined effective digits constituting a higher-order bit of the variable t stored in the T resistor 21, and δ denotes a fractional figure portion indicated by a lower-order bit of the variable t stored in the T resistor 21.

In other words, in the interpolation operating unit 30, a value stored in the A resistor 28 is given as f(A), a value stored in the B resistor 29 is given as f(B), and a value indicated by the lower-order bit of the T resistor 21 is given as δ, by which operation is performed on the basis of the equation (43) to calculate an interpolated value f(t). The thus calculated interpolated value f(t) is stored in an interpolated value resistor 31. The transformation unit 130 uses the interpolated value f(t) stored in the interpolated value resistor 31, thereby carrying out necessary operation.

In order to perform the operation on the basis of the equation (43), it is necessary that the function value f(A) is stored in the A resistor 28 and the function value f(B) is stored in the B resistor 29 under the presupposition that the variable A is smaller than the variable B. However, whether a function value read by the even-number reading unit 24 from the even-number function table 22 or a function value read by the odd-number reading unit 25 from the odd-number function table 23 is to be the function value f(A) or the function value f(B) is determined, depending on whether a higher-order bit of the T resistor 21 is an even-number or an odd-number, in other words, depending on the LSB (least significant bit) of the higher-order bit (hereinafter, referred to as even-odd bit).

Therefore, when the higher-order bit concerned is an even-number (an even-odd bit is zero), a value of the function f(t) read by the even-number reading unit 24 may be stored in the A resistor 28 and a value of the function f(t) read by the odd-number reading unit 25 may be stored in the B resistor 29. To put it the other way around, when the higher-order bit is an odd-number (an even-odd bit is one), a value of the function f(t) read by the odd-number reading unit 25 may be stored in the A resistor 28 and a value of the function f(t) read by the even-number reading unit 24 may be stored in the B resistor.

For this reason, an even-odd selector 26 performs processing for sorting out the respective functions f(t) read from the even-number reading unit 24 and the odd-number reading unit 25 according to an even-odd bit given from the T resistor 21, thereby storing one of the thus selected functions in the A resistor 28. More specifically, the even-odd selector 26 selects the function f(t) read from the even-number reading unit 24 when the even-odd bit is zero and selects the function f(t) read from the odd-number reading unit 25 when the even-odd bit is one to store the thus selected function f(t) in the A resistor 28.

Similarly, an even-odd selector 27 performs processing for sorting out the respective functions f(t) read from the even-number reading unit 24 and the odd-number reading unit 25 according to an even-odd bit given from the T resistor 21, thereby storing one of the thus selected functions in the B resistor 29. More specifically, the even-odd selector 27 selects the function f(t) read from the odd-number reading unit 25 when the even-odd bit is zero and selects the function f(t) read from the even-number reading unit 24 when the even-odd bit is one to store the thus selected function f(t) in the B resistor 29.

<6-3: Ingenuity for Trigonometric Function Operation by Use of Equations (13) to (18)>

Next, a description will be given for ingenuity for relieving the operation load of trigonometric functions included in the equations (13) to (18) shown in FIG. 12. These equations include trigonometric functions of $\cos \phi$ and $\sin \phi$. Since hardware of the operation units for determining values of the trigonometric functions is substantially complicated, it is preferable, in practicality, that trigonometric function operation is avoided as much as possible.

As described in Section 3, the angle $\theta$ indicating the cut-out orientation (an angle set by the positions of two points P and Q designated by a user) and the planar inclination angle $\phi$ used in transformation equations are normally different. However, in practice, no problem is posed, if the angle $\theta$ indicating the cut-out orientation is approximated, as it is, as a value of the planar inclination angle $\phi$. In an embodiment where $\theta$ is equal to $\phi$, the relationship of $\cos \phi = \cos \theta$ is obtained. Thereby, a value of the $\cos \phi$ can be determined without operation of the trigonometric functions according to the following principle.

As shown in FIG. 13, the angle $\theta$ indicating the cut-out orientation is an angle determined by designating two points P and Q by a user on the XY plane. Thus, as shown in FIG. 27, it is assumed that the user designates the point P $(x_0, y_0)$ and the point Q $(x_1, y_1)$ to incorporate coordinate values $(x_0, y_0)$ and $(x_1, y_1)$ by using the instruction input unit 150.

Figure 27:
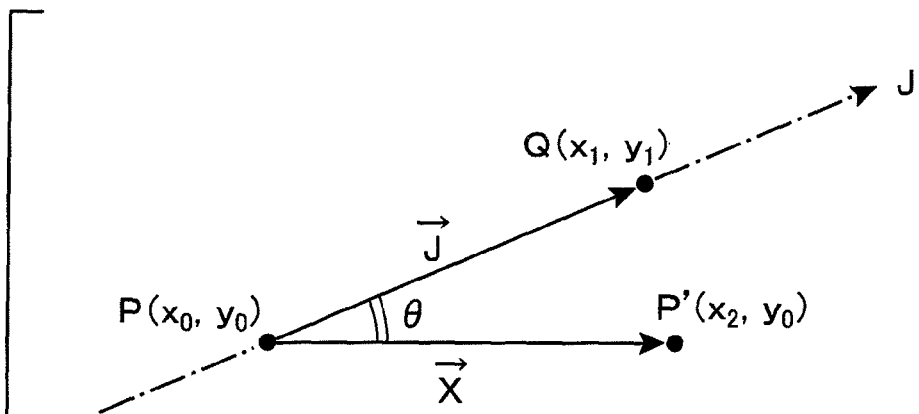
FIG. 27 is a view showing other equations used for relieving operation loads of the transformation equations of the present invention shown in FIG. 12.

As shown in FIG. 27, a reference straight line J is designated as a straight line connecting the two points P and Q, while the angle $\theta$ indicating the cut-out orientation is defined as an angle formed between the reference straight line J and the X axis. Thus, as shown in the figure, a vector J facing the direction of the reference straight line J and a vector X facing the direction of the X axis are defined. In the illustrated example, the vector J has the two points P and Q at both end points, with any given size of the vector being acceptable. Similarly, the vector X has two points P and P' at both end points. Since a Y coordinate value of the point P is the same as that of the point P', a coordinate value of the point P' is given as P $(x_2, y_0)$. Further, in the figure, for the sake of convenience, starting points of the both vectors J, X are indicated in alignment at the position of the point P $(x_0, y_0)$, thereby the angle $\theta$ is an angle having the point P $(x_0, y_0)$ as the apex.

Herein, as shown in FIG. 27, an inner product of the vector J and the vector X is indicated as follows:

$$(J{\rightarrow}) \cdot (X{\rightarrow}) = \cos \theta \text{ (absolute value } J{\rightarrow}) \cdot (\text{absolute value } X{\rightarrow}) \quad \text{equation (51)}$$

In the present specification, the vector J is denoted by using a reference symbol of $(J{\rightarrow})$, and the absolute value thereof is denoted as (absolute value $J{\rightarrow}$) due to the restrictions in word processor. (FIG. 27 shows the equations according to the ordinary method). When the equation (51) is solved in terms of $\cos \theta$, the following equation is obtained.

$$\cos \theta = (J{\rightarrow}) \cdot (X{\rightarrow}) / ((\text{absolute value } J{\rightarrow}) \cdot (\text{absolute value } X{\rightarrow})) \quad \text{equation (52)}$$

Herein, where the vector X is given as a unit vector, the following equation is obtained.

$$(\text{absolute value } X{\rightarrow}) = 1, \; x_2 = x_0 + 1 \quad \text{equation (53).}$$

Further, since the following equation is satisfied, $$(\text{absolute value } J{\rightarrow}) = \sqrt{((x_1 - x_0)^2 + (y_1 - y_0)^2)} \quad \text{equation (54)}$$

a value of the denominator given in the equation (52) can be calculated on the basis of the equations (53) and (54). On the other hand, a value of the numerator given in the equation (52) can be calculated by the following equation, as an inner product of the vector J and the vector X:

$$(J{\rightarrow}) \cdot (X{\rightarrow}) = x_1 \cdot x_2 + y_1 \cdot y_0 \quad \text{equation (55).}$$

In conclusion, a value of $\cos \theta$ can be determined by addition, subtraction, multiplication and division, square operation and square root extraction operation on the basis of coordinate values $(x_0, y_0)$ and $(x_1, y_1)$ of two points $P(x_0, y_0)$, $Q(x_1, y_1)$ designated by a user, thereby avoiding the trigonometric function operation. In other words, the transformation unit 130 is able to determine a value of $\cos \phi$ by using the vector J facing the direction of the reference straight line J through operation of dividing an inner product of the vector J and the vector X by a product of the size of the vector J and that of the vector X.

The handling described above is such that where the angle $\theta$ indicating the cut-out orientation is approximated as a value of the planar inclination angle $\phi$ or instead of the vector U facing the direction of the U axis, the vector J facing the direction of the reference straight line J is used approximately. In case that the above approximation is not conducted, after calculation of the orientation of the vector U, a value of $\cos \phi$ can be determined by dividing an inner product of the vector U and the vector X by a product of the size of the vector U and that of the vector X.

As described above, if a value of $\cos \phi$ is determined, a value of $\sin \phi$ can be determined by operation using the following equation.

$$\sin \phi = \sqrt{(1 - \cos^2 \phi)} \quad \text{equation (56)}$$

In conclusion, values of the trigonometric functions, $\cos \phi$ and $\sin \phi$ included in the equations (13) to (18) shown in FIG. 12 can be calculated without any trigonometric function operation. This is quite effective in simplifying a hardware constitution of operation units.

<6-4: Ingenuity for Function Operation Included in the Equations (31) to (34)>

In Section 5, a description was given for a method for applying the present invention to a non-orthogonally projected image photographed by use of a fisheye lens based on the non-orthogonal projection method. As shown in FIG. 22, the method requires operations using the first coordinate conversion equations:

$$x = \text{sinc}(\pi/2 \cdot \sqrt{(x'^2 + y'^2)}) \times \pi/2 \cdot x' \quad \text{equation (31)}$$

$$y = \text{sinc}(\pi/2 \cdot \sqrt{(x'^2 + y'^2)}) \times \pi/2 \cdot y' \quad \text{equation (32)}$$

and the second coordinate conversion equations:

$$x'=2/\pi \cdot x/\mathrm{sinc}(\pi/2\cdot\sqrt{(x^2+y^2)}) \quad \text{equation (33)}$$

$$y'=2/\pi \cdot y/\mathrm{sinc}(\pi/2\cdot\sqrt{(x^2+y^2)}) \quad \text{equation (34)}.$$

As already described, in each of the above equations, the function of sinc (t) when a variable is given as t is a function called a sinc function (cardinal sign) and defined as sinc (t)=sin(t)/t, however, on the condition that a value of the function where t is equal to zero is defined as sinc(O)=1. Herein, a description will be given for a method for relieving the operation load of operation terms on the function of sinc (t).

Now, as shown in the upper stage of FIG. 28, the functions g(t) and h(t) are defined as follows, $$g(t)=\mathrm{sinc}(t)=\sin(t)/t \text{ where, } g(0)=\mathrm{sinc}(0)=1 \quad \text{equation (61)}$$

$$h(t)=1/\mathrm{sinc}(t)=t/\sin(t) \text{ where, } h(0)=1 \quad \text{equation (62)}.$$

In this instance, when sin(t) is subjected to Taylor expansion, as shown in the middle stage of FIG. 28, the equation is given in the following form:

$$\sin(t)=t-t^3/3!+t^5/5!-t^7/7!+t^9/9!-\ldots \quad \text{equation (63)}.$$

In conclusion, the following form of the equation is obtained.

$$g(t)=1-t^2/3!+t^4/5!-t^6/7!+t^8/9!-\ldots \quad \text{equation (64)}.$$

Further, as shown in the lower stage of FIG. 28, considered is a case where h(t) is expressed by the following form of the equation using coefficients of $a_2, a_4, a_6, a_8, \ldots$.

$$h(t)=1+a_2 t^2+a_4 t^4+a_6 t^6+a_8 t^8+\ldots \quad \text{equation (65)}.$$

Since h(t) is equal to 1/g(t), from the above equation (64), the following equation is obtained:

$$h(t)=1/(1-t^2/3!+t^4/5!-t^6/7!+t^8/9!-\ldots) \quad \text{equation (66)}.$$

From the equation (65) and the equation (66), the following equation is obtained:

$$1=(1+a_2 t^2+a_4 t^4+a_6 t^6+a_8 t^8+\ldots)\times(1-t^2/3!+t^4/5!-t^6/7!+t^8/9!-\ldots) \quad \text{equation (67)}.$$

When this equation is solved, the following equation is obtained:

$$h(t)=1+(1/6)t^2+(7/360)t^4+(31/15120)t^6+(127/604800)t^8+. \quad \text{equation (68)}.$$

Therefore, when the intersecting point operation unit 160 calculates the first coordinate conversion equations (31) and (32), the function of sinc (t) is calculated on the basis of the equation subjected to Taylor expansion as follows:

$$\mathrm{sinc}(t)=1-t^2/3!+t^4/5!-t^6/7!+t^8/9!-.$$

Thereby, it is possible to avoid the trigonometric function operation. Further, where t is equal to zero, a value of the right side of the above equation is one, thereby obtaining a function value in agreement with a mathematical definition of sinc(0)=1. It is noted that an infinite number of terms are theoretically included in the right side of the above equation. As a matter of course, it will be practically sufficient to calculate the terms until required effective digits are obtained.

Similarly, where the transformation unit 130 calculates the second coordinate conversion equations (33) and (34), the function of 1/sinc(t) is calculated on the basis of the following form of the equation in which predetermined coefficient values of $a_2, a_4, a_6, a_8, \ldots$, are used, $$1/\mathrm{sinc}(t)=1+a_2 t^2+a_4 t^4+a_6 t^6+a_8 t^8+.$$

Thereby it is possible to avoid the trigonometric function operation. In this case, since values of the coefficients of $a_2, a_4, a_6, a_8, \ldots$ can be determined as specific numerical value as with the equation (68), these specific numerical values may be stored in the operation unit. In the equation as well, where t is equal to zero, a value on the right side is one. It is, therefore, possible to obtain a function value of 1/sinc(0)=1 which coincides with a mathematical definition. Although an infinite number of terms are theoretically included in the right side of the above equation, it will be practically sufficient to calculate the terms until required effective digits are obtained.

<<<Section 7: Mathematical Process for Deriving Transformation Equations>>>

A description has been above given for the best mode in performing the image converter of the present invention in Sections from 1 to 6. Here, a mathematical process for deriving the transformation equations of the present invention shown in FIG. 12 will be briefly described by referring to the mathematical equations shown in FIG. 29 and FIG. 30. The transformation equations shown in FIG. 12 are geometrically equivalent to the transformation equations shown in FIG. 11, and they are only different in how to set parameters including a difference in definition between the planar inclination angles ψ and φ. Both of these transformation equations indicate a correspondence relationship between any given point S (x, y) on an orthogonally projected image S formed by use of a fisheye lens based on the orthogonal projection method having the optical characteristics shown in FIG. 1 and a specific point T (u, v) on a planar regular image T. They can be derived by geometric analysis. However, the analysis is usually made by using a determinant of a matrix due to a requirement for dealing with complicated equations including trigonometric functions. Hereinafter, a description will be given for a process for deriving transformation equations using the above determinant of matrix, although some mathematical knowledge is required.

In FIG. 6, a UV coordinate system is defined on the tangent plane S2, and the orientation of the U axis is determined by the planar inclination angle φ. Then, an origin of the UV coordinate system is given as a point G ($x_0, y_0, z_0$). Consequently, if a rotation vector N ($x_0, y_0, z_0$) is defined taking an origin O of an XYZ coordinate system as a starting point and the origin G of the UV coordinate system as a terminal point, a particular UV coordinate system arranged inside the space of the XYZ coordinate system is regulated by the rotation vector N ($x_0, y_0, z_0$) and the planar inclination angle φ (a rotation factor rotating around the rotation vector N). Thus, the particular UV coordinate system is regulated by the rotation vector N and the rotation factor φ rotating around the rotation vector (planar inclination angle) and can be expressed as a rotation matrix.

In the present invention, it will be sufficient to define a two-dimensional UV coordinate system. Herein, considered is a three-dimensional UVW coordinate system where a W axis perpendicular to the UV plane is added. In the example shown in FIG. 6, the W axis is defined as an axis extending from the point G ($x_0, y_0, z_0$) to the origin O. Then, the transformation equation to be determined here is an equation for performing the coordinate conversion between a three-dimensional XYZ coordinate system and the three-dimensional UVW coordinate system (w shown in the equation (19) of FIG. 12 is in reality a value corresponding to a coordinate value along the W axis).

In this case, a mutual relationship between both of the coordinate systems will be studied under the conditions that the radius R of a virtual sphere H is equal to one, the rotation vector N is to be a unit vector and also in a state that the three-dimensional UVW coordinate system is subjected to parallel translation so that a position of the origin G of the three-dimensional UVW coordinate system is superimposed on that of the origin O of the three-dimensional XYZ coordinate system for the purpose of deriving a conversion equation, with only the rotation of the coordinate systems taken into account. More specifically, in FIG. 6, the UV coordinate system positioned on the tangent plane S2 is subjected to parallel translation on the inclined face S1.

Now, a three-dimensional rotation matrix which is defined by a rotation vector N=(x, y, z) and a rotation angle $\phi$ is given as R ($\phi$, N). Then, as shown in the equation (71) of FIG. 29, considered is a matrix S which is called an alternate matrix with respect to the rotation vector N=(x, y, z). In this case, a reference letter T on the right of the matrix denotes a transposed matrix. Then, a matrix S2 and a matrix S3 will be given respectively as shown in the equation (72) and the equation (73).

On the other hand, an exponential matrix expS for the matrix S is defined in an expansion form as shown in the equation (74). In this case, E is a unit matrix. Since the equation (74) can be transformed to the equation (75), an exponential matrix exp ($\phi$ S) obtained by multiplying the rotation angle $\phi$ can be transformed to the equation (76) shown in FIG. 30, thereby obtaining the equation (77). This matrix exp ($\phi$ S) is a three-dimensional rotation matrix representation R ($\phi$ N)=R ($\phi$, N). Therefore, the equations (71) and (72) are substituted for the equation (77) and calculated to obtain the equation (78). Each element of the determinant of the matrix made up of three lines and three rows shown in the last portion of the equation (78) will be a coefficient value in performing the coordinate conversion between the three-dimensional XYZ coordinate system and the three-dimensional UVW coordinate system. The nine elements of the determinant of the matrix are replaced with reference letters A to I to obtain the equation (79).

The terms A to F shown in the equations (13) to (18) in FIG. 12 correspond to A to F shown in the equation (79). An image to be converted in the present invention is a distorted circular image arranged on the XY plane. Therefore, it will be sufficient to determine an x coordinate value from the equation (11) shown in FIG. 12 and a y coordinate value from the equation (12) shown in FIG. 12. Further, a z coordinate value is always zero, and elements G, H, I of the equation (79) will not be utilized.

In the equations (11) and (12) shown in FIG. 12, instead of u, v, and w, "u−$x_0$," "v−$y_0$," and "w−$z_0$" are used. This is because, as described above, the derivation process has been conducted in FIG. 6 in a state that the UV coordinate system positioned on the tangent plane S2 is subjected to parallel translation on the inclined face S1. In reality, an origin of the UV coordinate system is not positioned at the origin O of the XYZ coordinate system but positioned at the point G ($x_0$, $y_0$, $z_0$). Subtraction of the coordinate values $x_0$, $y_0$, $z_0$ of the terms of "u−$x_0$," "v−$y_0$," and "w−$z_0$" in the equation (11) and (12) is made for compensating a position of the thus parallel translated origin.

<<<Section 8; Modification of Parameter Setting Method>>>

Finally, a description will be given for a modification of a parameter setting method in the present invention. In Section 3, a description has been already given for a basic embodiment for allowing a user to set efficiently parameters of $\phi$, $x_0$, $y_0$, and m. The gist of the method described in Section 3 is as follows. As shown in FIG. 13, the distorted circular image S defined on the XY coordinate system is presented to a user, two points P and Q are designated on this image, coordinate values ($x_0$, $y_0$) of the point P are used, as they are, as values of the parameters $x_0$, $y_0$, and a distance d between the two points P and Q is used to determine a conversion magnification m on the basis of the equation of m=k/d. Further, a straight line connecting the two points P, Q is given as a reference straight line J to determine an angle $\theta$ (cut-out orientation) formed between the reference straight line J and the X axis, on the basis of the angle $\theta$, the planar inclination angle $\phi$ is determined (in practice, a relationship of $\phi$=$\theta$ is approximately given).

Figure 31:
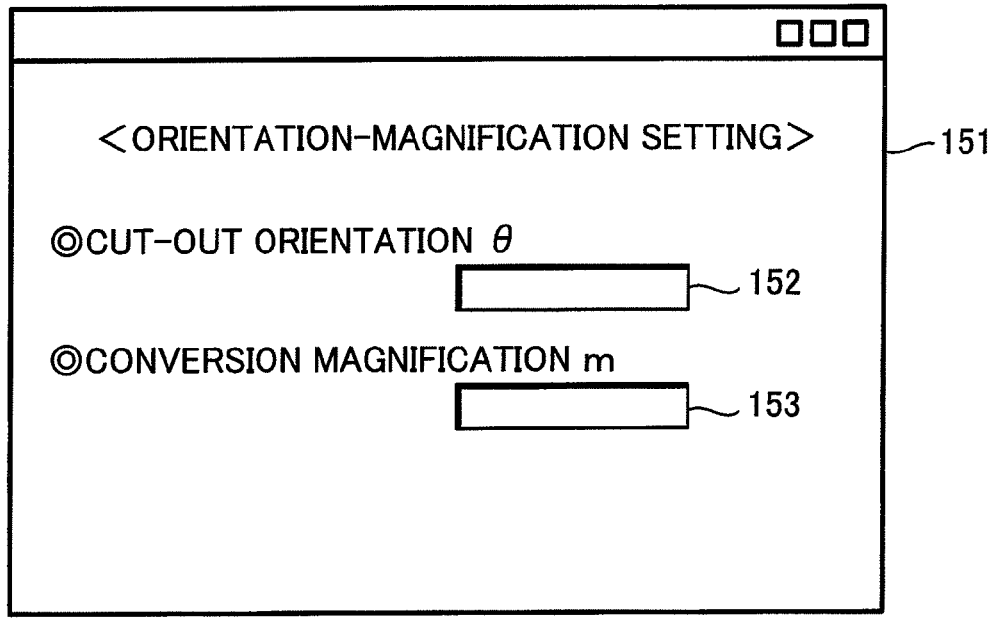
FIG. 31 is a plan view showing an "orientation-magnification setting screen" displayed on a display screen in the parameter setting method of a modification of the present invention.

On the other hand, a modification to be described here is a method for separately setting the conversion magnification m and the angle $\theta$ indicating the cut-out orientation in advance, and for allowing a user to designate only one point P ($x_0$, $y_0$) on the distorted circular image S. In this modification, the instruction input unit 150 shown in FIG. 19 displays at first "orientation-magnification setting screen 151" on a display screen as shown in FIG. 31. In the illustrated example, a user uses an input device such as a keyboard to enter a value of $\theta$ in an angle $\theta$ setting input field 152 and also to enter a value of m in a magnification m setting input field 153. More specifically, for example, a value of $\theta$ "30°" may be entered in the input field 152, and a value of m "2" may be entered in the input field 153. The thus input $\theta$ is given as a value for defining the orientation of the reference straight line J to be drawn on the distorted circular image S. As a matter of course, $\theta$ and m may be entered in many other methods, in addition to the above-described method. For example, an arrow mark for increasing or decreasing a numerical value is displayed on the screen to allow a user to designate a particular numerical value by the user's operation of clicking the arrow mark.

Figure 32:
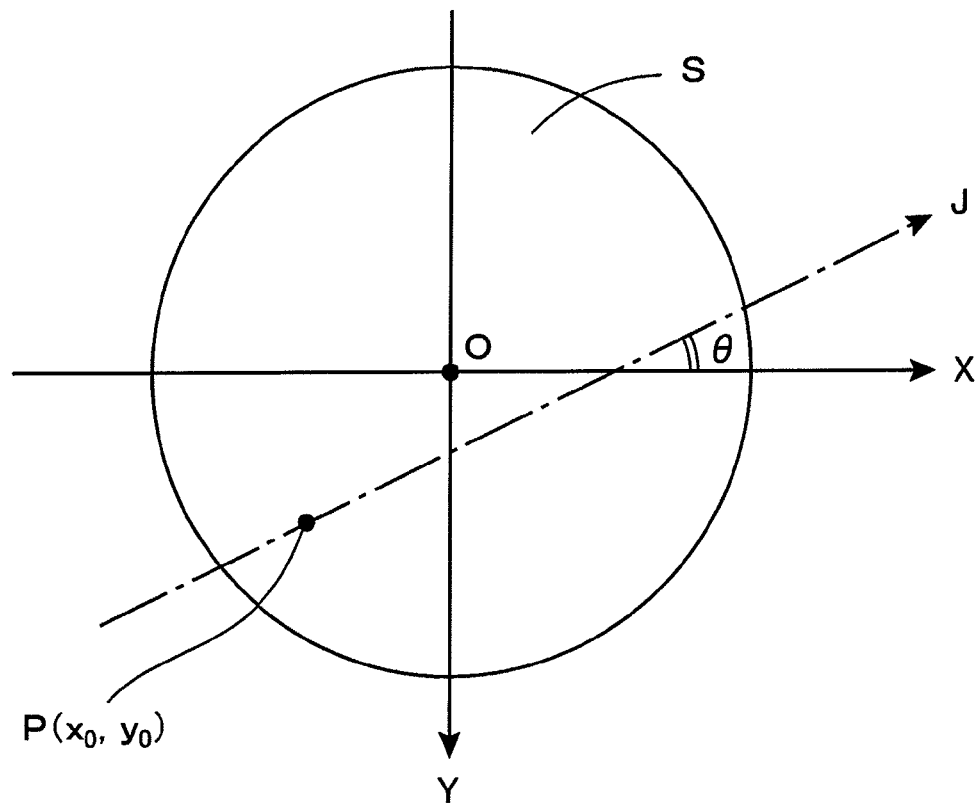
FIG. 32 is a plan view showing an operation of setting the cut-out center point by designating one point P on the XY plane.

When any method is taken to set the conversion magnification m and the angle $\theta$ indicating the cut-out orientation such as the above-described example method, the only required operation which should be made by a user on the distorted circular image S is to designate a cut-out center point P ($x_0$, $y_0$). FIG. 32 is a plan view showing an operation for setting the above-described cut-out center point P. In: FIG. 32 where illustration is omitted, the distorted circular image S is in reality displayed inside the circle of the figure. A user performs an operation by mouse click or others to designate any given one point inside the distorted circular image S as a cut-out center point P ($x_0$, $y_0$). When the user designates a position of the cut-out center point P ($x_0$, $y_0$), a reference straight line J shown by the dotted and dashed line in the figure can be determined as a straight line passing through the point P and forming the angle $\theta$ (an angle value entered in the input field 152 by the above operation) between the X axis and itself Thereby, an image is cut out on the basis of the direction of the reference straight line J.

The modification of the parameter setting method described in Section 8 is optimal for an application that a planar regular image at various positions is obtained in a state that the cut-out orientation (the direction of the reference straight line J) is always fixed. For example, as shown in the side elevational view of FIG. 33, considered is an embodiment in which the present invention is applied to a monitoring camera mounted on the wall face of a building. As shown in the figure, a monitoring camera 230 is mounted on the wall face of a building 220 on a road surface 210, and it is assumed that operation of monitoring the field of view indicated by the dotted and dashed line is performed. In this case, if the monitoring camera 230 is a camera equipped with an ordinary lens, an image photographed at the position of the monitoring camera 230 is, for example, an ordinary planar regular image shown in FIG. 34. However, if the monitoring camera 230 is a camera equipped with a fisheye lens for obtaining a wider field of view, a distorted circular image S is obtained on the XY plane as shown in FIG. 35.

Figure 33:
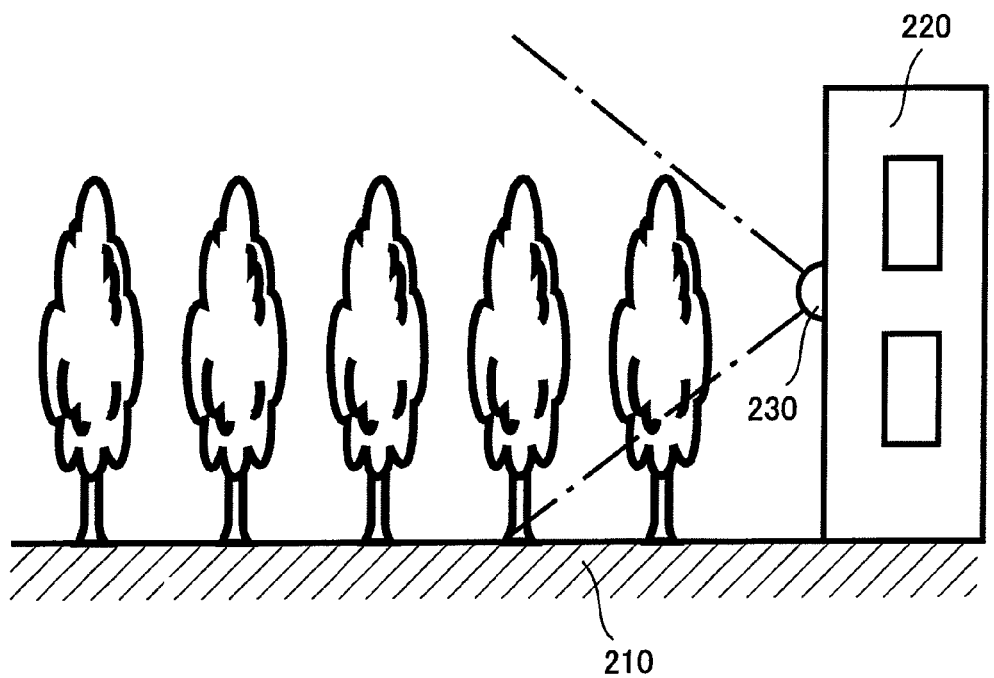
FIG. 33 is a side elevational view showing an embodiment in which the present invention is applied for a monitoring camera mounted on the wall face of a building.
Figure 34:
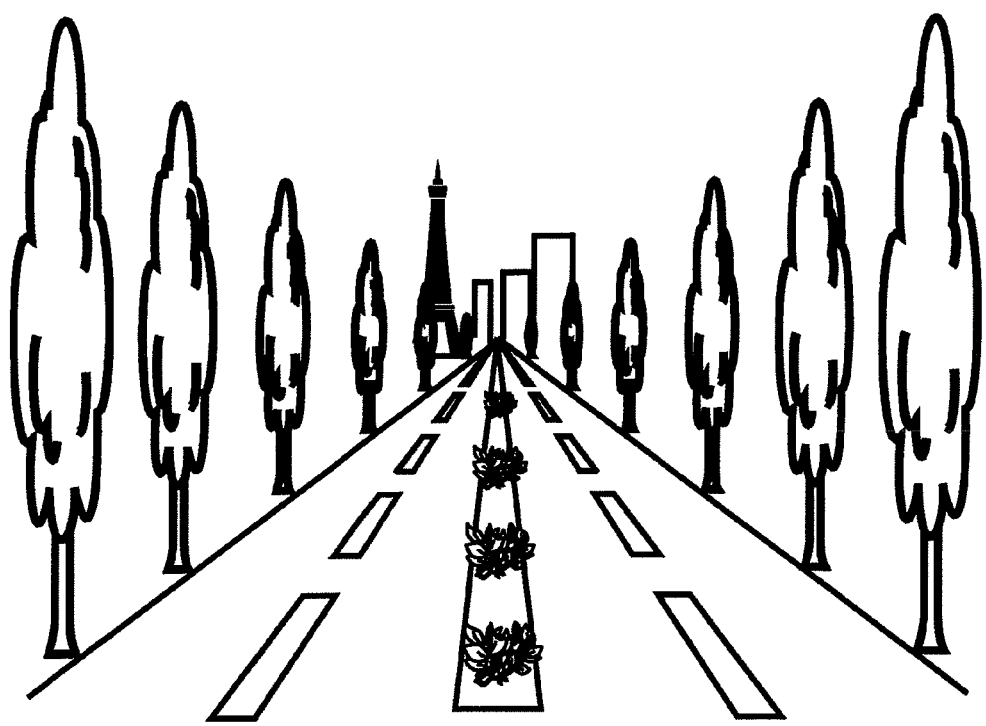
FIG. 34 is a plan view showing one example of an image photographed by using an ordinary lens camera as the monitoring camera 230 shown in FIG. 33.
Figure 35:
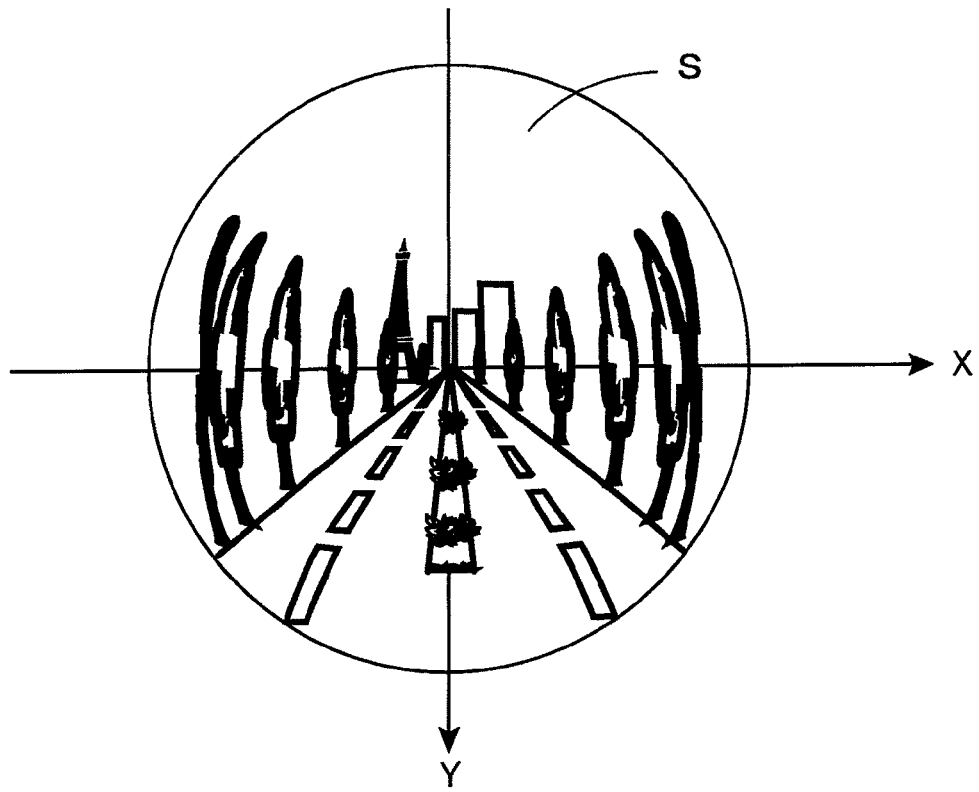
FIG. 35 is a plan view showing one example of an image (the distorted circular image S) photographed by use of a fisheye lens camera as the monitoring camera 230 shown in FIG. 33.

In this case, a comparison is made between the distorted circular image S shown in FIG. 2 and the distorted circular image S shown in FIG. 35. Both of the images are photographed by using a camera equipped with a fisheye lens. It is observed that the former is an image obtained by setting the camera so that the optical axis is in a perpendicular direction and photographing a landscape on the ground in 360-degree surroundings, while the latter is an image obtained by setting the camera so that the optical axis is in a horizontal direction and photographing a landscape on one side of the building 220. Therefore, when consideration is given for a fact that a planar regular image obtained on the UV coordinate system after conversion is designated so as to face a correct direction according to heaven and earth of the objective world, in the former case, the cut-out orientation (the orientation of the reference straight line J regulated by the angle θ) must be designated in various directions depending on the position of the cut-out center point, while in the latter case, the cut-out orientation may always be set horizontally to the X axis.

Where the present invention is applied to the conversion of an distorted circular image S obtained by use of the fisheye lens monitoring camera 230 in the surroundings shown in FIG. 33, it is preferable that, for example, the angle θ indicating the cut-out orientation is set in advance to be 0° by a method shown in FIG. 31, a predetermined numerical value is set in advance also to the conversion magnification m, and only the position of the cut-out center point P is designated on the distorted circular image S shown in FIG. 35. In the present invention, θ is an angle defined as an angle formed between the reference straight line J and the X axis. As described above, where θ is equal to 0°, it is indicated that the reference straight line J is parallel with the X axis. Therefore, where θ is set to be equal to 0°, the reference straight line J is to be a straight line passing through the cut-out center point P designated by a user and parallel with the X axis.

Figure 36:
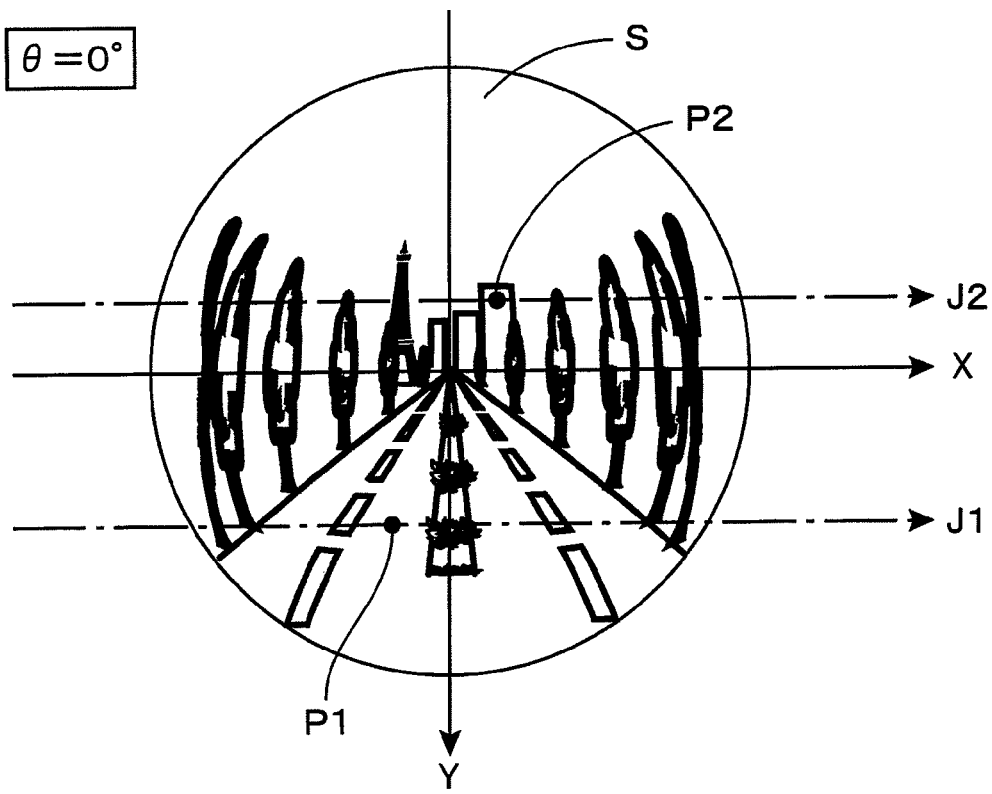
FIG. 36 is a plan view showing an operation of designating the cut-out center point on the distorted circular image S shown in FIG. 35.

FIG. 36 is a plan view showing an operation of designating the cut-out center point on the distorted circular image S shown in FIG. 35 where θ is set in advance to be equal to 0°. For example, where a user may desire to visually recognize the vicinity of one point P1 on the road surface as a planar regular image, while viewing the distorted circular image S shown in the figure on a display screen, the user may only perform an operation of designating the point P1 as a cut-out center point by mouse click. Thereby, a reference straight line J1 passing through the point P1 and parallel with the X axis is the straight line showing the cut-out orientation. Similarly, where the user may desire to visually recognize the vicinity of one point P2 of a distant building as a planar regular image, the user may perform an operation of designating the point P2 as a cut-out center point by clicking. Thereby, a reference straight line J2 passing through the point P2 and parallel with the X axis is the straight line indicating the cut-out orientation.

As shown in FIG. 36, the reference straight lines J1 and J2 are both in a direction along the horizontal plane in a landscape, and the orientation of the U axis is defined substantially in this direction. Therefore, a finally obtained planar regular image is obtained as an image facing a correct direction according to heaven and earth of the objective world taking either the cut-out center points P1 and P2 as the center. Further, a user may only perform a simple operation of designating "a center of a region desired in visually recognizing as a planar regular image" as a cut-out center point P, while viewing the distorted circular image S, thereby obtaining a favorable operability.

What is claimed is:

1. An image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x, y) on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates (u, v) on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates ($x_0, y_0, z_0$) of an intersecting point G between a straight line passing through the cut-out center point P and parallel with a Z axis and the virtual sphere;

an angle determining unit which determines on the basis of the cut-out orientation a planar inclination angle φ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and a transformation unit which makes correspondence between coordinates (u, v) and coordinates (x, y) by utilizing transformation equations based on an orthogonal projection method including the position coordinates ($x_0, y_0, z_0$) and the planar inclination angle φ as parameters, determines a pixel value of a pixel on the planar regular image arranged at a position indicated by coordinates (u, v) on the basis of a pixel value of a reference pixel on the distorted circular image arranged at a position indicated by corresponding coordinates (x, y), and forms the planar regular image with regard to a partial image cut out from the distorted circular image in an orientation indicated by the planar inclination angle φ taking the cut-out center point P as a center, so that the thus formed planar regular image is stored in the planar regular image storage unit;

wherein the instruction input unit has a function of entering instructions for defining a reference straight line J drawn on the distorted circular image, and the angle determining unit determines the planar inclination angle φ on the basis of an angle θ formed between the reference straight line J and the X axis (on the condition that θ=0° where both of them are parallel).

2. The image converter according to claim 1, wherein the transformation unit uses the following equations as transformation equations based on the orthogonal projection method, $x = R[(u-x_0)A + (v-y_0)B + (w-z_0)E]/\sqrt{((u-x_0)^2 + (v-y_0)^2 + (w-z_0)^2)}$ $y = R[(u-x_0)C + (v-y_0)D + (w-z_0)F]/\sqrt{((u-x_0)^2 + (v-y_0)^2 + (w-z_0)^2)}$ where
- $A = 1-(1-\cos\phi)(y_0^2+z_0^2)$
- $B = -z_0 \sin\phi + x_0 y_0 (1-\cos\phi)$
- $C = z_0 \sin\phi + x_0 y_0 (1-\cos\phi)$
- $D = 1-(1-\cos\phi)(z_0^2+x_0^2)$
- $E = y_0 \sin\phi + z_0 x_0 (1-\cos\phi)$
- $F = -x_0 \sin\phi + y_0 x_0 (1-\cos\phi)$
- $w = m R$ (m is a predetermined conversion magnification).

3. The image converter according to claim 2, wherein
the instruction input unit has a function of entering a conversion magnification m on the basis of instructions by a user, and
the transformation unit makes the correspondence by using the entered conversion magnification m in the transformation equations.

4. The image converter according to claim 3, wherein
the instruction input unit has a function of entering instructions for designating positions of two points, a cut-out center point P and an auxiliary point Q, on the distorted circular image and uses a numerical value given as m=k/d (k is a predetermined proportional constant) on the basis of a distance d between the cut-out center point P and the auxiliary point Q as a conversion magnification m.

5. The image converter according to claim 2, wherein
the transformation unit determines a value of $\sin\phi$ on the basis of an operation of $\sin\phi = \sqrt{(1-\cos^2\phi)}$.

6. The image converter according to claim 1, wherein
the instruction input unit has a function of entering instructions for designating positions of two points, a cut-out center point P and an auxiliary point Q, on the distorted circular image and giving a straight line connecting the cut-out center point P with the auxiliary point Q as the reference straight line J.

7. The image converter according to claim 1, wherein
the instruction input unit has a function of entering a numerical value indicating an angle θ formed between the reference straight line J and the X axis on a predetermined input screen and also has a function of entering instructions for designating a position of the cut-out center point P on the distorted circular image.

8. The image converter according to claim 1, wherein
the angle determining unit gives the angle θ formed between the reference straight line J and the X axis approximately as the planar inclination angle φ.

9. The image converter according to claim 1, wherein
the transformation unit performs, in order to determine a pixel value of a pixel on the planar regular image arranged at a position indicated by coordinates (u, v), interpolation operation for pixel values of a plurality of reference pixels on the distorted circular image arranged in the vicinity of a position indicated by the corresponding coordinates (x, y).

10. A fisheye lens monitoring system including
the image converter according to claim 1, a camera using a fisheye lens and a monitoring device of displaying a planar regular image on a screen, wherein
the fisheye lens monitoring system is constituted so that a distorted circular image photographed by using the camera is stored in the distorted circular image storage unit and the planar regular image obtained in the planar regular image storage unit is displayed by the monitoring device.

11. An image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x, y) on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates (u, v) on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates ($x_0$, $y_0$, $z_0$) of an intersecting point G between a straight line passing through the cut-out center point P and parallel with a Z axis and the virtual sphere;

an angle determining unit which determines on the basis of the cut-out orientation a planar inclination angle φ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and a transformation unit which makes correspondence between coordinates (u, v) and coordinates (x, y) by utilizing transformation equations based on an orthogonal projection method including the position coordinates ($x_0$, $y_0$, $z_0$) and the planar inclination angle φ as parameters, determines a pixel value of a pixel on the planar regular image arranged at a position indicated by coordinates (u, v) on the basis of a pixel value of a reference pixel on the distorted circular image arranged at a position indicated by corresponding coordinates (x, v), and forms the planar regular image with regard to a partial image cut out from the distorted circular image in an orientation indicated by the planar inclination angle φ taking the cut-out center point P as a center, so that the thus formed planar regular image is stored in the planar regular image storage unit;

wherein
the image converter has a function to perform image conversion when an image stored in the distorted circular image storage unit is not an orthogonally projected image photographed by use of a fisheye lens based on the orthogonal projection method but a non-orthogonally projected image photographed by use of a fisheye lens based on a non-orthogonal projection method, the image converter includes first coordinate conversion equations for converting coordinates on the non-orthogonally projected image to coordinates on the orthogonally projected image and second coordinate conversion equations for converting coordinates on the orthogonally projected image to coordinates on the non-orthogonally projected image, the intersecting point operation unit converts the coordinates of the cut-out center point P by using the first coordinate conversion equations and determines the position coordinates $(x_0, y_0, z_0)$ of the intersecting point by using coordinates after conversion, and the transformation unit uses a transformation equation based on the orthogonal projection method to determine coordinates $(x, y)$ corresponding to coordinates $(u, v)$, thereafter, the second coordinate conversion equation is used to convert the coordinates $(x, y)$, and the coordinates after conversion are used to identify a position of a reference pixel on the distorted circular image.

12. The image converter according to claim 11, wherein when an image stored in the distorted circular image storage unit is an equidistantly projected image photographed by use of a fisheye lens based on an equidistance projection method, the intersecting point operation unit uses the following equations as the first coordinate conversion equations for converting coordinates $(x', y')$ on the equidistantly projected image to the coordinates $(x, y)$ on the orthogonally projected image $$x = \operatorname{sinc}(\pi/2 \cdot \sqrt{(x'^2 + y'^2)}) \times \pi/2 \cdot x'$$

$$y = \operatorname{sinc}(\pi/2 \cdot \sqrt{(x'^2 + y'^2)}) \times \pi/2 \cdot y', \text{ and}$$

the transformation unit uses the following equations as the second coordinate conversion equations for converting the coordinates $(x, y)$ on the orthogonally projected image to the coordinates $(x', y')$ on the equidistantly projected image $$x' = 2/\pi \cdot x / \operatorname{sinc}(\pi/2 \cdot \sqrt{(x^2 + y^2)})$$

$$y' = 2/\pi \cdot y / \operatorname{sinc}(\pi/2 \cdot \sqrt{(x^2 + y^2)}).$$

13. The image converter according to claim 12, wherein the intersecting point operation unit operates the function sinc (t) in the first coordinate conversion equations on the basis of the following form of equation subjected to Taylor expansion $$\operatorname{sinc}(t) = 1 - t^2/3! + t^4/5! - t^6/7! + t^8/9! - \ldots, \text{ and}$$

the transformation unit operates the function 1/sinc (t) in the second coordinate conversion equations on the basis of the following form of equation using predetermined coefficient values of $a_2, a_4, a_6, a_8, \ldots$ $$1/\operatorname{sinc}(t) = 1 + a_2 t^2 + a_4 t^4 + a_6 t^6 + a_8 t^8 + \ldots.$$

14. A non-transitory computer-readable recording medium storing a program, said program allowing a computer to function as an image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates $(x, y)$ on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates $(u, v)$ on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates $(x_0, y_0, z_0)$ of an intersecting point G between a straight line passing through the cut-out center point P and parallel with a Z axis and the virtual sphere;

an angle determining unit which determines on the basis of the cut-out orientation a planar inclination angle $\phi$ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and a transformation unit which makes correspondence between coordinates $(u, v)$ and coordinates $(x, y)$ by utilizing transformation equations based on an orthogonal projection method including the position coordinates $(x_0, y_0, z_0)$ and the planar inclination angle as parameters determines a pixel value of a pixel on the planar regular image arranged at as position indicated by coordinates $(u, v)$ on the basis of a pixel value of a reference pixel on the distorted circular image arranged at a position indicated by corresponding coordinates $(x, y)$, and forms the planar regular image with regard to a partial image cut out from the distorted circular image in an orientation indicated by the planar inclination angle $\phi$ taking the cut-out center point P as a center, so that the thus formed planar regular image is stored in the planar regular image storage unit;

wherein the instruction input unit has a function of entering instructions for defining a reference straight line J drawn on the distorted circular image, and the angle determining unit determines the planar inclination angle $\phi$ on the basis of an angle $\theta$ formed between the reference straight line J and the X axis (on the condition that $\theta = 0°$ where both of them are parallel).

15. A semiconductor integrated circuit in which an electronic circuit functioning as a transformation unit of an image converter is assembled, the image converter being for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates $(x, y)$ on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates $(u, v)$ on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates ($x_0$, $y_0$, $z_0$) of an intersecting point G between a straight line passing through the cut-out center point P and parallel with a Z axis and the virtual sphere;

an angle determining unit which determines on the basis of the cut-out orientation a planar inclination angle $\phi$ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and the transformation unit which makes correspondence between coordinates (u, v) and coordinates (x, y) by utilizing transformation equations based on an orthogonal projection method including the position coordinates ($x_0$, $y_0$, $z_0$) and the planar inclination angle as parameters determines a pixel value of a pixel on the planar regular image arranged at a position indicated by coordinates (u, v) on the basis of a pixel value of a reference pixel on the distorted circular image arranged at a position indicated by corresponding coordinates (x, y), and forms the planar regular image with regard to a partial image cut out from the distorted circular image in an orientation indicated by the planar inclination angle $\phi$ taking the cut-out center point P as a center, so that the thus formed planar regular image is stored in the planar regular image storage unit;

wherein the instruction input unit has a function of entering instructions for defining a reference straight line J drawn on the distorted circular image, and the angle determining unit determines the planar inclination angle $\phi$ on the basis of an angle $\theta$ formed between the reference straight line J and the X axis (on the condition that $\theta=0°$ where both of them are parallel).

16. An image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x, y) on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates (u, v) on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates ($x_0$, $y_0$, $z_0$) of an intersecting point G between a straight line passing through the cut-out center point P and parallel with a Z axis and the virtual sphere;

an angle determining unit which determines on the basis of the cut-out orientation a planar inclination angle $\phi$ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and a transformation unit which makes correspondence between coordinates (u, v) and coordinates (x, y) by utilizing transformation equations based on an orthogonal projection method including the position coordinates ($x_0$, $y_0$, $z_0$) and the planar inclination angle $\phi$ as parameters, determines a pixel value of a pixel on the planar regular image arranged at a position indicated by coordinates (u, v) on the basis of a pixel value of a reference pixel on the distorted circular image arranged at a position indicated by corresponding coordinates (x, y), and forms the planar regular image with regard to a partial image cut out from the distorted circular image in an orientation indicated by the planar inclination angle $\phi$ taking the cut-out center point P as a center, so that the thus formed planar regular image is stored in the planar regular image storage unit;

wherein the transformation unit uses the following equations as transformation equations based on the orthogonal projection method, $$x = R[(u^-x_0)A + (v^-y_0)B + (w^-z_0)E]/\sqrt{((u^-x_0)^2 + (v^-y_0)^2 + (w^-z_0)^2)}$$

$$y = R[(u^-x_0)C + (v^-y_0)D + (w^-z_0)F]/\sqrt{((u^-x_0)^2 + (v^-y_0)^2 + (w^-z_0)^2)}$$

where
$A = 1 - (1 - \cos \phi)(y_0^2 + z_0^2)$
$B = -z_0 \sin \phi + x_0 y_0 (1 - \cos \phi)$
$C = z_0 \sin \phi + x_0 y_0 (1 - \cos \phi)$
$D = 1 - (1 - \cos \phi)(z_0^2 + x_0^2)$
$E = y_0 \sin \phi + z_0 x_0 (1 - \cos \phi)$
$F = -x_0 \sin \phi + y_0 x_0 (1 - \cos \phi)$
$w = m R$ (m is a predetermined conversion magnification), and the transformation unit has a first function table which allows values of "function $f(c) = 1/c$" to correspond to values of various variables c and a second function table which allows values of "function $f(\xi) = 1/\sqrt{\xi}$" to correspond to values of various variables $\xi$, the transformation unit makes an operation to determine values of c and $\xi$ with the following equations, $$a = u - x_0,\ b = v - y_0,\ c = w - z_0,$$

$$\xi = (a/c)^2 + (b/c)^2 + 1$$

so that values of the functions f(c) and f($\xi$) which correspond to the thus determined values of c and $\xi$ are determined by referring to the first function table and the second function table, and a value of $\sqrt{((u-x_0)^2 + (v-y_0)^2 + (w-z_0)^2)}$ in the transformation equation based on the orthogonal projection method is determined by operation of $f(c) \times f(\xi)$.

17. An image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x, y) on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates (u, v) on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates $(x_0, y_0, z_0)$ of an intersecting point G between a straight line passing through the cut-out center point P and parallel with a Z axis and the virtual sphere;

an angle determining unit which determines on the basis of the cut-out orientation a planar inclination angle $\phi$ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and a transformation unit which makes correspondence between coordinates (u, v) and coordinates (x, y) by utilizing transformation equations based on an orthogonal projection method including the position coordinates $(x_0, y_0, z_0)$ and the planar inclination angle $\phi$ as parameters, determines a pixel value of a pixel on the planar regular image arranged at a position indicated by coordinates (u, v) on the basis of a pixel value of a reference pixel on the distorted circular image arranged at a position indicated by corresponding coordinates (x, y), and forms the planar regular image with regard to a partial image cut out from the distorted circular image in an orientation indicated by the planar inclination angle $\phi$ taking the cut-out center point P as a center, so that the thus formed planar regular image is stored in the planar regular image storage unit;

wherein the transformation unit comprising:

an even-number function table in which among variables t giving a discrete value of an interval W according to predetermined effective digits, a value of a predetermined function f(t) is allowed to correspond to an even-number variable t;

an odd-number function table in which among variables t giving a discrete value of the interval W according to the effective digits, a value of the function f(t) is allowed to correspond to an odd-number variable t;

a T resistor which stores variables t constituted with higher-order bits made up of the effective digits and lower-order bits showing digits lower than the effective digits;

an even-number reading unit which reads from the even-number function table a value of the function f(t) allowed to correspond to an even-number variable t shown by the higher-order bits when the higher-order bits show an even-number and reads from the even-number function table a value of the function f(t) allowed to correspond to a minimum even-number variable t greater than an odd-number variable t shown by the higher-order bits when the higher-order bits show an odd-number;

an odd-number reading unit which reads from the odd-number function table a value of the function f(t) allowed to correspond to an odd-number variable t shown by the higher-order bits when the higher-order bits show an odd-number and reads from the odd-number function table a value of the function f(t) allowed to correspond to a minimum odd-number variable t greater than an even-number variable t shown by the higher-order bits when the higher-order bits show an even-number;

an A resistor which stores a given value of the function f(t) read from the even-number function table or the odd-number function table;

a B resistor which stores a given value of the function f(t) read from the even-number function table or the odd-number function table;

an even-odd selector which gives a value of the function f(t) read by the even-number reading unit to the A resistor and gives a value of the function f(t) read by the odd-number reading unit to the B resistor when the higher-order bits show an even-number, and which gives a value of the function f(t) read by the odd-number reading unit to the A resistor and gives a value of the function f(t) read by the even-number reading unit to the B resistor when the higher-order bits show an odd-number; and an interpolation operating unit in which a value stored in the A resistor is given as f(A) and a value stored in the B resistor is given as f(B), and a value indicated by the lower-order bit is given as $\delta$, and a value of the function f(t) after interpolation is determined by the following operation, $$f(t)=((W-\delta)/W) \times f(A)+(\delta/W) \times f(B), \text{ and}$$

wherein a value of the function f(t) after interpolation which is determined by the interpolation operating unit is utilized to perform the operation.

18. An image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x, y) on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates (u, v) on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates ($x_0$, $y_0$, $z_0$) of an intersecting point G between a straight line passing through the cut-out center point P and parallel with a Z axis and the virtual sphere;

an angle determining unit which determines on the basis of the cut-out orientation a planar inclination angle φ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and a transformation unit which makes correspondence between coordinates (u, v) and coordinates (x, y) by utilizing transformation equations based on an orthogonal projection method including the position coordinates ($x_0$, $y_0$, $z_0$) and the planar inclination angle φ as parameters, determines a pixel value of a pixel on the planar regular image arranged at a position indicated by coordinates (u, v) on the basis of a pixel value of a reference pixel on the distorted circular image arranged at a position indicated by corresponding coordinates (x, y), and forms the planar regular image with regard to a partial image cut out from the distorted circular image in an orientation indicated by the planar inclination angle φ taking the cut-out center point P as a center, so that the thus formed planar regular image is stored in the planar regular image storage unit;

wherein the transformation unit uses the following equations as transformation equations based on the orthogonal projection method, $$x = R[(u^-x_0)A + (v^-y_0)B + (w^-z_0)E]/\sqrt{((u^-x_0)^2 + (v^-y_0)^2 + (w^-z_0)^2)}$$

$$y = R[(u^-x_0)C + (v^-y_0)D + (w^-z_0)F]/\sqrt{((u^-x_0)^2 + (v^-y_0)^2 + (w^-z_0)^2)}$$

where
  $A = 1 - (1 - \cos \phi)(y_0^2 + z_0^2)$
  $B = -z_0 \sin \phi + x_0 y_0 (1 - \cos \phi)$
  $C = z_0 \sin \phi + x_0 y_0 (1 - \cos \phi)$
  $D = 1 - (1 - \cos \phi)(z_0^2 + x_0^2)$
  $E = y_0 \sin \phi + z_0 x_0 (1 - \cos \phi)$
  $F = -x_0 \sin \phi + y_0 x_0 (1 - \cos \phi)$
  $w = mR$ (m is a predetermined conversion magnification), and the transformation unit determines a value of cos φ by dividing an inner product of the vector U and the vector X by a product of a size of the vector U and that of the vector X.

19. An image converter for performing processes of cutting out a part of a distorted circular image photographed by use of a fisheye lens and converting it into a planar regular image, the image converter comprising:

a distorted circular image storage unit which stores a distorted circular image constituted with aggregates of pixels arranged at a position indicated by coordinates (x,y) on a two-dimensional XY orthogonal coordinate system and having a radius R taking an origin O of the XY coordinate system as a center;

a planar regular image storage unit which stores a planar regular image constituted with aggregates of pixels arranged at a position indicated by coordinates (u, v) on a two-dimensional UV orthogonal coordinate system;

a distorted circular image display unit which displays the distorted circular image stored in the distorted circular image storage unit;

an instruction input unit which inputs a position of a cut-out center point P and a cut-out orientation on the distorted circular image displayed on the basis of instructions by a user;

an intersecting point operation unit which, when a virtual sphere having a radius R taking the origin O as a center is defined in a three-dimensional XYZ orthogonal coordinate system including the two-dimensional XY orthogonal coordinate system, determines position coordinates ($x_0$, $y_0$, $z_0$) of an intersecting point G between a straight line passing through the cut-out center point P and parallel with a Z axis and the virtual sphere;

an angle determining unit which determines on the basis of the cut-out orientation a planar inclination angle φ given as an angle formed between a vector U facing an U axis of the two-dimensional UV orthogonal coordinate system which is defined on a tangent plane in contact with the virtual sphere at the intersecting point G and a vector X facing an X axis of the two-dimensional XY orthogonal coordinate system; and a transformation unit which makes correspondence between coordinates (u, v) and coordinates (x, y) by utilizing transformation equations based on an orthogonal projection method including the position coordinates ($x_0, y_0, z_0$) and the planar inclination angle φ as parameters, determines a pixel value of a pixel on the planar regular image arranged at a position indicated by coordinates (u, v) on the basis of a pixel value of a reference pixel on the distorted circular image arranged at a position indicated by corresponding coordinates (x, y), and forms the planar regular image with regard to a partial image cut out from the distorted circular image in an orientation indicated by the planar inclination angle φ taking the cut-out center point P as a center, so that the thus formed planar regular image is stored in the planar regular image storage unit;

wherein the transformation unit uses the following equations as transformation equations based on the orthogonal projection method, $$x = R[(u^-x_0)A + (v^-y_0)B + (w^-z_0)E]/\sqrt{((u^-x_0)^2 + (v^-y_0)^2 + (w^-z_0)^2)}$$

$$y = R[(u^-x_0)C + (v^-y_0)D + (w^-z_0)F]/\sqrt{((u^-x_0)^2 + (v^-y_0)^2 + (w^-z_0)^2)}$$

where
  $A = 1 - (1 - \cos \phi)(y_0^2 + z_0^2)$
  $B = -z_0 \sin \phi + x_0 y_0 (1 - \cos \phi)$
  $C = z_0 \sin \phi + x_0 y_0 (1 - \cos \phi)$
  $D = 1 - (1 - \cos \phi)(z_0^2 + x_0^2)$
  $E = y_0 \sin \phi + z_0 x_0 (1 - \cos (\phi))$
  $F = ^-x_0 \sin \phi + y_0 x_0 (1 - \cos \phi)$
  $w = mR$ (m is a predetermined conversion magnification), and the instruction input unit has a function of entering instructions for defining the reference straight line J drawn on the distorted circular image, and the transformation unit defines a vector J facing a direction of the reference straight line J and determines a value of cos φ by dividing an inner product of the vector J and the vector X by a product of a size of the vector J and that of the vector X.

20. An image converter for performing processes of cutting out a part of a distorted circular image photographed by use of a fisheye lens and converting it into a planar regular image, the image converter comprising:
- a distorted circular image storage unit which stores a distorted circular image constituted with aggregates of pixels arranged at a position indicated by coordinates (x, y) on a two-dimensional XY orthogonal coordinate system;
- a planar regular image storage unit which stores a planar regular image constituted with aggregates of pixels arranged at a position indicated by coordinates (u, v) on a two-dimensional UV orthogonal coordinate system;
- a distorted circular image display unit which displays the distorted circular image stored in the distorted circular image storage unit;
- an instruction input unit which inputs positions of two points, a cut-out center point P and an auxiliary point Q on the basis of instructions given by a user on the distorted circular image displayed, and recognizes a straight line connecting the cut-out center point P with the auxiliary point Q as a reference straight line J, and a numerical value given as m=k/d (k is a predetermined proportional constant) as a conversion magnification m on the basis of a distance d between the cut-out center point P and the auxiliary point Q; and
- a transformation unit which determines a pixel value of a pixel on the planar regular image arranged at a position indicated by coordinates (u, v) on the basis of a pixel value of a reference pixel on the distorted circular image arranged at a position indicated by corresponding coordinates (x, y) by utilizing a transformation equation for allowing the coordinates (u, v) to correspond to the coordinates (x, y), and performs an operation for forming a planar regular image subjected to scaling on the basis of the conversion magnification m with regard to a partial image cut out from the distorted circular image to an orientation in accordance with the reference straight line J taking the cut-out center point P as a center, so that the thus formed planar regular image is stored in the planar regular image storage unit.

21. An image converting method for performing processes of cutting out a part of a distorted circular image photographed by use of a fisheye lens and converting it into a planar regular image, the image converter comprising:
- a distorted circular image storage unit which stores a distorted circular image constituted with aggregates of pixels arranged at a position indicated by coordinates (x, y) on a two-dimensional XY orthogonal coordinate system;
- a planar regular image storage unit which stores a planar regular image constituted with aggregates of pixels arranged at a position indicated by coordinates (u, v) on a two-dimensional UV orthogonal coordinate system;
- a distorted circular image display unit which displays the distorted circular image stored in the distorted circular image storage unit;
- an instruction input unit which inputs an angle θ defined as an angle formed between a reference straight line J and the X axis and a conversion magnification m on the basis of instructions given by a user on a input screen, and a position of a cut-out center point P on the basis of instructions given by the user on the distorted circular image displayed; and
- a transformation unit which determines a pixel value of a pixel on the planar regular image arranged at a position indicated by coordinates (u, v) on the basis of a pixel value of a reference pixel on the distorted circular image arranged at a position indicated by corresponding coordinates (x, y) by utilizing a transformation equation for allowing the coordinates (u, v) to correspond to the coordinates (x, y), and performs an operation for forming a planar regular image subjected to scaling on the basis of the conversion magnification m with regard to a partial image cut out from the distorted circular image to an orientation in accordance with the reference straight line J taking the cut-out center point P as a center, so that the thus formed planar regular image is stored in the planar regular image storage unit.

22. An image converting method for performing processes of cutting out a part of a distorted circular image photographed by use of a fisheye lens and converting it into a planar regular image, the image converting method which allows a computer or an electronic circuit to perform the following steps:
- storing in a distorted circular image storage unit a distorted circular image constituted with aggregates of pixels arranged at a position indicated by coordinates (x, y) on a two-dimensional XY orthogonal coordinate system and having a radius R taking an origin O of the; XY coordinate system as a center;
- displaying on a display the distorted circular image stored in the distorted circular image storage unit;
- entering position and cut-out orientation of a cut-out center point P on the distorted circular image displayed on the display on the basis of instructions by a user;
- determining position coordinates $(x_0, y_0, z_0)$ of an intersecting point G between a straight line passing through the cut-out center point P and parallel with a Z axis and a virtual sphere, by defining a virtual sphere having the radius R taking the origin O as a center in a three-dimensional XYZ orthogonal coordinate system including the two-dimensional XY orthogonal coordinate system;
- determining on the basis of the cut-out orientation a planar inclination angle φ given as an angle formed between a vector U facing a direction of an U axis of a two-dimensional UV orthogonal coordinate system to be defined on a tangent plane in contact with the virtual sphere on the intersecting point G and a vector X facing a direction of an X axis of the two-dimensional XY orthogonal coordinate system; and
- performing operation for forming a planar regular image with regard to a partial image cut out from the distorted circular image to an orientation indicated by the planar inclination angle φ taking the cut-out center point P as a center by utilizing transformation equations based on an orthogonal projection method including the position coordinates $(x_0, y_0, z_0)$ and the planar inclination angle φ as parameters to allow coordinates (u, v) to correspond to coordinates (x, y), and determining a pixel value of each pixel on the planar regular image constituted with aggregates of pixels arranged at a position indicated by the coordinates (u, v) on the basis of a pixel value of a reference pixel on the distorted circular image arranged at a position indicated by the corresponding coordinates (x, y);
- wherein instructions are entered for designating positions of two points, the cut-out center point P and an auxiliary point Q, on the distorted circular image displayed on the display, a straight line connecting the cut-out center point P with the auxiliary point Q is given as a reference straight line J, and a planar inclination angle φ is determined on the basis of an angle θ formed between the reference straight line J and the axis (on the condition that θ is equal to 0° where they parallel).

23. The image converting method according to claim 22, wherein
the following equations are used as transformation equations based on the orthogonal projection method, $$x = R[(u-x_0)A + (v-y_0)B + (w-z_0)E]/\sqrt{((u-x_0)^2 + (v-y_0)^2 + (w-z_0)^2)}$$

$$y = R[(u-x_0)C + (v-y_0)D + (w-z_0)F]/\sqrt{((u-x_0)^2 + (v-y_0)^2 + (w-z_0)^2)}$$

where
$A = 1-(1-\cos\phi)(y_0^2+z_0^2)$
$B = -z_0 \sin\phi + x_0 y_0 (1-\cos\phi)$
$C = z_0 \sin\phi + x_0 y_0 (1-\cos\phi)$
$D = 1-(1-\cos\phi)(z_0^2+x_0^2)$
$E = y_0 \sin\phi + z_0 x_0 (1-\cos\phi)$
$F = -x_0 \sin\phi + y_0 x_0 (1-\cos\phi)$
$w = m R$ (m is a predetermined conversion magnification).

24. An image converting method for performing processes of cutting out a part of a distorted circular image photographed by use of a fisheye lens and converting it into a planar regular image, the image converting method which allows a computer or an electronic circuit to perform the following steps:
storing in a distorted circular image storage unit a distorted circular image constituted with aggregates of pixels arranged at a position indicated by coordinates (x, y) on a two-dimensional XY orthogonal coordinate system and having a radius R taking an origin O of the XY coordinate system as a center;
displaying on a display the distorted circular image stored in the distorted circular image storage unit;
entering position and cut-out orientation of a cut-out center point P on the distorted circular image displayed on the display on the basis of instructions by a user;
determining position coordinates $(x_0, y_0, z_0)$ of an intersecting point G between a straight line passing through the cut-out center point P and parallel with a Z axis and a virtual sphere, by defining a virtual sphere having the radius R taking the origin O as a center in a three-dimensional XYZ orthogonal coordinate system including the two-dimensional XY orthogonal coordinate system;
determining on the basis of the cut-out orientation a planar inclination angle φ given as an angle formed between a vector U facing a direction of an U axis of a two-dimensional UV orthogonal coordinate system to be defined on a tangent plane in contact with the virtual sphere on the intersecting point G and a vector X facing a direction of an X axis of the two-dimensional XY orthogonal coordinate system; and
performing operation for forming a planar regular image with regard to a partial image cut out from the distorted circular image to an orientation indicated by the planar inclination angle φ taking the cut-out center point P as a center by utilizing transformation equations based on an orthogonal projection method including the position coordinates $(x_0, y_0, z_0)$ and the planar inclination angle φ as parameters to allow coordinates (u, v) to correspond to coordinates (x, v), and determining a pixel value of each pixel on the planar regular image constituted with aggregates of pixels arranged at a position indicated by the coordinates (u, v) on the basis of a pixel value of a reference pixel on the distorted circular image arranged at a position indicated by the corresponding coordinates (x, y);
wherein an instruction for designating a position of the cut-out center point P is entered on the distorted circular image displayed on the display, and an instruction for designating an angle θ between the reference straight line J and the X axis on the distorted circular image is entered on an input screen, and the planar inclination angle φ is determined on the basis of the angle θ.

25. The image converting method according to claim 24, wherein the following equations are used as transformation equations based on the orthogonal projection method, $$x = R[(u^-x_0)A + (v^-y_0)B + (w^-z_0)E]/\sqrt{((u^-x_0)^2 + (v^-y_0)^2 + (w^-z_0)^2)}$$

$$y = R[(u^-x_0)C + (v^-y_0)D + (w^-z_0)F]/\sqrt{((u^-x_0)^2 + (v^-y_0)^2 + (w^-z_0)^2)}$$

where
$A = 1-(1-\cos\phi)(y_0^2+z_0^2)$
$B = -z_0 \sin\phi + x_0 y_0 (1-\cos\phi)$
$C = z_0 \sin\phi + x_0 y_0 (1-\cos\phi)$
$D = 1-(1-\cos\phi)(z_0^2+x_0^2)$
$E = y_0 \sin\phi + z_0 x_0 (1-\cos\phi)$
$F = -x_0 \sin\phi + y_0 x_0 (1-\cos\phi)$
$w = m R$ (m is a predetermined conversion magnification).

* * * * *